US012811729B2

(12) United States Patent
Naghshvarianjahromi et al.

(10) Patent No.: US 12,811,729 B2
(45) Date of Patent: Nov. 24, 2026

(54) TWO-DIMENSIONAL FREQUENCY SCANNING TRANSCEIVER WITH INTEGRATED NATURAL INTELLIGENCE FOR OPTIMIZED RF WIRELESS COMMUNICATIONS

(71) Applicant: AI Atlas, Hamilton (CA)

(72) Inventors: Mahdi Naghshvarianjahromi, Hamilton (CA); Shiva Kumar, Hamilton (CA); Mohamed Jamal Deen, Hamilton (CA)

(73) Assignee: AI Atlas Inc., Hamilton (CA)

( * ) Notice: Subject to any disclaimer, the term of this patent is extended or adjusted under 35 U.S.C. 154(b) by 0 days.

(21) Appl. No.: 19/064,547

(22) Filed: Feb. 26, 2025

(65) Prior Publication Data

US 2026/0074839 A1 Mar. 12, 2026

Related U.S. Application Data

(60) Provisional application No. 63/694,155, filed on Sep. 12, 2024.

(51) Int. Cl.
*G06F 15/16* (2006.01)
*H04L 1/20* (2006.01)
*H04L 41/16* (2022.01)

(52) U.S. Cl.
CPC .............. *H04L 1/203* (2013.01); *H04L 41/16* (2013.01)

(58) Field of Classification Search
CPC ................................ H04L 1/203; H04L 41/16
See application file for complete search history.

(56) References Cited

U.S. PATENT DOCUMENTS 7,994,969 B2 8/2011 Van Caekenberghe et al.
8,860,602 B2 10/2014 Nohara et al.
(Continued)

OTHER PUBLICATIONS

Naghshvarianjahromi, M.; Kumar, S.; Deen, M.J. Brain Inspired Dynamic System for the Quality of Service Control over the Long-Haul Nonlinear Fiber-Optic Link. Sensors 2019, 19, 2175.
(Continued)

*Primary Examiner* — John B Walsh
(74) *Attorney, Agent, or Firm* — Cherskov Flaynik & Gurda, LLC

(57) ABSTRACT

What is disclosed is: a method for natural intelligence (NI) processing for a wireless communication system. The method comprises receiving perceptions comprising a plurality of transmitted symbols, and determining, based on the received plurality of transmitted symbols, whether a suitable posterior model is available. when a suitable posterior model is available, the model is retrieved. The retrieved posterior model is used to estimate a BER, and the estimated BER is communicated to an executive subsystem. when the estimated BER is below a threshold, a prospective action is selected. The selected prospective action is tested in a virtual environment to determine whether the prospective action is beneficial. when the selected prospective action is beneficial, it is communicated to a feedback subsystem. Signals comprising the selected prospective action are received. An adjustment to implement the selected prospective action is determined, and signals to perform the determined adjustment are transmitted.

7 Claims, 35 Drawing Sheets

(56) References Cited

U.S. PATENT DOCUMENTS

| | | | | |
|---|---|---|---|---|
| 2014/0097979 | A1 * | 4/2014 | Nohara | G01S 7/003 342/90 |
| 2026/0163652 | A1 * | 6/2026 | Pompili | H04B 13/02 |

OTHER PUBLICATIONS

Haykin S. Cognitive dynamic systems: perception-action cycle, radar and radio. Cambridge University Press; Mar. 22, 2012; Pages: Contents pp. (v)-(viii); Sections 1.1-1.8 (pp. 1-8); Sections 6.1-6.6 (pp. 167-182).

Paul Nikolich et al. "Standards for 5G and Beyond: Their use Cases and Applications," IEEE 5G Tech Focus: vol. 1, No. 2, Jun. 2017.

"Soft Decision Forward Error Correction for Coherent Super-Channels", Infinera, White paper, https://www.infinera.com/wp-content/uploads/Soft-Decision-Forward-Error-Correction-for-Coherent-Super-Channels-0189-WP-RevA-0519. pdf, retrieved May 26, 2024.

Chen M et al.Real-time system based on FPGA for optical communication system. In Metro and Data Center Optical Networks and Short-Reach Links Jan. 30, 2018 (vol. 10560, pp. 10-25). SPIE.

Rahman M et al."Bandwidth enhancement and frequency scanning array antenna using novel UWB filter integration technique for OFDM UWB radar applications in wireless vital signs monitoring." Sensors. Sep. 19, 2018; 18(9):3155.

* cited by examiner

TWO-DIMENSIONAL FREQUENCY SCANNING TRANSCEIVER WITH INTEGRATED NATURAL INTELLIGENCE FOR OPTIMIZED RF WIRELESS COMMUNICATIONS

This application claims priority to provisional patent application No. 63/694,155 filed on Sep. 12, 2024, presently pending, the contents of which is hereby incorporated by reference.

FIELD OF THE INVENTION

The present disclosure relates to the field of advanced communication systems, specifically to the application of natural intelligence (NI) to wireless communications.

BRIEF SUMMARY

A method for NI processing in a reception subsystem for a wireless client comprising: receiving, by a perceptor subsystem, perceptions comprising a plurality of transmitted symbols; determining, based on the received plurality of transmitted symbols, whether a suitable posterior model is available in a posterior storage within the posterior subsystem; when a suitable posterior model is available, retrieving, by one or more posterior processing modules within the posterior subsystem, a posterior model from the posterior storage; communicating, by the one or more posterior processing modules, the retrieved posterior model to an adaptive feedback path control; estimating, by the adaptive feedback path control module, a bit error rate (BER) using the retrieved posterior model; communicating the estimated BER to an executive subsystem; when the estimated BER is below a threshold, selecting, by a planning module within the executive subsystem, a prospective action from an executive storage; testing, by at least one of the planning module and one or more executive processing modules within the executive subsystem, the selected prospective action in a virtual environment; based on the testing, determining, by at least one of the planning module and one or more executive processing modules, whether the selected prospective action is beneficial; when the selected prospective action is beneficial, communicating, by either the planning module or the one or more executive processing modules, signals comprising the selected prospective action to a feedback subsystem; receiving, by a feedback processing module within the feedback subsystem, the signals comprising the selected prospective action; based on the received signals, determining, by the feedback processing module, an adjustment to implement the selected prospective action; and transmitting, by the feedback processing module, signals to perform the determined adjustment to one or more components within a host device transmission, a client reception, or an input data source to the host device transmission.

A method for NI processing in a reception subsystem for a wireless client comprising: receiving, by a perceptor subsystem, perceptions comprising a plurality of transmitted symbols; determining, based on the received plurality of transmitted symbols, whether a suitable posterior model is available in a posterior storage within the posterior subsystem; when a suitable posterior model is available, retrieving, by one or more posterior processing modules within the posterior subsystem, a posterior model from the posterior storage; communicating, by the one or more posterior processing modules, the retrieved posterior model to an adaptive feedback path control; estimating, by the adaptive feedback path control module, a bit error rate (BER) using the retrieved posterior model; communicating the estimated BER to an executive subsystem; when the estimated BER is below a threshold, selecting, by a planning module within the executive subsystem, a prospective action from an executive storage; testing, by at least one of the planning module and one or more executive processing modules within the executive subsystem, the selected prospective action in a virtual environment; based on the testing, determining, by at least one of the planning module and one or more executive processing modules, whether the selected prospective action is beneficial; when the selected prospective action is beneficial, communicating, by either the planning module or the one or more executive processing modules, signals comprising the selected prospective action to a feedback subsystem; receiving, by a feedback processing module within the feedback subsystem, the signals comprising the selected prospective action; based on the received signals, determining, by the feedback processing module, an adjustment to implement the selected prospective action; and transmitting, by the feedback processing module, signals to perform the determined adjustment to one or more components within a host device transmission, a client reception, or an input data source to the host device transmission.

The foregoing and additional aspects and embodiments of the present disclosure will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the disclosure will become apparent upon reading the following detailed description and upon reference to the drawings.

Figure 1A:
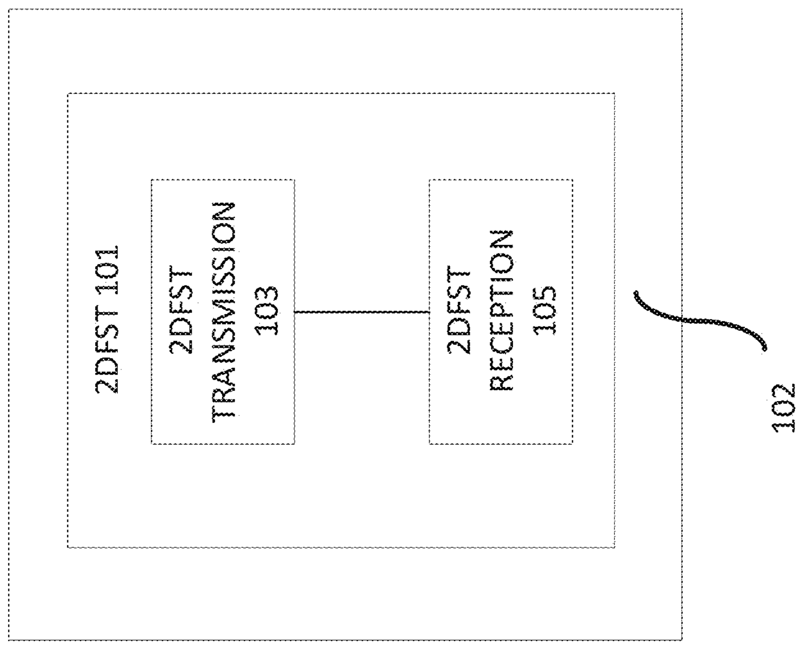
FIG. 1A illustrates an example embodiment of a two-dimensional frequency scanning transceiver (2DFST) for a wireless system.

While the present disclosure is susceptible to various modifications and alternative forms, specific embodiments or implementations have been shown by way of example in the drawings and will be described in detail herein. It should be understood, however, that the disclosure is not intended to be limited to the particular forms disclosed. Rather, the disclosure is to cover all modifications, equivalents, and alternatives falling within the spirit and scope of an invention as defined by the appended claims.

BACKGROUND

The increasing demand for higher data rates, lower latency, reduced power consumption, and decreased digital signal processing complexity, particularly with the emergence of 5G and 6G networks, has highlighted the limitations of existing technologies. Specifically, traditional time-domain beamforming methods, particularly in active array systems used to address high path loss in millimeter-wave (mmWave) frequencies for 5G and in sub-terahertz (100 GHz to 1 THz) and terahertz (THz) frequencies for 6G communications, have become insufficient.

These conventional technologies rely heavily on complex multi-beam beamforming techniques in time-domain digital processing, especially in environments requiring high-gain pencil beam antennas to combat high path loss. Time-domain techniques, particularly those implemented by digital signal processors (DSPs), still introduce substantial latency, especially at ranges less than 1 kilometer, and adds to the overall system complexity and transceiver costs.

Each antenna element or subarray in such systems requires dedicated RF chains, phase shifters, power amplifiers (PAs), low-noise amplifiers (LNAs), and high-speed analog to digital converters (ADCs) and digital to analog converters (DACs). This architecture results in high hardware costs, increased power consumption, and computational complexity, particularly as the number of antenna elements scales for massive multi-input, multi-output (MIMO) applications. Furthermore, active beam steering in phased arrays introduces latency due to the continuous feedback loop between the baseband processor and RF front-end, making real-time beam adaptation challenging. The problem is exacerbated when serving clients in crowded urban areas.

In cases where, for example, a host is transmitting to a client, transmitting at a high power over a wide bandwidth raises potential health and safety concerns. The chance of radiation exposure at frequencies which are hazardous to humans due to, for example, increased absorption and resonance of human tissue, increases.

There is also a need to provide coverage to wide areas. However, providing coverage to a wide area using omnidirectional antennas comes with cybersecurity and privacy challenges.

These traditional methods, despite their theoretical potential, have not met the practical requirements of real-world 5G deployments, as indicated by Paul Nikolich et al. in "Standards for 5G and Beyond: Their Use Cases and Applications," IEEE 5G Tech Focus: Volume 1, Number 2, June 2017.

Natural intelligence (NI) presents a revolutionary approach by drawing inspiration from the adaptive behavior and cognitive functions observed in the human brain. NI encompasses a system designed to perceive the environment, cognitively act upon it, and utilize feedback mechanisms to adapt actions based on the outcomes. This is encapsulated in the perception-action cycle (PAC), a concept that enables dynamic adjustment to the environment through goal-directed behaviors, closely mirroring human cognitive processes in responding to environmental stimuli. Further information on the PAC is given in, for example, J. M., Fuster, Cortex and mind: Unifying cognition. (Oxford University, 2003).

Cognitive dynamic systems (CDS), which are synonymous with NI have been explored in various fields such as cognitive radar, smart grid management, and cybersecurity. This diversity underscores the system's adaptability and efficacy within linear and Gaussian environments (LGEs). Notably, as outlined in Haykin S. Cognitive dynamic systems: perception-action cycle, radar and radio. Cambridge University Press; 2012 Mar. 22, hereinafter referred to as "Haykin", the foundation of these applications is built on algorithms that predominantly cater to linear and Gaussian models. However, while effective in LGEs, these algorithms require significant computational resources, making them impractical for non-Gaussian and nonlinear environments (NGNLEs), such as those seen in many wireless communication systems, healthcare, and educational technologies.

The standard NI approaches introduced in Haykin, while suitable for LGEs, are less effective and practical in such NGNLE scenarios, where advanced methods are required to handle the inherent complexities. In particular, the linear assumptions and Gaussian noise models typical of Kalman filtering and similar algorithms fail to accurately represent or address the complex dynamics and uncertainty present in NGNLEs.

The computational intensity of Kalman filtering presents a notable challenge in many wireless communication environments, as the luxury of high computational resources is often unattainable. Given the rapid transmission rates and the growing need for real-time processing within wireless communication systems, there is minimal room for algorithms that do not efficiently scale or that demand extensive computational power.

This discrepancy underscores the necessity for a paradigm shift towards developing and implementing NI algorithms specifically designed for NGNLEs. Such algorithms must transcend the limitations of traditional linear and Gaussian assumptions, offering scalable, computationally efficient solutions capable of tackling the inherent complexities of NGNLEs.

As explained above, CDS has found many applications in the field of radar. For example, U.S. Pat. No. 8,860,602 B2 titled "Device and method for cognitive radar information network", and issued Oct. 14, 2014 to Nohara et al (hereinafter referred to as "Nohara") describes a cognitive radar information network (CRIN) which integrates human-like cognitive abilities into radar systems. Each node within the CRIN includes transmitters, receivers, and digital processors to gather environmental data, which is stored for future use. A cognitive controller autonomously directs the system's focus to areas of interest by adjusting waveforms, receiver settings, and antenna control. The cognitive controller continuously learns from historical data and past decisions to improve performance over time.

However, Nohara does not contemplate application to a wireless communications system. One of ordinary skill in the art would appreciate that radar systems and wireless communications systems have different aims and use different performance metrics for evaluation. Therefore, application of solutions for radar systems to wireless communications would not be readily apparent to one of ordinary skill in the art. Furthermore, Nohara does not mention or contemplate operation within an NGNLE environment.

In NGNLEs, particularly those with inter-symbol interference (ISI) where memory effects are prevalent, soft decision forward error correction (SD-FEC) is generally more efficient than hard decision forward error correction (HD-FEC). For example, as explained in "Soft Decision Forward Error Correction for Coherent Super-Channels", Infinera, white paper, https://www.infinera.com/wp-content/uploads/Soft-Decision-Forward-Error-Correction-for-Coherent-Super-Channels-0189-WP-RevA-0519.pdf, retrieved 26 May 2024; SD decoding provides coding gain of up to 11 dB or more with an overhead of 15% to 35% depending on the implementation.

Although the SD decoding provides significant performance advantage due to larger coding gain, there are some disadvantages. SD decoding requires more transmission overhead than HD decoding which can reduce effective data rate. For example, when SD decoding with 35% overhead is used, 35% of the channel time is used to send the redundant data and only 65% of the channel time is utilized to send the actual data, which significantly lowers the effective data rate.

Furthermore, SD decoding involves more complex calculations relative to HD decoding. These complex calculations lead to enhanced power consumption and increased latency. These disadvantages make SD decoding unattractive for 5G/6G networks and standards where there are ultra-low latency requirements.

Therefore, systems which do not need to rely on SD decoding to provide excellent performance are attractive, as these systems do not face the associated latency, computational cost and bandwidth penalties. Combining NI with HD decoding can provide nearly the same net coding gain without the penalties of SD decoding.

Therefore, there is a need for systems and methods which can overcome the needs, issues and challenges discussed above, and which can exploit the inherent advantages of NI in NGNLEs.

DETAILED DESCRIPTION

One of ordinary skill in the art would appreciate that the systems and methods detailed below target, for example, areas where wireless communications and multi-input, multi-output (MIMO)-based wireless systems are used.

The systems and methods disclosed below address the needs, issues and challenges outlined above, by modifying and enhancing existing NI frameworks for application in NGNLEs, within the framework of a two-dimensional frequency scanning transceiver (2DFST).

Integrating NI with a 2DFST enables lower computational complexity and operation without requiring extensive prior knowledge of channel parameters. The NI systems described below leverage the cognitive principles inspired by the adaptive and decision-making functions of the human brain as described in the section above. Adaptive behaviour through sophisticated perception, action, and feedback mechanisms enables real-time adaptability and dynamic performance adjustments in the face of changing environmental conditions, including nonlinear impairments such as turbulence, inter-symbol interference (ISI), and channel memory effects. This will be described below.

Utilizing NI reduces computational complexity by eliminating the need for detailed prior knowledge of channel parameters. This allows the 2DFST to intelligently manage communication links and optimize bit error rates (BER), latency, and overall system reliability.

Furthermore, the NI-driven systems and methods below outperform traditional and artificial intelligence (AI)-based methods in handling nonlinearities and systems with memory. It anticipates and addresses potential issues before they impact system performance, making it an ideal solution for beyond 5G and 6G networks, where high data rates, low latency, and reliability are crucial.

The implementation of 2DFSTs outlined below are designed to provide simultaneous pencil beams in multiple directions, and at multiple frequencies without the need for complex time-domain beamforming procedures. This enables more efficient data transmission and reception for multiple clients located in a coverage area. Transmission energy can be concentrated along a desired direction and can improve the strength of the signal received from a desired direction, which can lead to improved capability of distinguishing signals to and from multiple devices.

By utilizing frequency-domain beamforming in combination with subcarrier multiplexing and subcarrier demultiplexing, the systems and methods described below optimize data transmission efficiency. This results in a more cost-effective and simpler design, especially in beyond 5G (sub- THz) and 6G (THz) applications, where conventional techniques have proven impractical due to their high computational overhead, higher power requirements, and latency issues.

As described below, certain frequencies are allocated to certain cells within a coverage area. This approach reduces the total radiated power to each client. As will be explained below, in the NI-based 2DFST, power is only radiated in a specific bandwidth of interest based on the cell occupied by the user. Then, the amount of power radiated is reduced based on the total number of cells in the coverage area.

For instance, in a system with 20 cells where:

the entire bandwidth is divided into 20 channels, and each cell is assigned 1 unique channel, the total radiated power to each user is reduced by a factor of 20 compared to when power is radiated over all bandwidths, as unnecessary bands are excluded. This minimizes unnecessary exposure to wireless radiation which resolves the health and safety issues described above.

Restriction to certain bands based on cells also confers enhanced security and privacy compared to transmitting over the entire bandwidth to all parts of the coverage area. The systems and methods disclosed below ensure that each client's data is confined to a specific frequency band. Consequently, only the intended client located at a specific direction can receive the data, significantly improving cybersecurity.

Restricting the bandwidth used by the client can minimize the effects of atmospheric turbulence. Narrower bandwidth signals are inherently less susceptible to turbulence-caused distortion, leading to improved signal integrity and enhanced communication reliability.

The systems and methods disclosed below refine these algorithms, enhancing their application within the realm of communication systems for example 2DFST. By integrating supervised learning (SL) and reinforcement learning (RL) techniques, the NI system facilitates enhanced decision-making processes.

The systems and methods disclosed below significantly enhance the efficiency, adaptability, and cost-effectiveness of next-generation communication systems to provide a future-proof solution that integrates dynamic management.

FIG. 1A shows an example embodiment of a 2DFST 101 for a wireless communications system. 2DFST 101 comprises 2DFST transmission 103 and 2DFST reception 105. 2DFST 101 resides in, for example, a suitable host device 102 such as a server or a router or a base station. 2DFST transmission 103 transmits signals comprising data to one or more clients of a wireless system within a coverage area, wherein each of the transmissions to the one or more clients occur over a wireless link operating at a frequency. 2DFST reception 105 receives signals comprising data from one or more clients within the coverage area, also over a wireless link operating at a frequency. 2DFST transmission 103 and 2DFST reception 105 are discussed in further detail below.

Figure 1B:
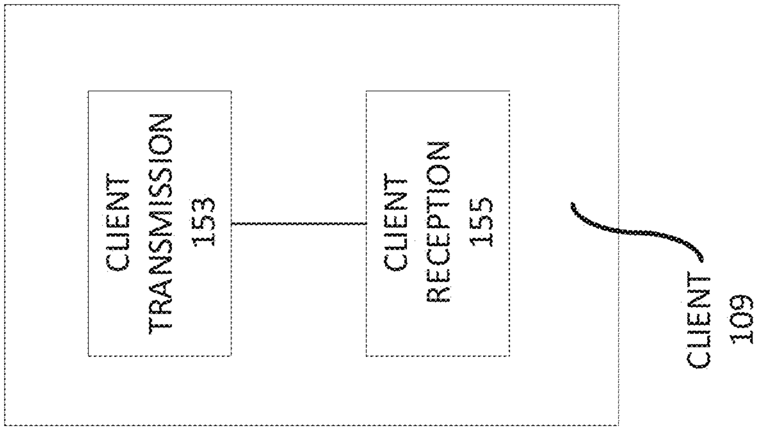
FIG. 1B illustrates an example embodiment of a client in a wireless system.

FIG. 1B shows an example embodiment of a client 109. Client 109 comprises client transmission 153 and client reception 155. Client transmission 153 transmits signals comprising data to the host device 102, and client reception 155 receives signals comprising data from the host device 102, both using wireless links. Client transmission 153 and client reception 155 are discussed in further detail below. Examples of client devices include, for example, unmanned aerial vehicles such as drones, satellites and other appropriate mobile devices and vehicles.

In some embodiments, both the transmission and reception in at least one of host device 102 and client 109 are implemented on direct radio frequency (RF) field programmable gate array (FPGA) or application specific integrated circuit (ASIC) architectures that support wide instantaneous bandwidth (IBW). For example, Intel's direct RF solution can cover an IBW of up to 32 GHz with a total bandwidth of 36 GHz, while AMD's (formerly Xilinx) Mercury system can handle 6 GHz IBW and up to 36 GHz total bandwidth. ASIC implementations can also support these bandwidth requirements, ensuring that host and client transceivers are capable of covering the necessary frequency bands.

Figure 2:
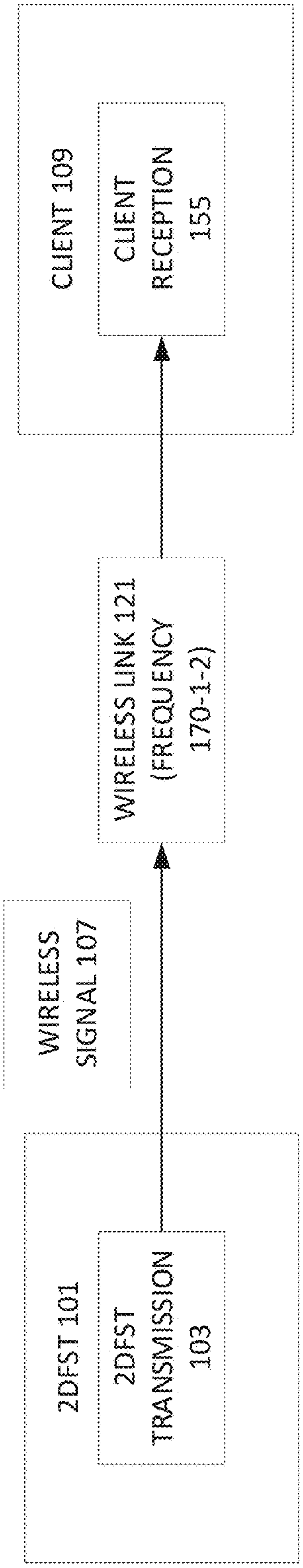
FIG. 2 illustrates an example embodiment where a transmission subsystem in a 2DFST transmits a wireless signal to a client within a coverage area.

FIG. 2 shows an example embodiment where the 2DFST transmission 103 in 2DFST 101 transmits a wireless signal 107 comprising data to client 109 within a coverage area. The transmission occurs over a wireless link 121 operating at frequency 170-1-2. Client reception 155 acts to receive the signal 107 on behalf of client 109. Transmission from 2DFST 101 to client 109 is discussed in further detail below.

As would be known to one of ordinary skill in the art, wireless links such as wireless link 121 or any of the wireless links described in this specification, are affected by various impairments. Since these wireless links operate in an NGNLE, it follows that the impairments may be non-linear, non-Gaussian or both.

Figure 3:
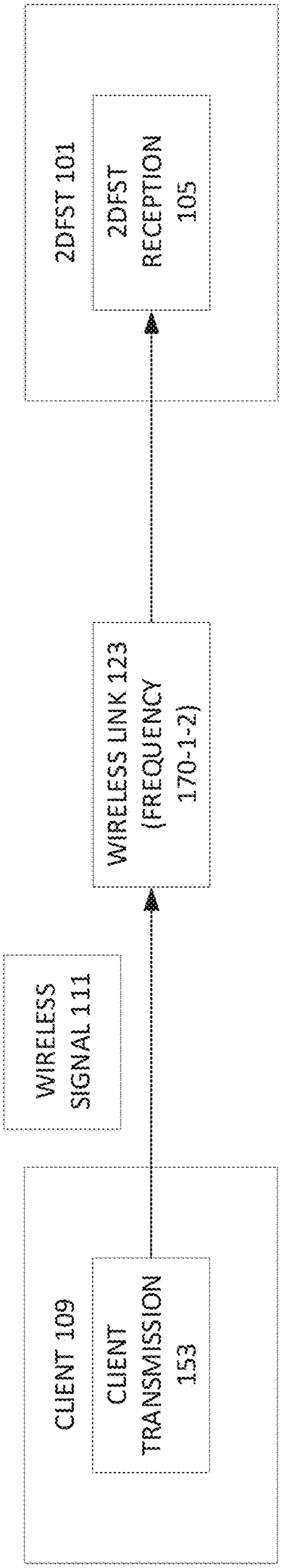
FIG. 3 illustrates an example embodiment where a client transmits a wireless signal over a wireless link to a 2DFST.

FIG. 3 shows an example embodiment, where client transmission 153 in client 109 transmits RF or wireless signal 111 over wireless link 123 to 2DFST reception 105 in 2DFST 101, also using frequency 170-1-2. Transmission from client 109 to 2DFST 101 is discussed in further detail below.

The coverage area is divided into a plurality of cells, wherein each of the plurality of cells is served by one frequency, and is positioned at a transmission direction with respect to 2DFST transmission 103 of host device 102.

The total number of cells is, for example (J×Q). Then each cell is indexed as (j, q); where:

$j \in \{1, 2 \ldots, J\}$; and $q \in \{1, 2 \ldots, Q\}$.

Cell (j,q) is positioned at a direction $\theta_{jq}$ with respect to the transmission, and each frequency $f_{jq}$ is assigned to cell (j,q) and therefore direction $\theta_{jq}$. In some embodiments, $\theta_{jq}$ is denoted by a combination of azimuth and elevation; as would be known to one of ordinary skill in the art.

Assigning each frequency to a specific geographic location rather than an individual client ensures that multiple clients within the same coverage area can seamlessly access services without interference. As was explained above, allocating frequencies to cells reduces the total radiated power compared to transmitting over all bandwidths, which can improve health and safety and power consumption.

Figure 4:
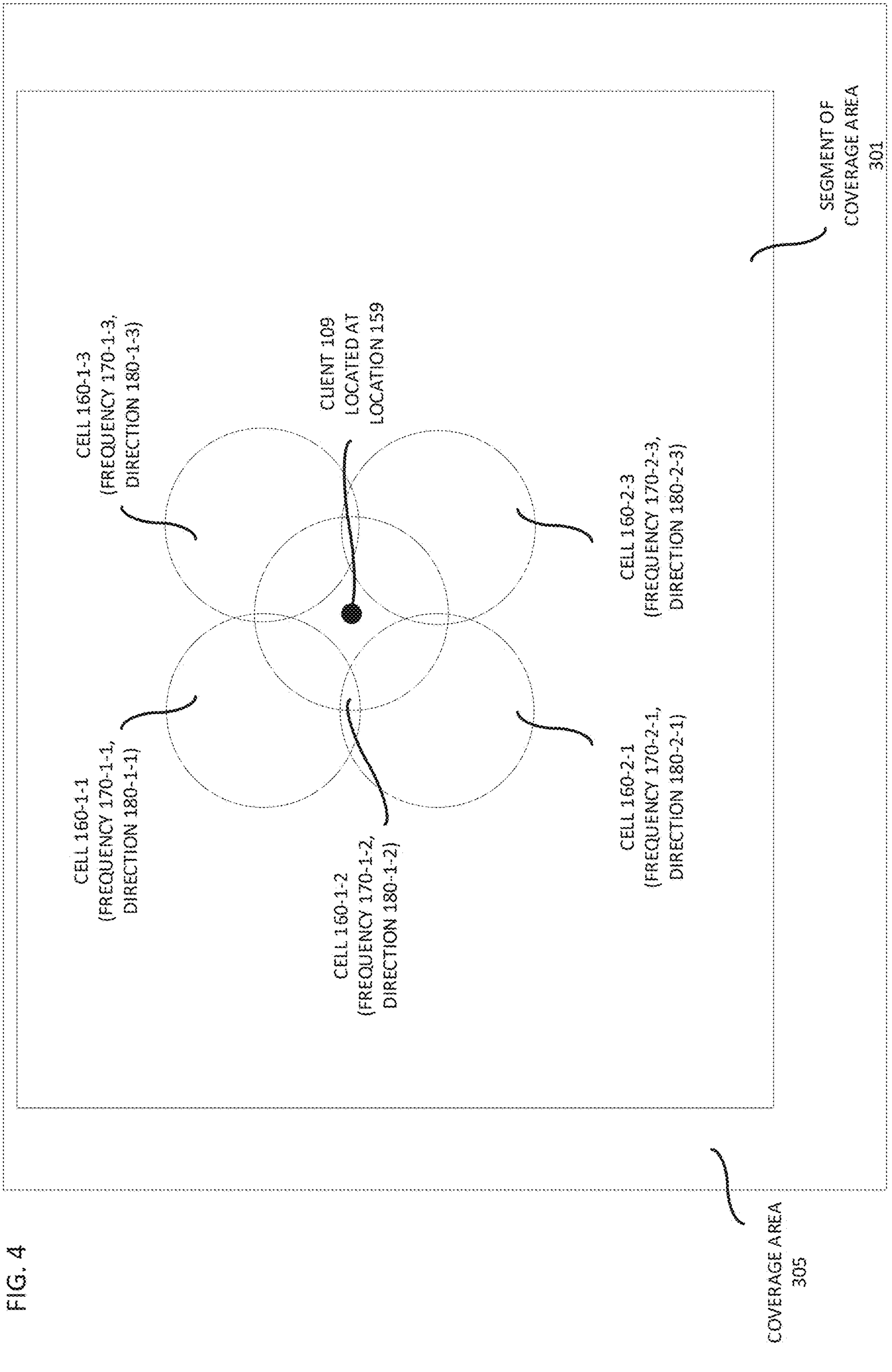
FIG. 4 illustrates an example embodiment of a segment of a coverage area.

FIG. 4 shows an example embodiment of a segment 301 of a coverage area 305. In FIG. 4, segment 301 is divided into five (5) cells. Each cell is served by a frequency, and is at a positioned at a transmission direction with respect to the 2DFST transmission 103 of host device 102. For example:

- Cell (1,1) which is labelled as 160-1-1 is served by frequency 170-1-1 and is positioned at direction 180-1-1;
- Cell (1,2) which is labelled as 160-1-2 is served by frequency 170-1-2 and is positioned at direction 180-1-2;
- Cell (1,3) which is labelled as 160-1-3 is served by frequency 170-1-3 and is positioned at direction 180-1-3;
- Cell (2,1) which is labelled as 160-2-1 is served by frequency 170-2-1 and is positioned at direction 180-2-1; and Cell (2,2) which is labelled as 160-2-2 is served by frequency 170-2-2 and is positioned at direction 180-2-2.

Then, the client acts to receive and transmit data to the host device on a frequency which depends on the cell that the client is in. For example, referring to FIG. 4, client 109 is located at location 159 within cell 160-1-2. Then client 109 acts to receive and transmit data on frequency 170-1-2.

In some embodiments, the positioning refers to the direction of the centre of the cell with regard to the transmitter.

Figure 5A:
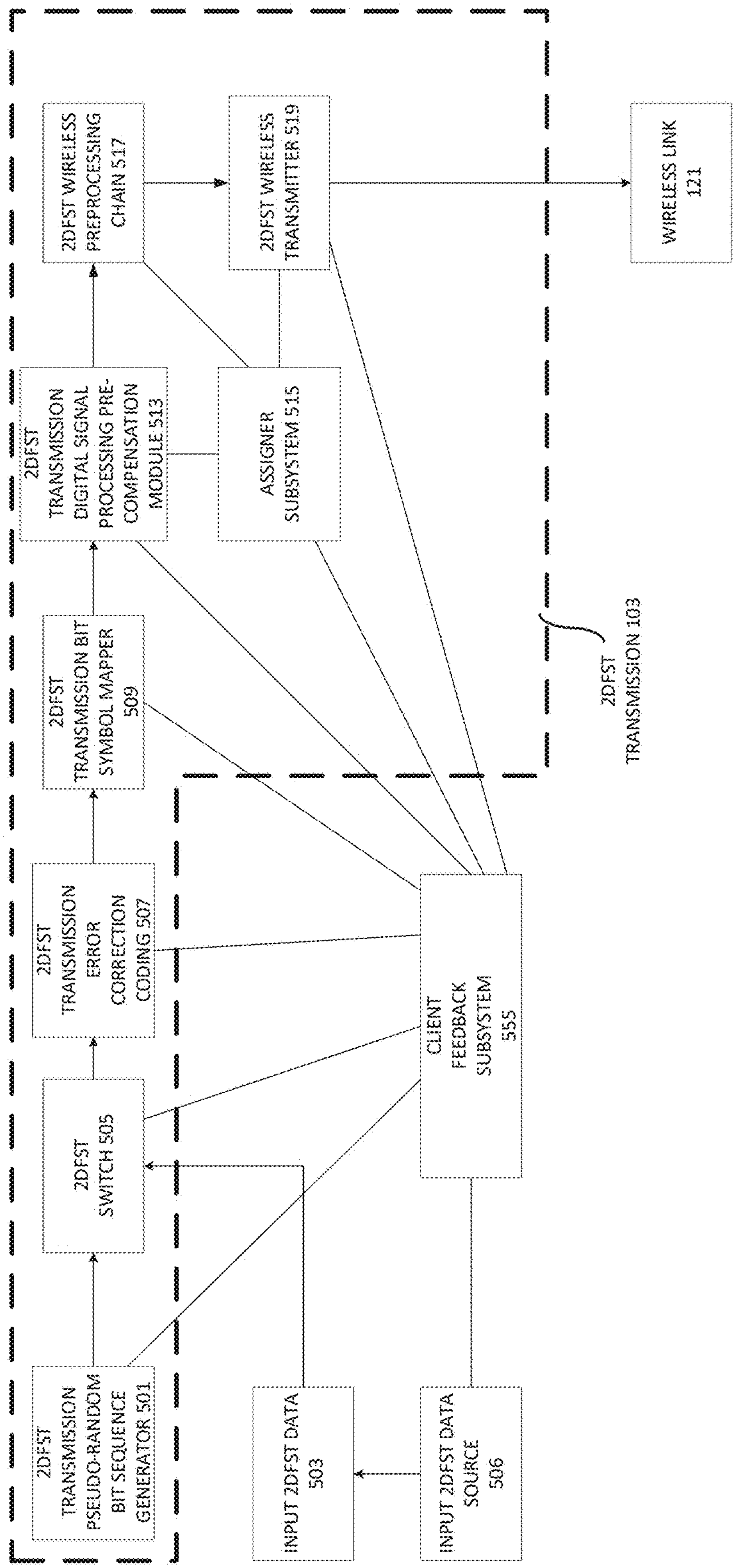
FIG. 5A illustrates an example embodiment of a transmission subsystem in a 2DFST.

Transmission of data using wireless signals from 2DFST transmission 103 of 2DFST 101 to client reception 155 of client 109 is now explained in further detail. 2DFST transmission 103 structure and operation are explained in detail with reference to FIG. 5A and the transmission sequence 6A-00 shown in FIG. 6A.

Input 2DFST data 503, which has an associated bit rate and originates from input 2DFST data source 506 is sent to 2DFST transmission 103, where it is processed and converted into RF or wireless signals and transmitted via wireless link 121. As previously explained, there are one or more clients. Then input data 503 is associated with one of the one or more clients.

2DFST transmission pseudo-random bit sequence (PRBS) generator 501 generates PRBS using techniques known to those of ordinary skill in the art. In some embodiments, 2DFST transmission PRBS generator 501 is synchronized with a reception PRBS generator, which will be discussed later. This synchronization enables both transmission and reception PRBS generators to generate the same PRBSes at the transmission and reception, so as to facilitate training and BER measurement. Techniques to synchronize transmission PRBS generator 501 with reception PRBS generator are known to those of ordinary skill in the art and will not be discussed here. The combination of transmission PRBS generator operating in synchronization with reception PRBS generator overcomes a major issue encountered in systems that require training, such as machine learning and AI systems, which is the reliance on pre-existing large databases of training data. This combination enables the generation of training data on the fly, which is useful for real-time applications and ensures that the system can adapt and train dynamically, enhancing responsiveness and effectiveness in various operational scenarios.

2DFST switch 505 is communicatively coupled to 2DFST transmission PRBS generator 501, and input 2DFST data source 506 at the input end.

Figure 6A:
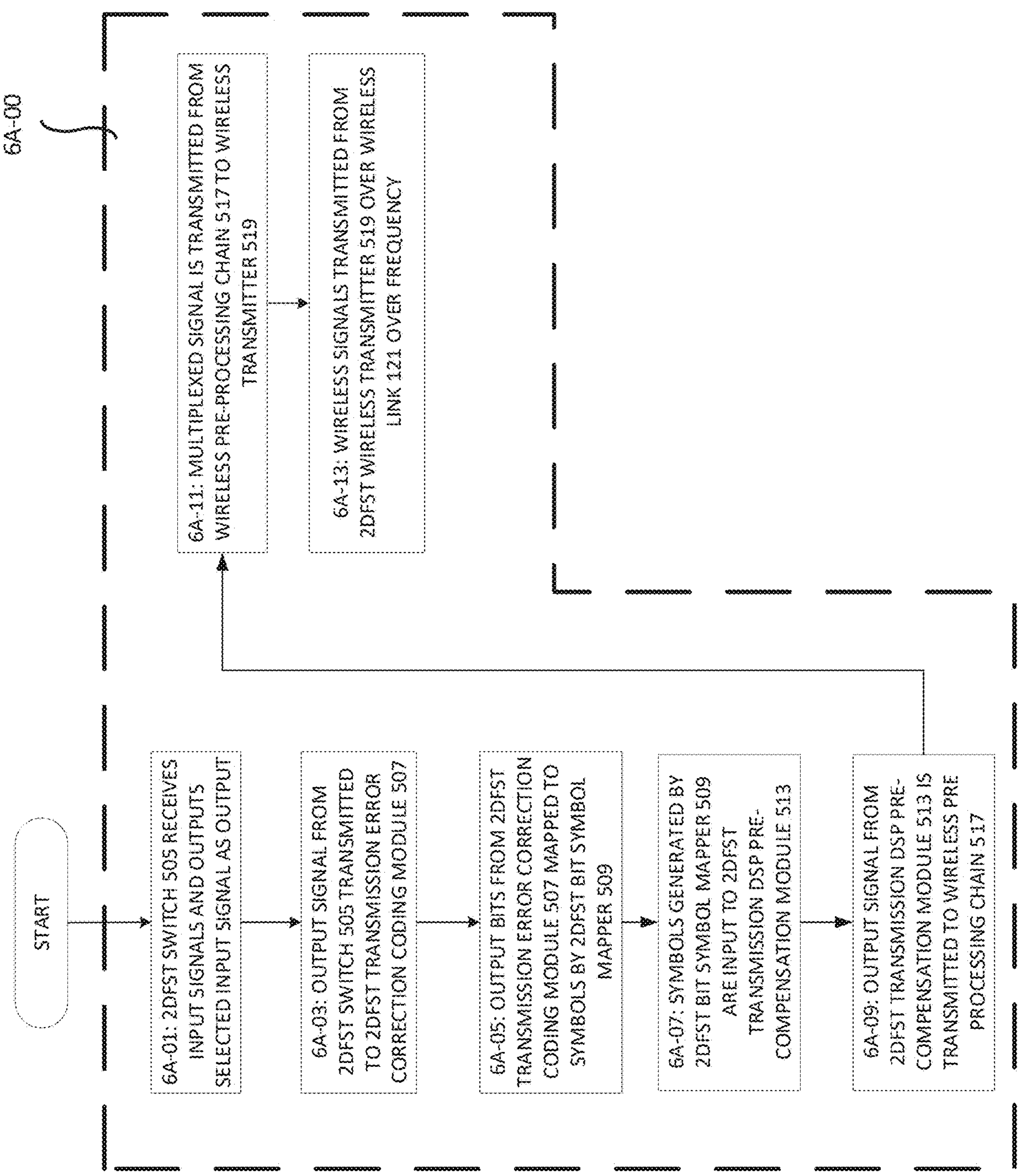
FIG. 6A illustrates an example embodiment of a transmission sequence in a 2DFST transmission subsystem.

In step 6A-01 of FIG. 6A: 2DFST switch 505 receives the following signals as inputs:

Output from 2DFST transmission PRBS generator 501, and

Input 2DFST data 503 from input 2DFST data source 506.

Depending on whether the wireless system is in training mode or steady state mode, 2DFST switch 505 selects one of the above input signals and outputs the selected input signal as an output signal. In steady state mode, the wireless system operates using input 2DFST data 503. In training mode, the wireless system operates using the data output from 2DFST transmission PRBS generator 501 so as to perform training as will be discussed below. The selection of an input signal by 2DFST switch 505 is also discussed further below.

In step 6A-03 of FIG. 6A: the output signal from 2DFST switch 505 is then transmitted to 2DFST transmission error correction coding module 507. Based on the output signal from 2DFST switch 505, 2DFST transmission error correction coding module 507 generates an error correction coded output signal comprising bits using a forward error correction (FEC) coding scheme.

2DFST transmission error correction coding module 507 is communicatively coupled to 2DFST transmission bit symbol mapper 509. In step 6A-05 of FIG. 6A: 2DFST transmission bit symbol mapper 509 receives the error correction coded output signal comprising bits generated by 2DFST transmission error correction coding module 507, and maps these received bits to symbols. This mapping is performed based on a modulation format used by the bit symbol mapper. Techniques to perform mapping are known to those of ordinary skill in the art. Examples of different modulation formats are binary phase-shift keying (BPSK), quadrature phase-shift keying (QPSK), or S-QAM, where S refers to the number of symbols in an alphabet for quadrature amplitude modulation (QAM). Examples of S-QAM are 16-QAM (S=16) and 64-QAM (S=64).

2DFST transmission bit symbol mapper 509 is communicatively coupled to 2DFST transmission digital signal processing (DSP) pre-compensation module 513. In step 6A-07 of FIG. 6A: the symbols output from 2DFST transmission bit symbol mapper 509 are received by 2DFST transmission DSP pre-compensation module 513, where pre-compensation techniques are applied to these received symbols to generate an output digital signal for transmission to 2DFST wireless pre-processing chain 517. Transmission pre-compensation techniques are known to those of ordinary skill in the art and are not discussed in detail here.

In step 6A-09 of FIG. 6A, the output signals from 2DFST transmission DSP pre-compensation module 513 are transmitted to 2DFST wireless pre-processing chain 517. Then assigner subsystem 515 assigns the output signals to a frequency based on the location of the client.

Assigner subsystem 515 plays the role of determining the appropriate carrier frequency and subcarrier baseband frequency and assigning output signals to the components corresponding to these parameters. In some embodiments, assigner subsystem 515 is implemented in software. In other embodiments, assigner subsystem 515 is implemented in hardware. In yet other embodiments, assigner subsystem 515 is implementing using at least one processor and has sufficient storage or memory to perform its functions.

For example, referring to FIG. 4: client 109 is located in cell 160-1-2, which is served by frequency 170-1-2. Then, assigner subsystem 515 assigns output signals destined for client 109 to frequency 170-1-2.

In some embodiments, this assignment is facilitated by, for example: clients such as client 109 transmitting identifying information comprising, for example their locations and identifications to the host device 102 on the frequency corresponding to the cell that they are located in. In some embodiments, the client determines the frequency serving the cell it is in, by:

using geo-location techniques known to one of ordinary skill in the art to determine the cell and therefore direction relative to the transmitter; and using, for example, a lookup table to determine the frequency serving the cell.

Then, the client configures its wireless receiver and transmitter to operate at the frequency serving the cell; and receive and transmit signals at the determined direction. This reduces the need for complex beam-forming or beam-steering, as the direction and frequency required are known to the client.

Assigner subsystem 515 stores the identifying information transmitted by the client and uses it to perform the translations. In order to translate the output signals to the assigned frequency $f_{jq}$, a combination of subcarrier modulation and carrier modulation is used.

An example process for translation is described below, and with reference to FIGS. 5B, 5C and 5D.

Figure 5B:
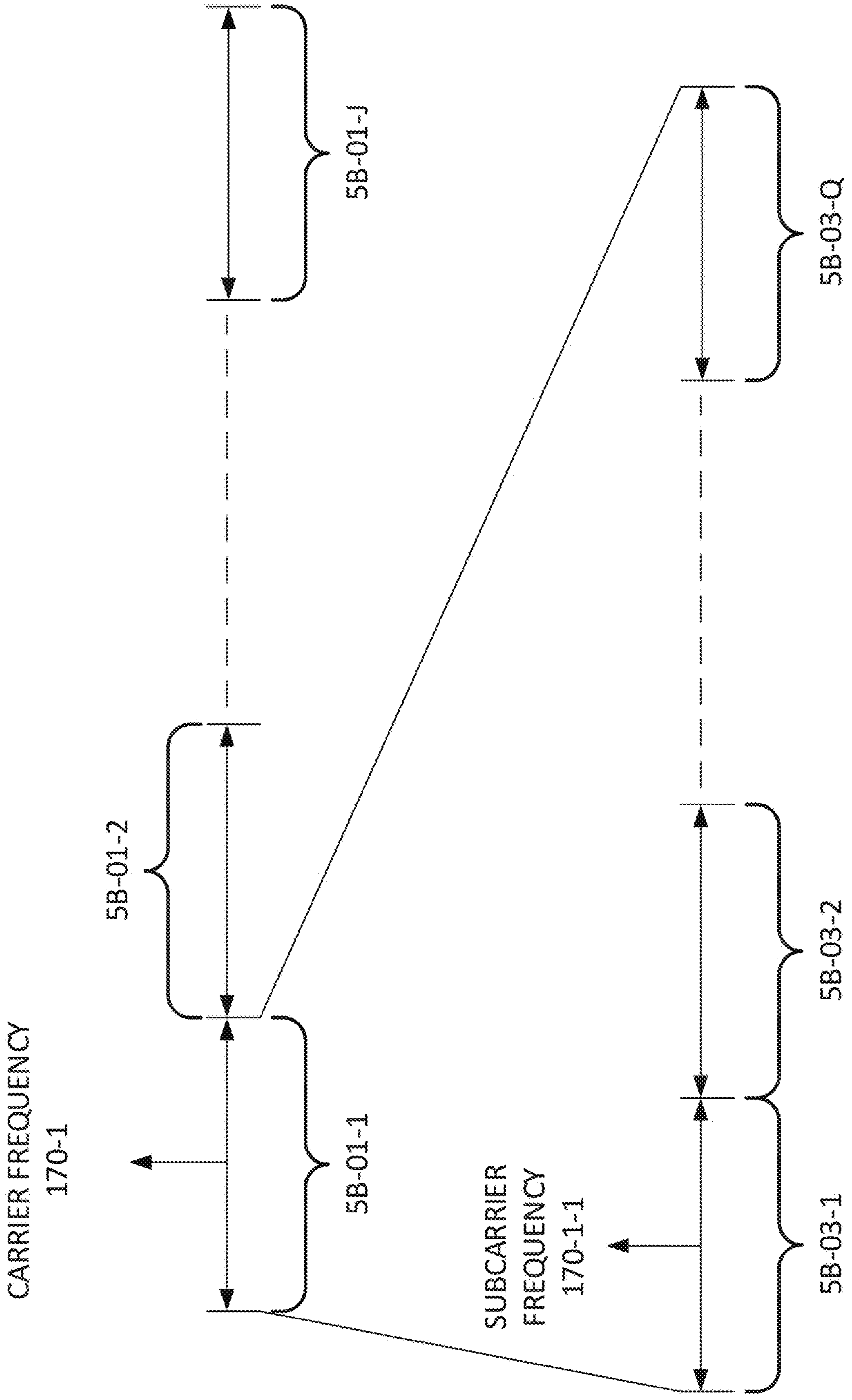
FIG. 5B illustrates an example embodiment of a channel mapping scheme.

An embodiment of a channel mapping scheme is demonstrated in FIG. 5B. In FIG. 5B, there are J channels 5B-01-1 to 5B-01-J. Each channel has an index j a corresponding carrier frequency with value $f_{c,j}$. The channel index j corresponds to the previously mentioned cell indexing (j, q); where j∈{1, 2 . . . , J}.

For example, for channel 5B-01-1, the carrier frequency 170-1 has a value $f_{c,j}$. The range of carrier frequencies and bandwidth of each of the J channels depend on, for example, system requirements.

As shown in FIG. 5B, there are Q sub-channels within each channel. For example, channel 5B-01-1 has sub-channels 5B-03-1 to 5B-03-Q. Each sub-channel has a sub-channel index q corresponding to the previously mentioned cell indexing (j, q); where q∈{1, 2 . . . , Q}. The sub-channel centre frequency is the assigned frequency f q and each sub-channel has a bandwidth $(\Delta f)_{jq}$. For example, sub-channel 5B-03-1 in channel 5B-01-1 has subcarrier frequency 170-1-1 with value $f_1$, and belongs to cell (1,1) since (j, q)=(1, 1).

In this channel mapping scheme, the position of the centre frequency for sub-channel q relative to the carrier frequency is the same for all the J channels. For example, the position of $f_{11}$ relative to $f_{c,1}$ is the same as the position of $f_2$ relative to $f_{c,2}$.

One of ordinary skill in the art would recognize that the channel mapping shown in FIG. 5B is achieved by:

Modulating a subcarrier having a frequency corresponding to an appropriate subcarrier baseband frequency $f_{s,q}$ with a baseband signal, then Modulating the modulated subcarrier at the carrier frequency $f_{c,j}$.

The combined effect of these two operations is to translate a baseband signal to an output signal at the assigned frequency $f_{jq}$ $f_{c,j}+f_{s,q}$.

Then, once the assigner subsystem 515 has determined the $f_{jq}$ as explained above, it determines the combination of subcarrier baseband frequency $f_{s,q}$ and carrier frequency $f_{c,j}$ needed, and the necessary subcarrier frequency. In some embodiments, these values are stored in assigner subsystem 515 in, for example, a lookup table indexed by the index (j,q). Then, for example, for cell (1,1), assigner subsystem 515 determines that $f_1$, must be used, based on the lookup table. Assigner subsystem 515 determines from the lookup table that:

Subcarrier baseband frequency $f_{s,1}$ is used for the first modulation operation described above, and Carrier frequency $f_{c,1}$ is used for the $2^{nd}$ modulation operation described above.

Figure 5C:
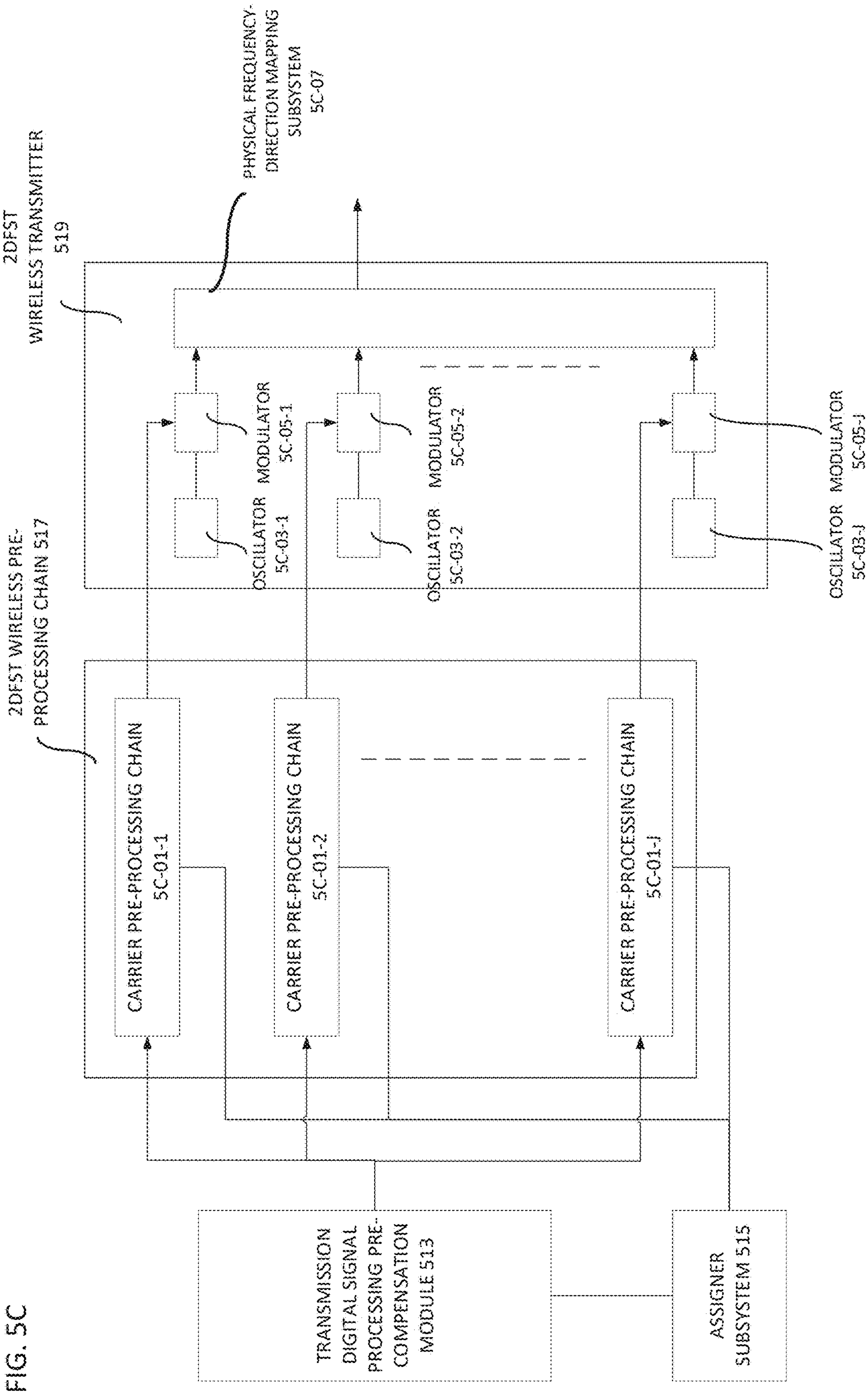
FIG. 5C illustrates a detailed embodiment of a RF or wireless pre-processing chain.
Figure 5D:
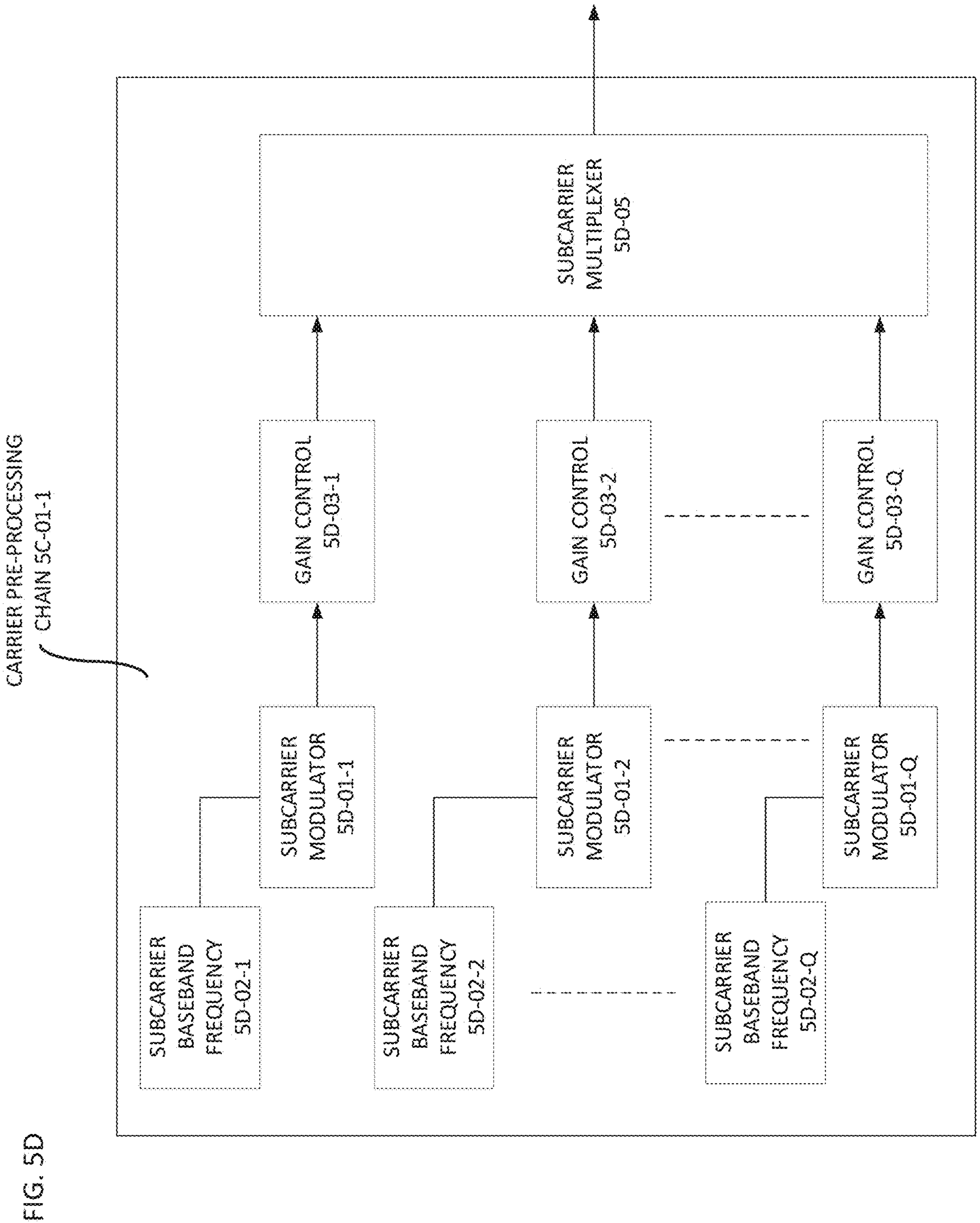
FIG. 5D illustrates a detailed embodiment of a carrier pre-processing chain.

Detailed embodiments of wireless pre-processing chain 517 are shown in FIGS. 5C and 5D. In FIG. 5C, wireless pre-processing chain 517 has J carrier pre-processing chains 5C-01-1 to 5C-01-J, wherein each carrier pre-processing chain is associated with one (1) of the J channels 5B-01-1 to 5B-01-J of FIG. 5B. Then, assigner subsystem 515 directs output signals from 2DFST transmission DSP pre-compensation module 513 to one of the carrier pre-processing chains 5C-01-1 to 5C-01-J based on the required carrier frequency $f_{c,j}$.

FIG. 5D shows one of the carrier pre-processing chains in detail. Carrier pre-processing chain 5C-01-1 comprises Q subcarrier modulators 5D-01-1 to 5D-01-Q, with each modulator corresponding to one (1) of the Q subcarriers.

In each of the subcarrier modulators, the data is modulated at a subcarrier baseband frequency corresponding to a subcarrier baseband frequency having a value $\lambda_{s,q}$ as explained above. For example, data input to subcarrier modulator 5D-01-1 is modulated at a subcarrier baseband frequency corresponding to subcarrier baseband frequency 5D-02-1 having a value $\lambda_{s,1}$. Then, assigner subsystem 515 directs output signals from 2DFST transmission DSP pre-compensation module 513 to one of the subcarrier modulators 5D-01-1 to 5D-01-Q based on the required subcarrier baseband frequency $f_{s,q}$.

After the subcarrier modulation, the output signal from each subcarrier modulator passes through one of the correspondingly communicatively coupled gain control blocks 5D-03-01 to 5D-03-Q. Then, as shown in FIG. 5D, the outputs from the gain control blocks 5D-03-01 to 5D-03-Q are multiplexed together in subcarrier multiplexer 5D-05.

Wireless pre-processing chain 517 is communicatively coupled to wireless transmitter 519. Then in step 6A-11, output from the subcarrier multiplexers such as subcarrier multiplexer 5D-05 is then sent on to 2DFST wireless transmitter 519 for transmission over wireless link 121.

Wireless transmitter 519 performs the tasks, among others, of:

Converting data into RF or wireless signals for transmission over a wireless link to a cell at the required frequency; and Ensuring that the wireless link is physically oriented in the correct direction, that is, the frequency is physically mapped to the correct direction. This physical mapping of frequency to direction is enabled using a physical frequency-direction mapping subsystem.

The task of converting data from electrical signals into wireless signals is now discussed, with regard to FIG. 5C. In FIG. 5C, outputs from the carrier pre-processing chains 5C-01-1 to 5C-01-J are used to modulate the corresponding oscillators 5C-03-1 to 5C-03-J, using corresponding modulators 5C-05-1 to 5C-05-J. For example, the output from carrier pre-processing chain 5C-01-1 is used to modulate corresponding oscillator 5C-03-1 using modulator 5C-05-1.

Each of the oscillators 5C-03-1 to 5C-03-J operates at the required carrier frequency $f_{c,j}$. Then when a signal located at subcarrier baseband frequency $f_{s,q}$ is used to modulate the output of the oscillator, the RF output signal from the modulator is located at $f_{jq}=f_{s,q}+f_{c,j}$ as previously explained.

In order to ensure that the frequency is physically mapped to the correct direction so that the modulator output is beamed in the required direction $\theta_{jq}$, a physical frequency-direction mapping subsystem 5C-07 is used as explained above.

An example embodiment of a physical frequency-direction mapping subsystem comprises using an appropriately configured transmit antenna coupled to the output of the modulator. Then, when a signal located at subcarrier baseband frequency $f_{s,q}$ is used to modulate the output of the laser at wavelength $f_{c,j}$, the modulated output is configured to be beamed in the required direction using, for example, beam steering based on the $f_{jq}$. That is, a wireless link such as wireless link 121 of FIG. 5A is created in the required direction $\theta_{jq}$, and the wireless link operates at $f_{jq}$.

Figure 5E:
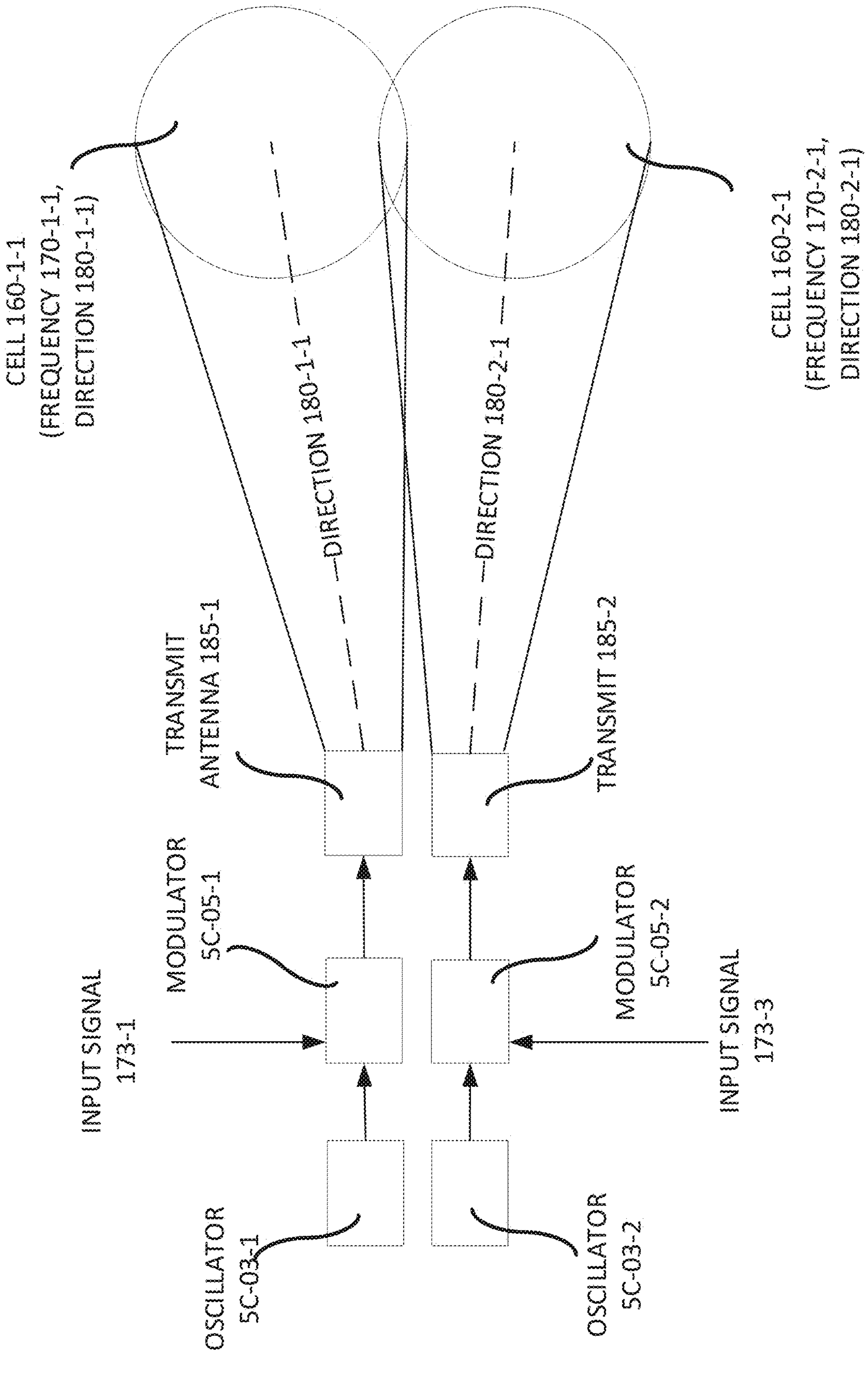
FIG. 5E illustrates an example embodiment of a physical frequency-direction mapping subsystem.

An example embodiment of this combination is shown in FIG. 5E. In FIG. 5E, oscillator 5C-03-1 operates at a carrier frequency 170-1, and oscillator 5C-03-2 operates at a carrier frequency 170-2. Input signal 173-1 is configured at a subcarrier baseband frequency such that the output from modulator 5C-05-1 is positioned at frequency 170-1-1. Input signal 173-2 is configured at a subcarrier baseband frequency such that the output from modulator 5C-05-2 is positioned at frequency 170-2-1.

Cell 160-1-1 is positioned at direction 180-1-1 with respect to 2DFST transmission 103.

Similarly: cell 160-2-1 is positioned at direction 180-2-1 with respect to 2DFST transmission 103. Then, transmit antenna 185-2 is appropriately oriented so that the output from modulator 5C-05-2 is beamed at direction 180-2-1. That is, a wireless link at frequency 170-2-1 with direction 180-2-1 is created.

Another example embodiment of a physical frequency-direction mapping subsystem is by utilizing a two-dimensional (2D) frequency scanning antenna. Utilizing a 2D frequency scanning antenna makes it possible to shape beams in both horizontal and vertical directions, resulting in improved capability of distinguishing the signals to and from multiple devices.

As explained in U.S. Pat. No. 7,994,969 B2 titled "OFDM Frequency Scanning Radar", and issued Aug. 9, 2011 to Van Caekenberghe et al; and Rahman M et al "Bandwidth enhancement and frequency scanning array antenna using novel UWB filter integration technique for OFDM UWB radar applications in wireless vital signs monitoring. Sensors. 2018 Sep. 19; 18(9):3155; the design of a one-dimensional (1D) frequency scanning antenna requires a series-fed array configuration, as opposed to a parallel-fed design. In such an arrangement, each array element is fed by a transmission line of a specific length or spaced within a waveguide structure, creating a progressive phase shift across different frequencies. This frequency-dependent phase variation results in beam steering, where different frequencies correspond to different steering angles. For radiating elements, these arrays typically employ aperture slots within a waveguide or monopole antennas, ensuring efficient radiation characteristics.

To extend this principle to a 2D frequency scanning antenna, an additional series-fed structure is implemented. In this configuration, multiple 1D frequency scanning arrays are arranged in a second dimension, with each array itself functioning as an element in a larger series-fed system.

To achieve 2D frequency scanning, the first dimension is established through frequency-dependent phase differences within each 1D array, ensuring beam steering along a primary axis. Subsequently, the entire set of 1D frequency scanning arrays is further series-fed, with precisely designed transmission line spacing, introducing an additional frequency-dependent phase shift in the second dimension. This results in a fully two-dimensional frequency scanning antenna, where beam steering occurs independently in both axes as a function of frequency.

By using a 2D antenna array to leverage frequency-dependent spatial mapping, beam steering is achieved passively through frequency variation in the frequency domain. This significantly reduces the number of ADCs, DACs, RF chains, and beamforming components required. This simplifies system architecture, lowers manufacturing costs, and improves energy efficiency, making high-performance multi-beam transmission feasible at a fraction of the cost. Additionally, the inherent frequency-based scanning mechanism enables instantaneous beam adaptation, overcoming the latency and processing bottlenecks of traditional phased arrays. This paves the way for scalable, cost-effective, and power-efficient high-speed wireless networks Then, when a signal located at subcarrier baseband frequency $f_{s,q}$ is used to modulate the output of the oscillator at frequency $f_{c,j}$, the modulated output is configured to be beamed in the required direction. That is, a wireless link such as wireless link 121 of FIG. 5A is created in the required direction $\theta_{jq}$, and the wireless link operates at $f_{jq}$.

In step 6A-13, the wireless signal is transmitted from wireless transmitter 519 over a wireless link. For example, wireless signals are transmitted over wireless link 121 to client 109 in cell (1,2); labelled as 160-1-2 in FIG. 4. Then, following the above indexing and notation, wireless link 121 operates at $f_{12}$ which is physically mapped to direction $\theta_{12}$.

As would be known to one of skill in the art, in some embodiments, wireless transmitter 519 comprises a transmission antenna which transmits over a full 3600 range in the horizontal plane, that is, where the azimuth lies.

Figure 5F:
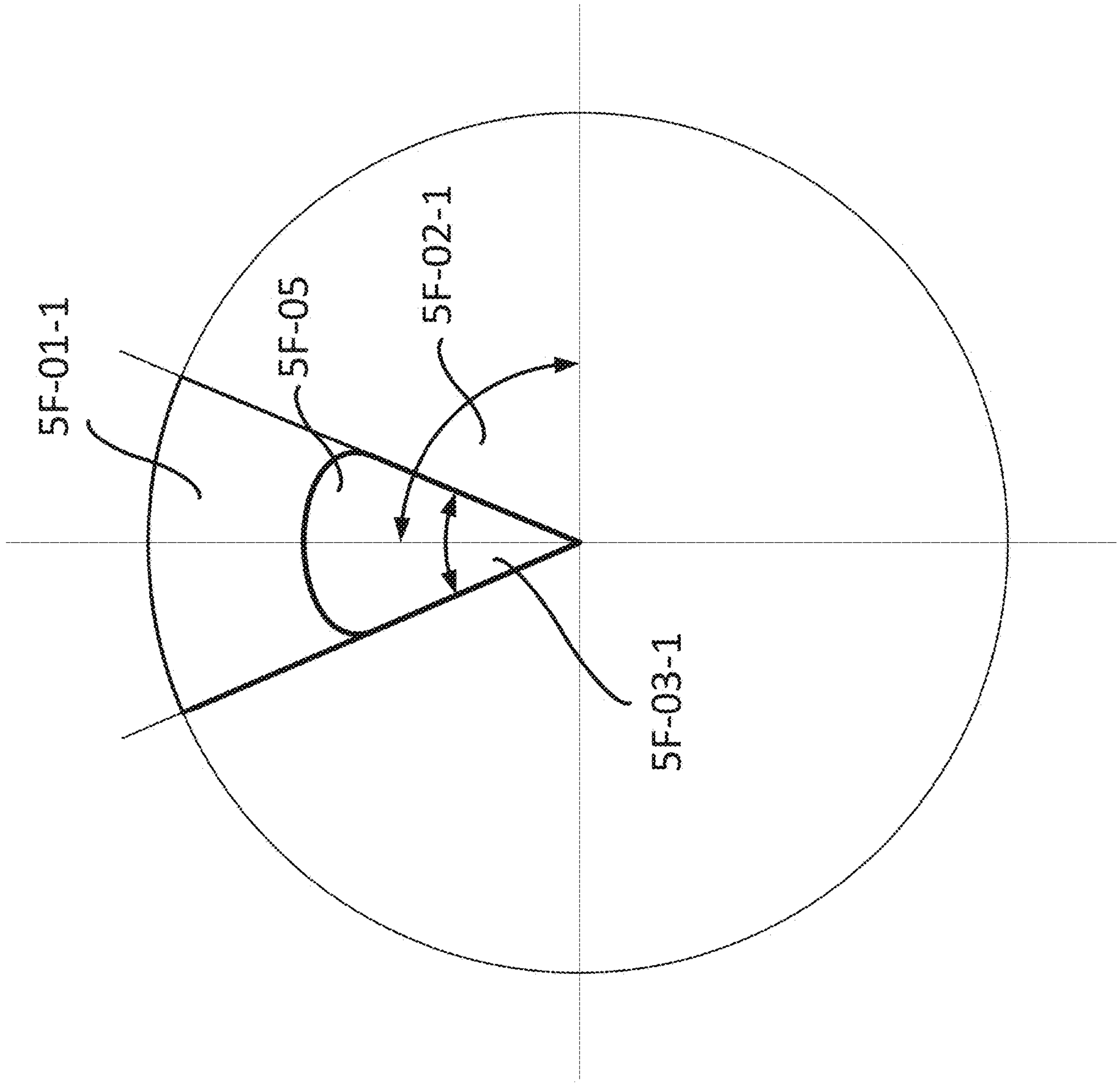
FIG. 5F illustrates an example embodiment of dividing a transmission range into non-overlapping sectors.

Then, in some embodiments, this range is divided into G non-overlapping sectors, wherein each sector has an angular width $(\Delta\phi)_g$ and centre angle $\phi_g$. An example is shown in FIG. 5F. In FIG. 5F, the 360° range is divided into G non-overlapping sectors. An example sector is 5F-01-1. Sector 5F-01-1 has centre angle $\phi_1$ denoted as 5F-02-1, and angular width $(\Delta\phi)_1$ denoted as 5F-03-1.

Using techniques known to those of ordinary skill in the art such as beam-forming and beam-steering, the radiation pattern of transmission antenna 519 is configured such that the main lobe covers one of the sectors.

In some embodiments, this comprises the antenna 519 creating a pencil beam such as beam 5F-05 for the $g^{th}$ sector where:

- the main lobe 5F-06 is centred at angle 5F-02-1; and
- the half-power beamwidth of the main lobe is related to 5F-03-1. For example, 5F-03-1 is the half-power beamwidth One of ordinary skill in the art would know that half-power beamwidth is not the only beamwidth that can be used. Other examples comprise the $(1/e^2)$ width, the Rayleigh beamwidth, the D4σ width and so on.

In some embodiments, the angular width of each sector is identical, that is, $(\Delta\theta)_1=(\Delta\theta)_2= \ldots =(\Delta\theta)_G=\Delta\theta$. In embodiments where the angular width of each sector is identical, the centre angle $\theta_g$ is given by $$\frac{2\pi(a-1)}{G}$$

where a=1, 2, 3, . . . G

As one of ordinary skill in the art would understand, G depends on the nature of the division of the coverage area 305 into cells. For example: As explained previously, in some embodiments, cell (j,q) is positioned at a direction $\theta_{jq}$, where $\theta_{jq}$ is denoted by a combination of azimuth and elevation. Then, in some of these embodiments, the azimuth component of the combination corresponds to $\phi_g$.

For example, in some embodiments the coverage area is configured such that the elevation component of the combination set equal to zero. Then, in some embodiments, the coverage area is subdivided into cells such that each cell corresponds to one sector, that is, G=(J×Q).

Many of the components of 2DFST transmission 103 are communicatively coupled to client feedback subsystem 555. As will be explained below, this enables client feedback subsystem 555 to make adjustments as necessary. In some embodiments, this communicative coupling is achieved using wireless link 123, which is explained further below.

The operation of client reception 155 in client 109 is now described with reference to FIG. 5G and the reception sequence 6B-00 shown in FIG. 6B.

Figure 6B:
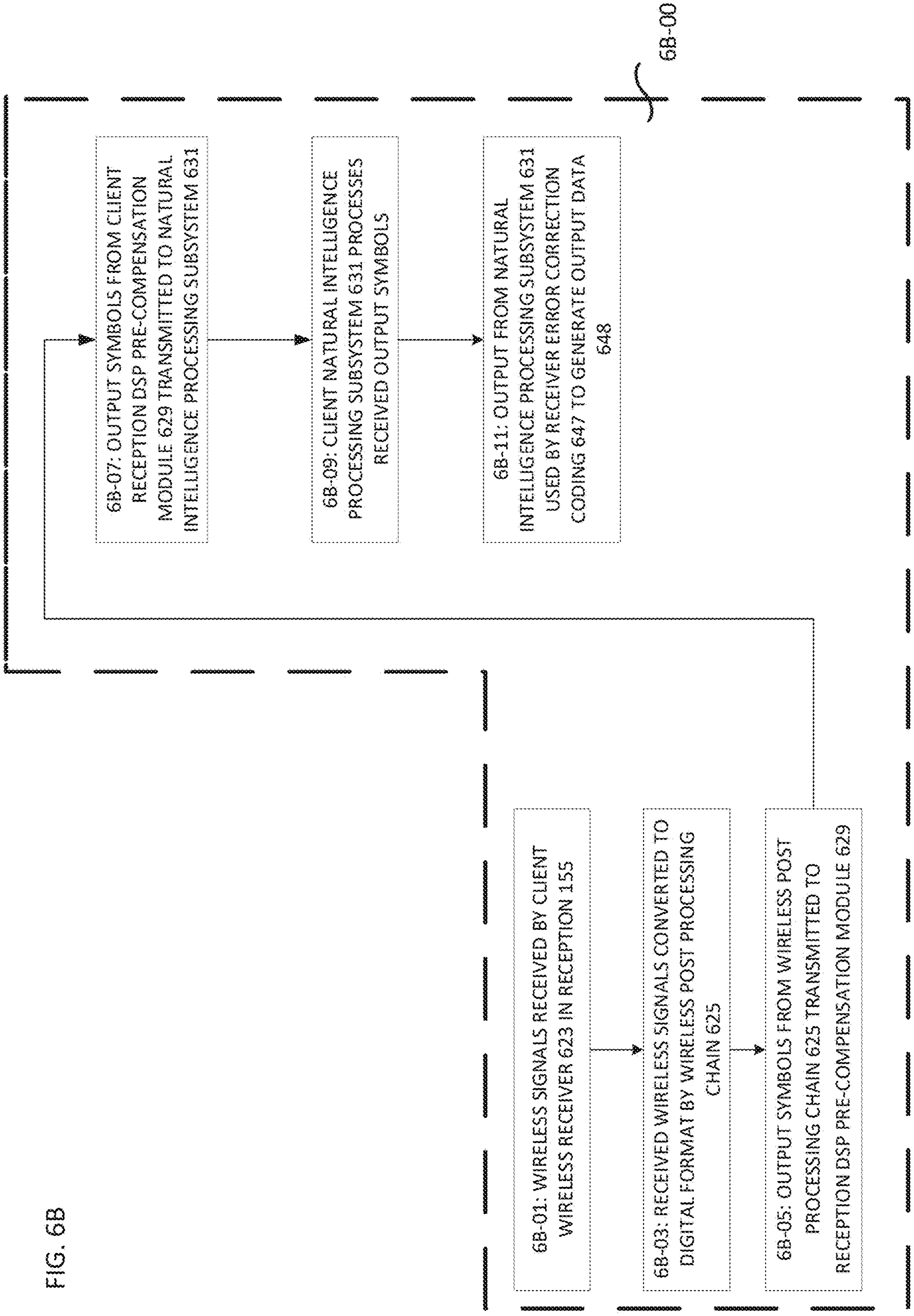
FIG. 6B illustrates an example embodiment of a reception sequence in a client reception.

In step 6B-01 of FIG. 6B, a wireless signal is received from wireless link 121 by client wireless receiver 623 comprising, for example, a receive antenna. As explained previously, since the direction $\theta_{12}$ of the host device 102 is known with regard to the client 109, the receive antenna for receiver 623 is correctly configured.

In some embodiments, receiver 623 comprises a receive antenna with a mixer. Then, as would be known to one of ordinary skill in the art, an oscillator operating at the correct frequency for the cell would be used in this configuration. Referring to FIG. 4, since cell 160-1-2 uses operating frequency 160-1-2, then the oscillator would also operate at frequency 160-1-2. In some embodiments, a tunable oscillator is used in the mixer. In yet other embodiments, the tunable oscillator is communicatively coupled to the client feedback subsystem 555 to enable changes to made to the operating frequency as required by the client device 109.

In step 6B-03, the detected wireless signal is sent to client wireless post-processing chain 625 for conversion into digital format. These conversion operations are known to those of ordinary skill in the art and will not be discussed in detail here.

In step 6B-05, this digitally formatted signal is then fed to a client reception DSP pre-compensation module 629. The operation of a reception DSP pre-compensation module is known to those of skill in the art and will not be discussed in detail here.

In step 6B-07: the output symbols from client reception DSP pre-compensation module 629 are then transmitted to client NI processing subsystem 631.

In step 6B-09: client NI processing subsystem 631 receives the output symbols, and performs the necessary operations to carry out its role as the central cognitive brain or cognitive processor in a wireless system. In some embodiments, steps 6B-09 and 6B-11, which are described below, are performed in parallel.

In this role, client NI processing subsystem 631 controls many of the processes that underpin the transmission and reception of wireless signals in the wireless system. Client NI processing subsystem 631 enhances system intelligence and adaptability.

Client NI processing subsystem 631 is communicatively coupled to client reception error correction decoding 647. This enables client NI processing subsystem 631 to optimize the efficiency and efficacy of the wireless system even in steady-state.

Figure 5G:
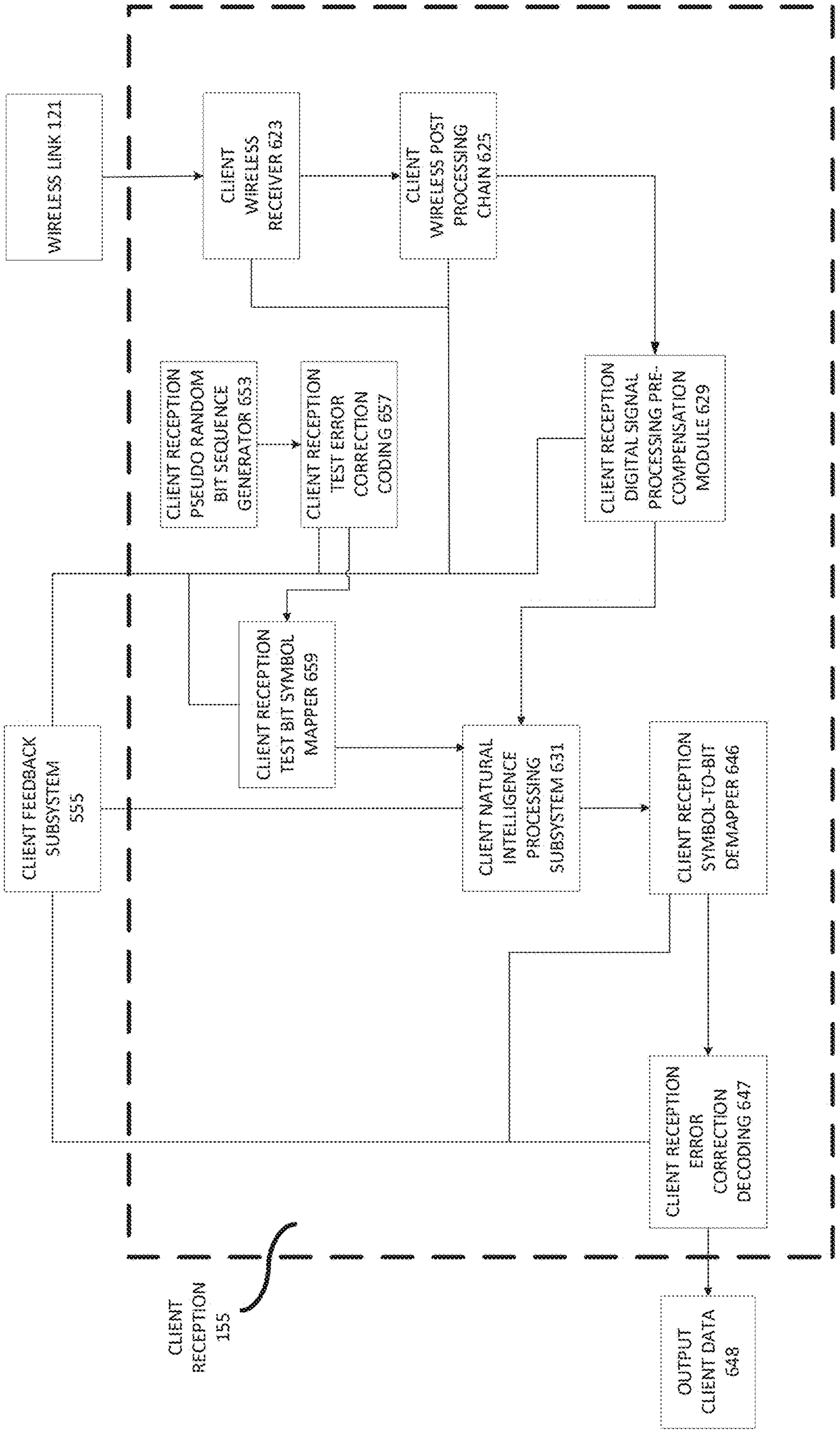
FIGS. 5G and 5H illustrate an example embodiment of a reception subsystem in a client device.
Figure 5H:
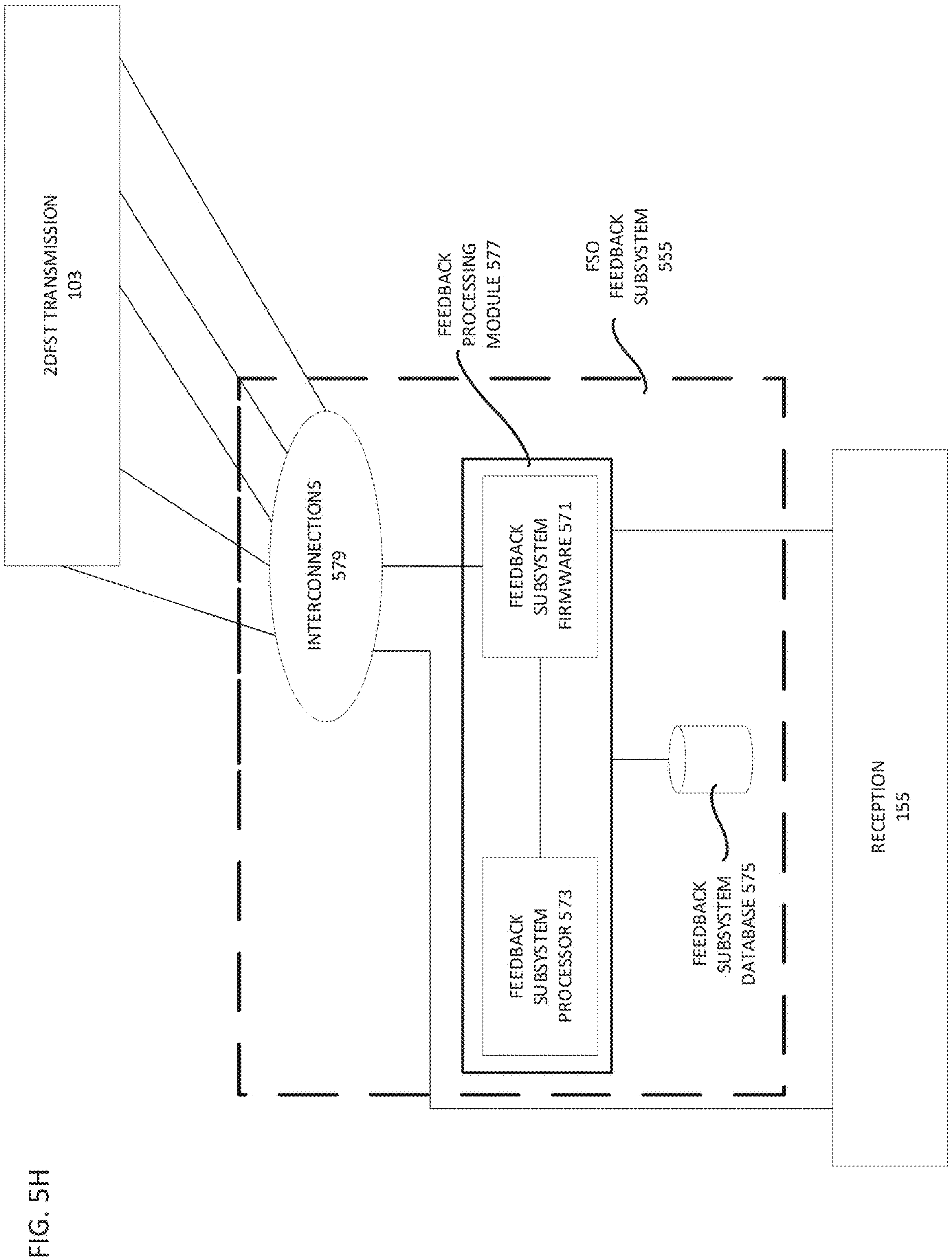

As shown in FIG. 5G, client NI processing subsystem 631 is communicatively coupled to client feedback subsystem 555. Client NI processing subsystem 631 provides actions to client feedback subsystem 555 so as to implement a continuous feedback loop, as will be discussed below.

The strategic placement of client NI processing subsystem 631 allows for pre-emptive adjustments and fine-tuning. This enhances the resilience and adaptability of the wireless system, ensuring robust communication even in the face of variable network conditions and impairments.

Step 6B-09 of FIG. 6B comprises a series of steps, which are now discussed in detail in conjunction with FIGS. 7A, 7B, 7C, 8, 9A-D, 10A-B and 11. In some embodiments, step 6B-09 comprises a perception-action cycle.

Figure 7A:
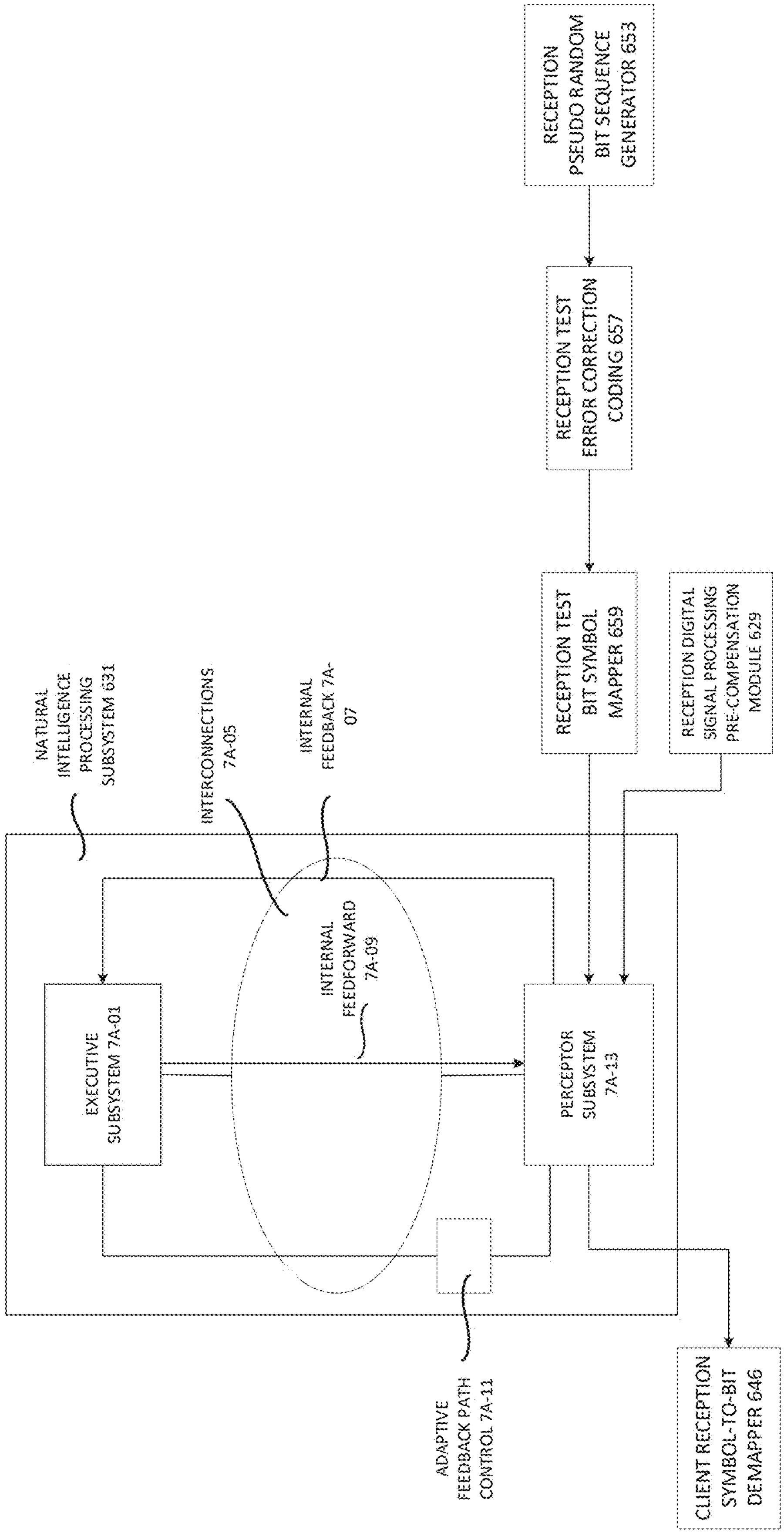
FIG. 7A illustrates a detailed embodiment of a client NI processing subsystem.

FIG. 7A shows a detailed embodiment of client NI processing subsystem 631. In FIG. 7A, perceptor subsystem 7A-13 is communicatively coupled to executive subsystem 7A-01 via interconnections 7A-05.

Channels are set up between perceptor subsystem 7A-13 and executive subsystem 7A-01 via interconnections 7A-05. Examples of these channels are:

- Internal feedforward channel 7A-09, which is set up to direct internal feedforward signals from executive subsystem 7A-01 to perceptor subsystem 7A-13; and
- Internal feedback channel 7A-07 which is set up to direct internal feedback signals from perceptor subsystem 7A-13 to executive subsystem 7A-01.

Adaptive feedback path control module 7A-11 is communicatively coupled to both perceptor subsystem 7A-13 and executive subsystem 7A-01 using, for example, an adaptive feedback path channel set up via interconnections 7A-05. Adaptive feedback path control module 7A-11 performs the role of dynamically adjusting the system's behavior based on real-time evaluations. Example processes performed include:

- processing such as estimating BERs,
- relaying the results of these processing operations to executive subsystem 7A-01, and
- directing main feedback signals from perceptor subsystem 7A-13 to executive subsystem 7A-01.

In some embodiments, adaptive feedback path control module 7A-11 is implemented in hardware. In other embodiments, adaptive feedback path control module 7A-11 is implemented in software. In yet other embodiments, adaptive feedback path control module 7A-11 is implemented using a combination of software and hardware.

Figure 7B:
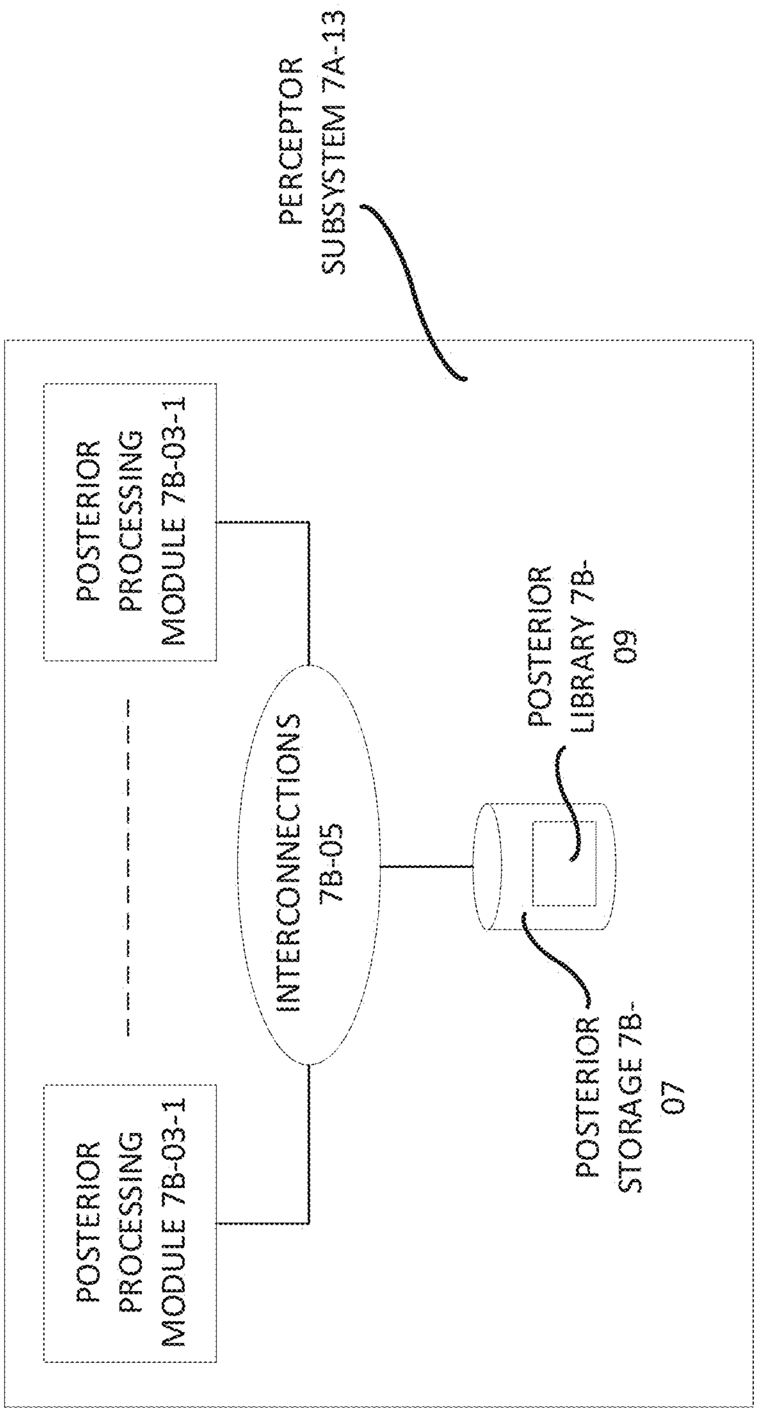
FIG. 7B illustrates an example embodiment of a perceptor subsystem.

FIG. 7B shows a detailed embodiment of perceptor subsystem 7A-13. In FIG. 7B, perceptor subsystem 7A-13 comprises one or more posterior processing modules 7B-03-1 to 7B-03-N. Posterior processing modules 7B-03-1 to 7B-03-N can be implemented in a variety of ways. In some embodiments, posterior processing modules 7B-03-1 to 7B-03-N are implemented in hardware. In other embodiments, posterior processing modules 7B-03-1 to 7B-03-N are implemented in software. In yet other embodiments, posterior processing modules 7B-03-1 to 7B-03-N are implemented in a combination of hardware and software. In some embodiments, posterior processing modules 7B-03-1 to 7B-03-N comprise a plurality of components. In some embodiments, posterior processing modules 7B-03-1 to 7B-03-N comprise at least one processor.

These one or more posterior processing modules 7B-03-1 to 7B-03-N are communicatively coupled to posterior storage 7B-07 via perceptor subsystem interconnections 7B-05. Perceptor subsystem interconnections 7B-05 are implemented using appropriate communication technologies known to those of ordinary skill in the art.

Posterior storage 7B-07 stores posterior library 7B-09. In some embodiments, posterior storage 7B-07 comprises a database, which is implemented using database techniques known to those of ordinary skill in the art. Data stored in the database is indexed, using techniques known to those of ordinary skill in the art. In some embodiments, the posterior storage 7B-07 is made searchable using techniques known to those of ordinary skill in the art. For example, the posterior storage 7B-07 is implemented as a database.

Posterior library 7B-09 stores a plurality of posterior models. Posterior models are statistical models that capture the wireless behavior. In some embodiments, these models are indexed using launch and transmission parameters. These parameters include, for example:

- data rate,
- baud rate,
- launch power,
- location of client, cell (j,q), and other factors affecting the wireless link.

These indexing parameters enable posterior library 7B-09 to be searchable. By storing historical data, the posterior library 7B-09 provides the system with the flexibility to respond to new or unexpected conditions and changes. Examples of changes include, for example, turbulence, other changes in atmospheric conditions, or new actions initiated by the executive subsystem 7A-01. Then, when new conditions or changes are proposed or arise, the historical data stored in the posterior library 7B-09 can be searched to identify the closest matching posterior model based on the indexing parameters.

In some embodiments, as shown in FIG. 4 there is overlap between cells for certain locations. Then for each location, posterior models for each cell used at that location are stored and indexed to enable decision making as discussed further below.

Figure 7C:
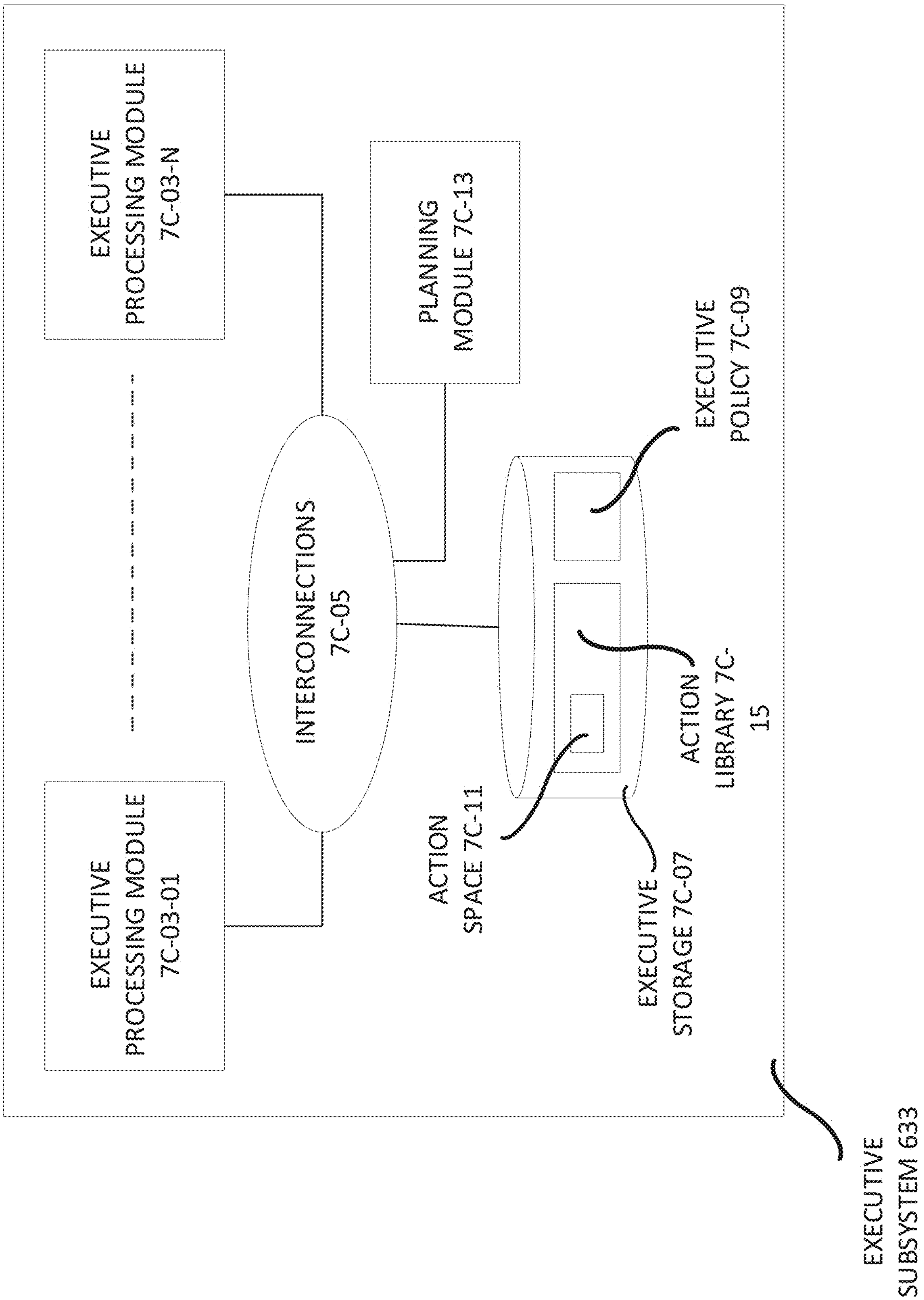
FIG. 7C illustrates an example embodiment of an executive subsystem.

FIG. 7C shows a detailed embodiment of executive subsystem 7A-01. In FIG. 7C, executive subsystem 7A-01 comprises planning module 7C-13. Planning module 7C-13 identifies and extracts a series of prospective actions from the action library 7C-15, which will be explained further below. In some embodiments, initially, the planning module 7C-13 chooses a starting action at the first PAC based on pre-adaptive actions. As explained previously, pre-adaptive actions are predetermined actions designed to be effective before the NI has had a chance to learn or adapt from experience.

Additionally, the planning module 7C-13 is responsible for updating the type of actions to be taken. Planning module 7C-13 performs an update process through both internal feedback channel 637 and internal feedforward channel 7A-09, forming a shunt cycle. This cycle allows for a dynamic adjustment of the system's parameters in real-time, enabling the Client NI processing subsystem 631 to adapt to new information or changes in the environment swiftly. For example, planning module 7C-13 sends internal commands to the perceptor subsystem 633 via internal feedforward channel 7A-09 to, for example, modify the precision factor or focus level used by one or more posterior processing modules 7B-03-1 to 7B-03-N. Planning module 7C-13 sends requests to one or more posterior processing modules 7B-03-1 to 7B-03-N to retrieve data such as posterior models from posterior library 7B-09 or discretized data vectors. Retrieved data is sent from one or more posterior processing modules 7B-03-1 to 7B-03-N to planning module 7C-13 via internal feedback channel 637, for use in virtual environmental prediction, as is discussed further below. In some embodiments, planning module 7C-13 is implemented in hardware. In other embodiments, planning module 7C-13 is implemented in software. In yet other embodiments, posterior planning module 7C-13 is implemented in a combination of hardware and software. In some embodiments, planning module 7C-13 comprises a plurality of components interconnected together. In some embodiments, posterior planning module 7C-13 comprise at least one processor.

The executive subsystem 7A-01 comprises one or more executive processing modules 7C-03-01 to 7C-03-N. In some embodiments, these one or more executive processing modules 7C-03-01 to 7C-03-N act to perform processing tasks in the executive subsystem 7A-01 which are not performed by planning module 7C-13. In other embodiments, these one or more executive processing modules 7C-03-01 to 7C-03-N act to support planning module 7C-13, when planning module 7C-13 performs its processing tasks.

In some embodiments, one or more executive processing modules 7C-03-01 to 7C-03-N is implemented in hardware. In other embodiments, one or more executive processing modules 7C-03-01 to 7C-03-N is implemented in software. In yet other embodiments, one or more executive processing modules 7C-03-01 to 7C-03-N is implemented in a combination of hardware and software. In some embodiments, one or more executive processing modules 7C-03-01 to 7C-03-N comprise a plurality of components interconnected together. In some embodiments, one or more executive processing modules 7C-03-01 to 7C-03-N comprise at least one processor.

The executive subsystem 7A-01 comprises executive storage 7C-07. Executive storage 7C-07 is implemented using storage techniques known to those of ordinary skill in the art. In some embodiments, executive storage 7C-07 comprises a database implemented using techniques known to those of ordinary skill in the art. Executive storage 7C-07 stores action space 7C-11, action library 7C-15 and executive policy 7C-09. In some embodiments, data stored in executive storage 7C-07 is indexed, using techniques known to those of ordinary skill in the art. In some embodiments, executive storage 7C-07 is searchable.

Action library 7C-15 comprises action space 7C-11, which in turn comprises the set of all possible actions available to take in response to different conditions or scenarios. In some embodiments, the set of all possible actions available comprises pre-adaptive actions, which are predetermined actions designed to be effective before the system has had a chance to learn or adapt from experience. In some embodiments, the actions in action space 7C-11 are indexed. Action space 7C-11 further comprise environmental actions and internal commands. Environmental actions and internal commands will be further explained below, along with examples.

Executive policy 7C-09 outlines the objectives that the NI aims to achieve using the PAC. Executive policy 7C-09 sets the desired targets for RF. In some embodiments, these targets comprise a balance between accurate cognitive decision-making and the associated computational costs of achieving that accuracy. Policies are either simple or complex based on the goals and the operational context of the NI.

To illustrate, the executive policy 7C-09 sets a goal known as the focus level accuracy threshold, which defines the accuracy objective of the Client NI processing subsystem 631 decision-making at a specific focus level m while staying within the desired complexity threshold. The focus level m provides an indication of context depth. In some embodiments, the focus level m is the number of received symbols prior to a received symbol, as will be explained below. The focus level accuracy threshold is also referred to as the $AT_m$, and these two terms are used interchangeably below. In some embodiments, the $AT_m$ at different focus levels reflect the different computational complexity requirements at these levels. For example, at the focus level $m=1$ the $AT_m$ is higher than at base focus level $m=0$, to recognize that the cost of computational complexity due to the more detailed modeling required at the higher level necessitates a higher accuracy to compensate. This adaptive mechanism enables the Client NI processing subsystem 631 to optimize performance based on the trade-offs between accuracy and computational resources, thereby making more informed decisions that align with the set policy goals. In some embodiments, the focus level accuracy threshold is set externally by clients or parties who have the necessary access credentials.

Planning module 7C-13, executive processing modules 7C-03-01 to 7C-03-N and executive storage 7C-07 are coupled to each other via executive subsystem interconnections 7C-05. Executive subsystem interconnections 7C-05 are implemented using appropriate communication technologies known to those of ordinary skill in the art.

As explained above, in some embodiments, steps 6B-09 and 6B-11, which is described below, are performed in parallel. Then, for example:

- a copy of the output signal from the subcarrier processing, which comprises symbols is made by one or more posterior processing modules 7B-03-1 to 7B-03-N; or
- some portion of the output signal from the subcarrier processing is split from the output signal by one or more posterior processing modules 7B-03-1 to 7B-03-N.

Either the copy or the split portion is then used by one or more posterior processing modules 7B-03-1 to 7B-03-N to perform the operations within steps 6B-09.

The output signal is then sent to reception symbol-to-bit demapper 646 to perform step 6B-11 as is described below.

Figure 8:
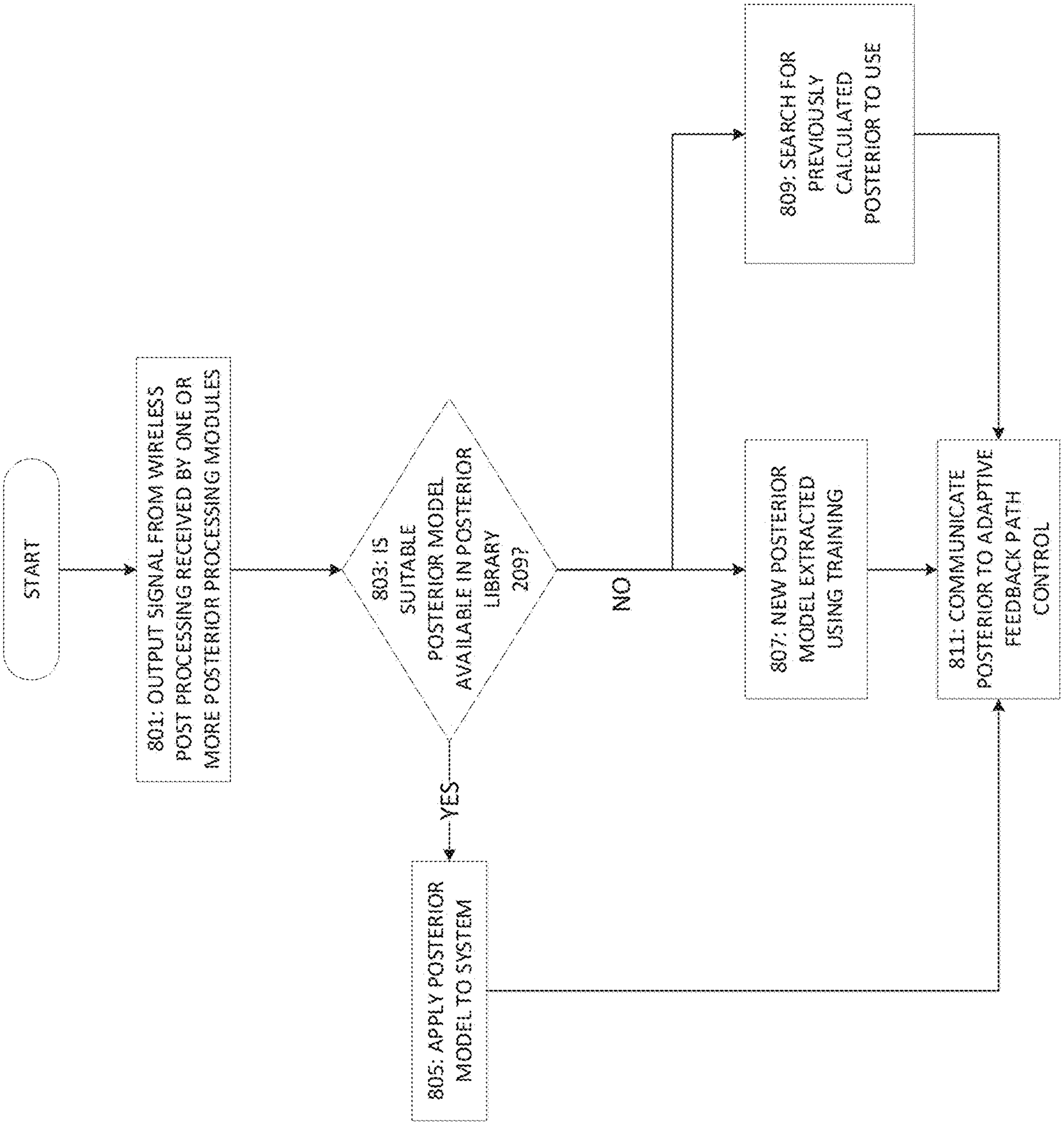
FIG. 8 illustrates an example embodiment of a perceptor posterior processing flow.

As part of step 6B-09 of FIG. 6B, perceptor posterior processing is performed. An example embodiment of a perceptor posterior processing flow is illustrated in FIG. 8. In step 801 of FIG. 8 the output signal from reception DSP pre-compensation module 129 comprising symbols is received by one or more posterior processing modules 7B-03-1 to 7B-03-N.

Within the context of a PAC, the output signal from the client reception digital signal processing pre-compensation module 629 comprising symbols represents the perceptions. Based on these perceptions, appropriate actions are chosen, as explained below.

In step 803 one or more posterior processing modules 7B-03-1 to 7B-03-N then communicate with posterior storage 7B-07 to search posterior library 7B-09 with the aim of finding a suitable posterior model which captures the behavior of RF. As previously explained, in some embodiments, this comprises searching the parameters used to index the posterior model to find the closest match to the current system parameters. For example, when:

- a data rate of 10 Gbps is used in the RF,
- posterior library 7B-09 does not yet have a posterior model specific to this rate, and
- the closest matching posterior model is for a data rate of 9 Gbps, then the posterior model corresponding to a 9 Gbps data rate is retrieved from the library.

When a suitable posterior model is found in step 803, this posterior model is applied to the current operational parameters of the system in step 805.

When a suitable posterior model is not found in step 803, in some embodiments, in step 807 one or more posterior processing modules 7B-03-1 to 7B-03-N initiate the extraction of a new posterior model to minimize the estimated bit error rate (BER), which is a critical performance metric in wireless communications; by extracting a fitting using model using training data sets comprising PRBS data. This stands in contrast to approaches used in other works, where a database is used for training rather than PRBS data. As explained previously, using PRBS data solves a major issue faced by systems which require training such as machine learning and AI systems, as it removes the need to rely on large databases of training data.

Then, training data comprising PRBS data generated by transmission PRBS generator 101 is used to extract a fitting posterior model. As explained previously, transmission PRBS generator 101 works in synchronization with reception PRBS generator 653 to produce the same data. Processes to produce the PRBS data and synchronize the two PRBS generators are known to those of ordinary skill in the art and will not be discussed in detail. In some embodiments, this comprises generating PRBS data offline, and then storing it within reception PRBS generator 653 for use as needed. An example is given in Chen M, Deng R, Chen Q, He J, Chen L. Real-time system based on FPGA for wireless communication system. In Metro and Data Center RF Networks and Short-Reach Links 2018 Jan. 30 (Vol. 10560, pp. 10-25). SPIE.

As is customary in systems which use training, some portion of the training PRBS data is set aside for testing, and not used for model training. An example is where 20% of the data is set aside for testing, and the remaining 80% of the data is used for training. In some embodiments, between 60% and 90% of the data is used for training, and the remaining portion is used for testing.

In other embodiments, "leave k % out cross-validation" is performed. Then, the training data set is split into $$\left(\frac{100}{k}\right)$$

portions, and $$\left(\frac{100}{k}\right)$$

iterations of training and testing are performed, In each iteration, a different one of the portions is left out from training and used for testing, and the remaining portions are used for training. For example, when k=20%, the training data set is split into $$\left(\frac{100}{20}\right) = 5$$

portions and 5 iterations of training and testing are performed. In each iteration, a different one of the 5 portions of the training data is left out from training and used for testing, and the remaining 4 portions are used for training. This approach lowers the chance of overfitting. One of ordinary skill in the art would understand that k % is set based on, for example, previous results.

This newly identified posterior model is then stored in the posterior library 7B-09 for future reference and employed in subsequent decision-making processes.

Figure 9A:
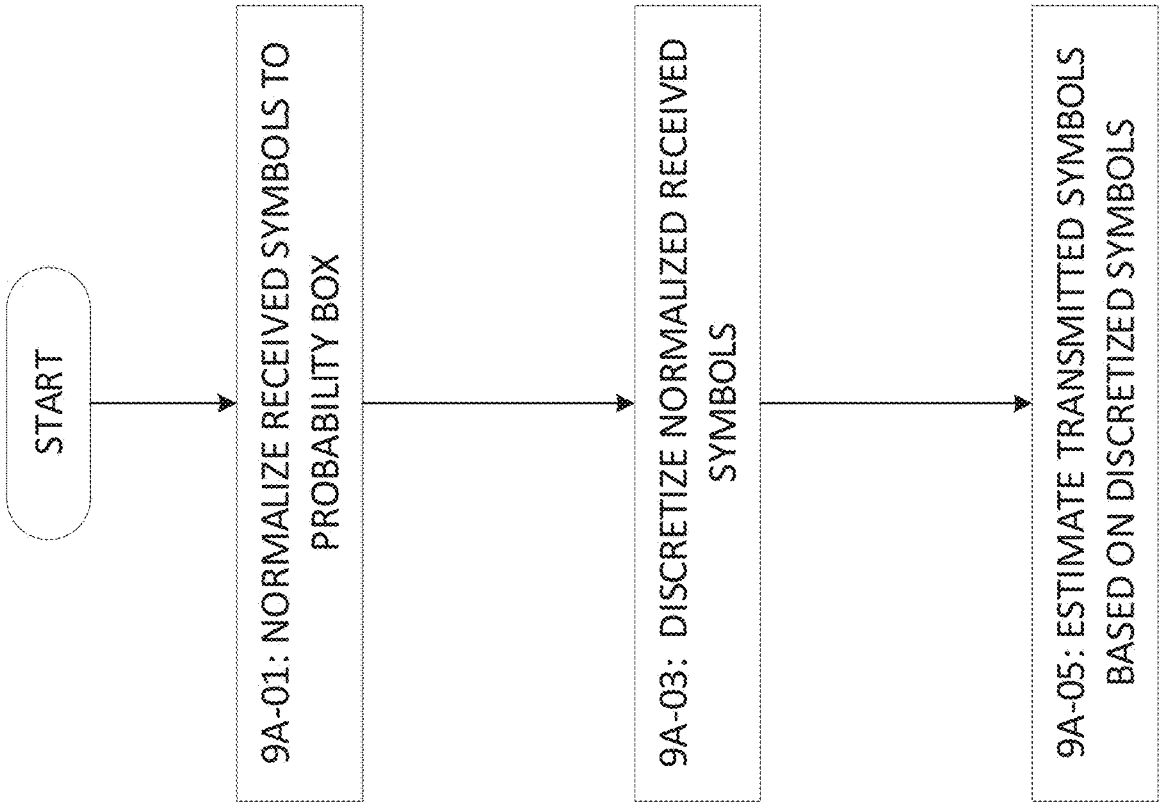
FIG. 9A illustrates an example embodiment of a posterior extraction processing flow.

FIG. 9A shows an example embodiment of a posterior extraction processing flow using training, performed by posterior processing modules 7B-03-1 to 7B-03-N for a focus level, m.

As explained previously, the output signal from the subcarrier processing comprises a plurality of symbols. This received plurality of symbols spans a broad spectrum of values. In step 9A-01, the received plurality of symbols is normalized to a probability box, to reduce the resulting complexity.

Figure 9B:
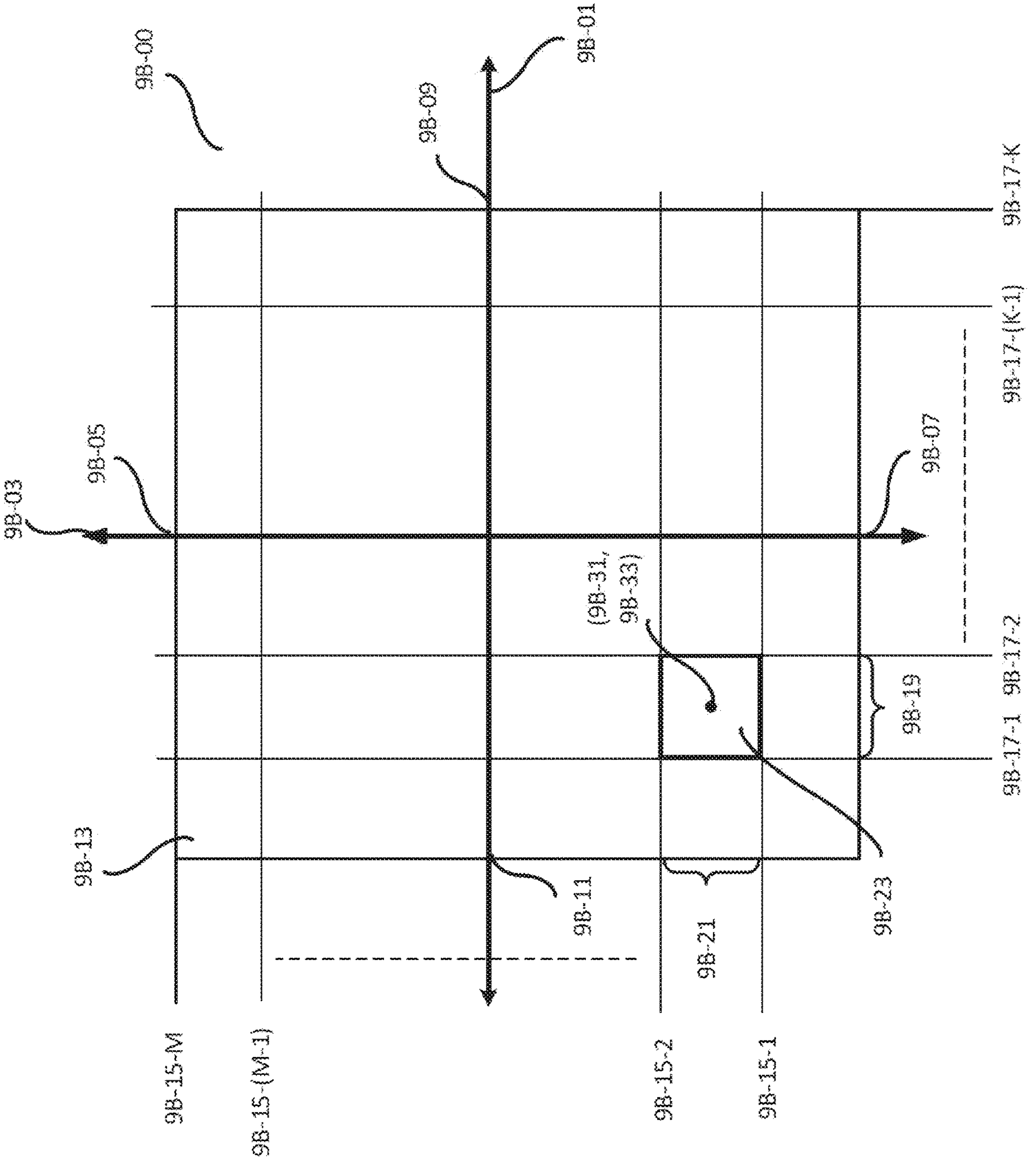
FIG. 9B illustrates a signal space for an example embodiment of a posterior extraction processing flow.

The process of normalization is described below with further reference to the signal space diagram in FIG. 9B. In FIG. 9B, signal space 9B-00 is spanned by in-phase axis 9B-01 and quadrature axis 9B-03. Probability box 9B-13 is defined in space 9B-00, wherein values that fall within the following boundaries are considered to lie within the box:

In-phase boundaries: In-phase minimum 9B-11 and in-phase maximum 9B-09; and Quadrature boundaries: Quadrature minimum 9B-07 to quadrature maximum 9B-05.

The probability box percentage denotes the proportion of the received plurality of symbols that fall within the probability box. In some embodiments, the in-phase and quadrature boundaries are determined based on a probability box percentage threshold. For example, when the probability box percentage threshold is 95%, then the in-phase and quadrature boundaries are set accordingly to obtain a probability box percentage at or above this probability box percentage threshold. In some embodiments, the probability box percentage is determined based on the estimated BER, as explained in, for example, in Naghshvarianjahromi, M.; Kumar, S.; Deen, M. J. Brain Inspired Dynamic System for the Quality of Service Control over the Long-Haul Nonlinear Fiber-Optic Link. Sensors 2019, 19, 2175; hereinafter referred to as "Naghshvarianjahromi 1". As explained in Naghshvarianjahromi 1, estimated BER is directly correlated with probability box percentage, which in turn is inversely correlated to probability box size. Then, the probability box size is increased to reduce BER. However larger probability box size leads to higher computational cost, as will be explained below. Then, in some embodiments, the probability box size is set so as to achieve a threshold BER while keeping computational cost low.

In other embodiments, the in-phase and quadrature boundaries are set based on the available memory. This is useful when, for example, the perceptor subsystem 7A-13 is implemented on a chip, such as an FPGA or ASIC, where storage capacity is limited. A process to set the in-phase and quadrature boundaries based on available memory is explained below. The relationship between storage capacity and the probability box is explained further below.

Then, for received symbols that fall within the probability box 9B-13, the normalized received symbols have the same in-phase and quadrature values as the received symbol. For received symbols that fall outside probability box 9B-13, the normalized received symbols take on the in-phase and quadrature values of the nearest boundaries. An example is demonstrated below. In this example, probability box 9B-13 has the following boundaries:

the in-phase minimum 9B-11 is set to −3, the in-phase maximum 9B-09 is set to 3, the quadrature minimum 9B-07 is set to −3j, and the quadrature maximum 9B-05 is set to 3j.

Then, when the symbol 7-5j which falls outside the probability box, is received, it is normalized to the nearest point on the boundary of the probability box, which is 3-3j.

In some embodiments, a probability box such as probability box 9B-13 is defined for each intermediate focus level i where i is between 0 and m, and PAC k. Then, the boundaries for focus level m for PAC k, are hereinafter referred to as follows:

The in-phase minimum, such as in-phase minimum 9B-11, is referred to as $$x_{min}^{k,i},$$

The in-phase maximum, such as in-phase maximum 9B-09, is referred to as $$x_{max}^{k,i},$$

The quadrature minimum, such as quadrature minimum 9B-07, is referred to as $$y_{min}^{k,i},$$

and

The quadrature maximum, such as quadrature maximum 9B-05, is referred to as $$y_{max}^{k,i}.$$

The normalized received symbol is hereinafter referred to as $$\overline{Y}_n^{k,m},$$

where:

k is defined as the perception-action cycle (PAC) number, n is the index of the current symbol, m represents the focus level for perception-action cycle (PAC) number k, where m ranges from 0 to M, the maximum focus level. As explained previously, the focus level provides an indication of context depth. In some embodiments, the focus level m is the number of received symbols prior to received symbol n, which is used to predict the transmitted symbol n.

Normalized received symbol $$\overline{Y}_n^{k,m}$$

is then used for further processing.

In step 9A-03, normalized received symbol $$\overline{Y}_n^{k,m}$$

is discretized. Processes and equations to set the discretization parameters are now described.

Axis discretizations are performed for the in-phase and quadrature axes. In some embodiments, for each intermediate focus level i between 0 and the focus level m, an in-phase discretization step $$\Delta x_i^k$$

and the quadrature discretization step $$\Delta y_i^k$$

are defined for PAC k as follows:

$$\Delta x_i^k = \frac{x_{max}^{k,i} - x_{min}^{k,i}}{N_x^{k,i}} \quad \text{(Equation 1)}$$

$$\Delta y_i^k = \frac{y_{max}^{k,i} - y_{min}^{k,i}}{N_y^{k,i}}$$

where:

$$N_x^{k,i}$$

is the number of in-phase discretization steps for PAC k and intermediate focus level i, and $$N_y^{k,i}$$

is the number of quadrature discretization steps for PAC k and intermediate focus level i.

In some embodiments, the in-phase discretization step is the same as the quadrature discretization step. In other embodiments, the in-phase discretization step is not equal to the quadrature discretization step.

Then, the axes are discretized based on the discretization steps. For example, in FIG. 9B, in-phase axis 9B-01 is discretized into K discretized in-phase points, wherein consecutive discretizes in-phase points are separated by an in-phase discretization step. Then K is equal to $$N_x^{k,i}.$$

For example, consecutive discretized in-phase points 9B-17-1 and 9B-17-2 on the in-phase axis 9B-01 are separated by in-phase discretization step 9B-19.

Similarly, quadrature axis 9B-07 is discretized into M discretized quadrature points, wherein consecutive discretized quadrature points are separated by a quadrature discretization step. M is then equal to $$N_y^{k,i}.$$

For example, consecutive discretized quadrature points 9B-17-1 and 9B-17-2 are separated by quadrature discretization step 9B-21.

Based on the discretization of the in-phase and quadrature axes, discretization cells are formed. For example, referring to FIG. 9B, discretization cell 9B-23 is bounded by 9B-17-1 and 9B-17-2 on the in-phase axis, and 9B-15-1 and 9B-15-2 on the quadrature axis. Each cell has dimensions $$(\Delta x_i^k \times \Delta y_i^k).$$

Then a precision factor is assigned for each intermediate focus level i for PAC k. In some embodiments, an in-phase precision factor is calculated based on the in-phase discretization step, and a quadrature discretization step is calculated based on the quadrature discretization step.

In some of the embodiments where the in-phase discretization step is the same as the quadrature discretization step, the in-phase precision factor is equal to the quadrature precision factor. This common precision factor is denoted as $$PF_i^k.$$

An example relationship between the precision factor, in-phase discretization step and quadrature discretization step for embodiments where the in-phase discretization step is equal to the quadrature discretization step is given as:

$$PF_i^k = 10\Delta x_i^k = 10\Delta y_i^k,\ 0 \le i \le m, \quad \text{(Equation 2)}$$

Then, a precision factor vector for focus level m and PAC k, $PF^{k,m}$ which has its elements the common precision factor for each intermediate focus level i is denoted as:

$$PF^{k,m} = [PF_0^k, PF_1^k, \ldots, PF_i^k, \ldots, PF_m^k] \quad \text{(Equation 3)}$$

The number of decision tree branches $$F_i^k$$

at each intermediate focus level i is computed as the product of $$N_x^{k,i} \text{ and } N_y^{k,i}:$$

$$F_i^k = N_x^{k,i} N_y^{k,i} \quad \text{(Equation 4)}$$

Using Equations 1 and 2, $$N_x^{k,i} \text{ and } N_y^{k,i}$$

can be computed based on the precision factor are shown below:

$$N_x^{k,i} = \frac{10(x_{max}^{k,i} - x_{min}^{k,i})}{PF_i^k} \quad \text{(Equation 5)}$$

$$N_y^{k,i} = \frac{10(y_{max}^{k,i} - y_{min}^{k,i})}{PF_i^k}$$

Therefore, for a probability box, a lower precision factor leads to a higher number of discretization steps, which then leads to a higher number of decision tree branches at each intermediate focus level. This has an impact on computational cost as will be seen below.

The total number of branches for the focus level m, hereinafter referred to as $$F_m^{total,k},$$

is calculated by the product of the branches at each level:

$$F_m^{total,k} = \prod_{i=0}^{m} F_i^k \quad \text{(Equation 6)}$$

One of ordinary skill in the art would recognize that $$F_m^{total,k},$$

grows exponentially with the focus level m. Since the memory needed for storage is related to $$F_m^{total,k},$$

one of ordinary skill in the art would also recognize that the memory needed for storage also grows exponentially with focus level m.

One of ordinary skill in the art would also recognize from the above that a lower precision factor leads to a higher $$F_m^{total,k}$$

which leads to higher memory requirements. However, as explained in Naghshvarianjahromi 1, a lower precision factor leads to lower BER. Therefore, there is a trade-off between lowering BER and memory requirements.

In some embodiments, $$F_m^{total,k}$$

is constrained by a predefined complexity threshold based on the available memory capacity, that is:

$$F_m^{total,k} \le \text{Complexity threshold} \quad \text{(Equation 7)}$$

Figure 9C:
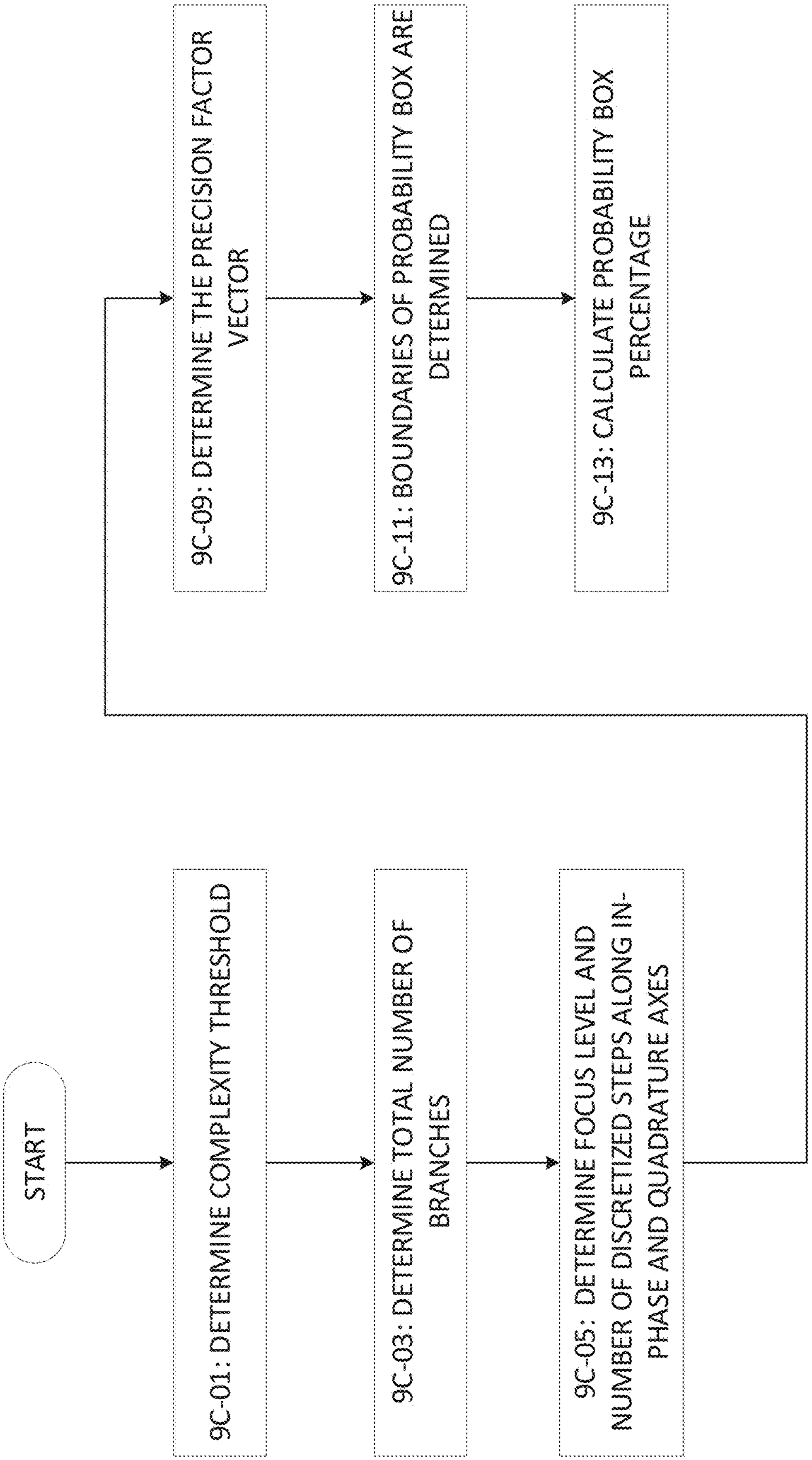
FIG. 9C illustrates an example embodiment of a process to set parameters for discretization.
Figure 9D:
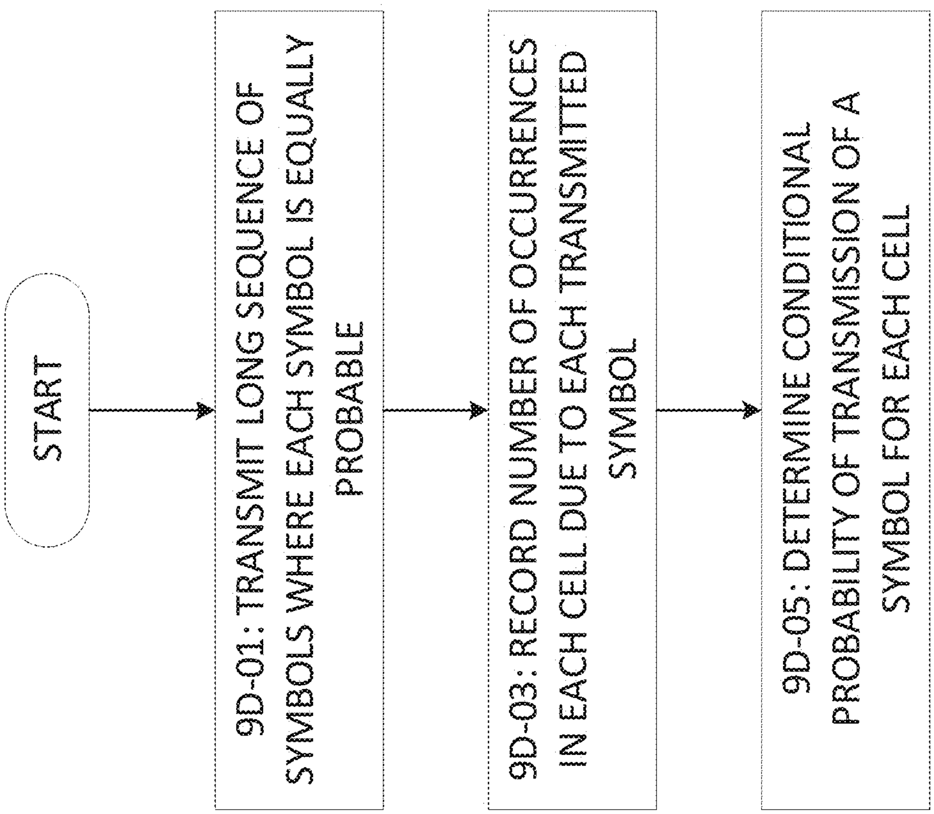
FIG. 9D illustrates an example embodiment of a process for a non-Bayesian approach to estimate transmitted symbols based on discretized symbols.

One of ordinary skill in the art would recognize from the equations above that there are a number of approaches to set each of the measures denoted above, and tradeoffs with each set of parameters. An example embodiment of a process to determine discretization parameters starting from a known complexity threshold is shown in FIG. 9C.

In step 9C-01, the complexity threshold is determined. In some embodiments, this is performed based on the available memory. The available memory is, for example, memory available on a hard disk or for storage in a random access memory (RAM).

In step 9C-03, the total number of branches is determined based on the complexity threshold, for example, the equation described above.

In step 9C-05, the focus level m is set, and for each intermediate focus level i between 0 and m, $$N_x^{k,i} \text{ and } N_y^{k,i}$$

are determined. In some embodiments, $$N_x^{k,i} \text{ and } N_y^{k,i}$$

are set equal to each other for all intermediate focus levels. In some embodiments, since the total number of branches grows exponentially with focus level m, then focus level m is set based on the natural logarithm of the total number of branches determined in step 9C-03.

In step 9C-09, the elements of the precision factor vector $PF^{k,m}$ are determined.

In step 9C-11 based on the elements of precision factor vector determined in step 9C-09 and the $$N_x^{k,i} \text{ and } N_y^{k,i}$$

determined in step 9C-07: the discretization steps $$\Delta x_i^k \text{ and } \Delta y_i^k$$

are determined, then the in-phase and quadrature boundaries of the probability box are determined for each intermediate focus level i from 0 to m.

In step 9C-13 the probability box percentage is calculated. In some embodiments, this is compared to a probability box percentage threshold to determine whether the calculated probability box percentage is acceptable.

An example of the operation of FIG. 9C for a particular embodiment is now detailed. In step 9C-01, a complexity threshold of $10^7$ memory elements is set based on, for example, available memory.

Then, in step 9C-03, the total number of branches is:

$$F_m^{total,k} \le 10^7 \quad \text{(Equation 8)}$$

For step 9C-05: for this embodiment $$N_x^{k,i}$$

is set equal to $$N_y^{k,i} = N.$$

Then:

$$F_m^{total,k} = \prod_{i=0}^{m} F_i^k \quad \text{(Equation 9)}$$

$$F_m^{total,k} = N^{2(m+1)}$$

-continued $$m \le \frac{\ln(10^7)}{2\ln(N)} - 1$$

$$m \le \frac{16.11}{2\ln(N)} - 1$$

Since the combination of m=1 and N=42 fulfils this requirement, in this embodiment, m is set to 1 and N is set to 42. Then, $N^{2(m+1)}=(42)^{2(2)}=3{,}111{,}696$ memory elements are needed, which is less than $10^7$.

In step 9C-09, $PF^{k,m}$ is set to $$[PF_0^k, PF_1^k] = [5, 5].$$

In step 9C-11, the discretization steps $$\Delta x_i^k \text{ and } \Delta y_i^k$$

are calculated as 0.5 using, for example, Equation 2. Then, since N=42, from Equation 1, $$(x_{max}^{k,i} - x_{min}^{k,i}) = 42 \times 0.5 = 21.$$

Similarly $$(y_{max}^{k,i} - y_{min}^{k,i}) = 21.$$

Based on this and centering the PB on the origin, $$|x_{max}^{k,i}| = |x_{min}^{k,i}| = |y_{max}^{k,i}| = |y_{min}^{k,i}| = 10.5,$$

for i=0 and 1.

Then in step 9C-13, the PB percentage is calculated for the PB defined above, where:

$$x_{min}^{k,i} = -10.5$$

$$x_{max}^{k,i} = 10.5,$$

$$y_{min}^{k,i} = -10.5\,j, \text{ and}$$

$$y_{max}^{k,i} = 10.5\,j.$$

One of ordinary skill in the art would know that the example embodiment demonstrated in FIG. 9C is one example embodiment, and many embodiments are possible. In another example embodiment:

- The probability box percentage threshold is set based on, for example, a BER threshold as explained previously;
- The probability box boundaries are defined so as to achieve a probability box percentage at or above the probability box percentage threshold, as explained previously;
- $PF^{k,m}$ and the discretization steps are calculated;
- m and N are set based on the calculation of $PF^{k,m}$, the total number of branches $$F_m^{total,k}$$

and memory requirement is computed and compared to the complexity threshold, and

- The BER is estimated and compared to the BER threshold to ensure that the BER threshold requirement is met.

The process of discretization is now explained. Each normalized received symbol $$Y_n^{k,m}$$

is converted to a discretized data symbol element for each intermediate focus level i between 0 and m based on the location of the discretized cell it falls into in signal space 9B-00. This discretized data symbol element is hereinafter referred to as $$\hat{Y}_{n-i}^k(PF_i^k).$$

For example, referring to FIG. 9B, when a normalized received symbol falls into cell 9B-23, it is converted to a discretized data symbol element comprising in-phase and quadrature co-ordinates assigned to cell 9B-23. In some embodiments, the mid points between the boundaries are assigned to the cell. Referring to cell 9B-23 of FIG. 9B the midpoint 9B-31 between 9B-17-1 and 9B-17-2; and the midpoint 9B-33 between 9B-15-1 and 9B-15-2 are assigned to cell 9B-23. Then any normalized received symbol which falls into the cell is converted to a discretized data symbol element comprising these assigned co-ordinates (9B-31, 9B-33).

A discretized data vector $$\hat{Y}_n^{k,m}$$

is then formed, comprising the discretized data symbol elements for all the intermediate focus levels between 0 and n, defined as:

$$\hat{Y}_n^{k,m} = \left[\hat{Y}_{n-m}^k(PF_m^k), \hat{Y}_{n-m+1}^k(PF_{m-1}), \ldots, \hat{Y}_{n-i}^k(PF_i^k), \ldots, \hat{Y}_n^k(PF_0^k)\right]$$

The discretized data vector $$\hat{Y}_n^{k,m}$$

and the precision factor vector $PF^{k,m}$ are then used for further processing in step 9A-05.

In step 9A-05, the perceptor subsystem 7A-13 creates an estimate $$\hat{X}_n^k$$

of the transmitted symbol $$X_n^k$$

based on the discretized data vector $$\hat{Y}_n^{k,m}.$$

In some embodiments, as explained above, reception PRBS generator 653 is synchronized to transmission PRBS generator 101 to produce the same PRBS. Then, as explained above, the reception test error correction coding module 657 receives the output PRBS from reception PRBS generator 653, and generates an error correction coded output signal which is synchronized to the same error correction coding scheme as in transmission error correction coding module 107.

As explained above, reception bit symbol mapper 659 receives the error correction coded output signal from reception test error correction coding module 657, and maps these received bits to symbols. As also explained above, transmission bit symbol mapper 109 and reception bit symbol mapper 659 are synchronized to use the same modulation formats for mapping. This ensures that the output symbols $$\hat{X}_n^k$$

from reception bit symbol mapper 659 are synchronized to the output from transmission bit symbol mapper 109 in training mode. These output symbols $$\hat{X}_n^k$$

are then transmitted to Client NI processing subsystem 631.

The probability $$P\left(X_n^k | Y_n^{k,m}\right)$$

is approximated using the Monte Carlo method by considering the probability of $$\hat{X}_n^k$$

for a given discretized data vector $$\hat{Y}_n^{k,m},$$

denoted as $$P\left(\hat{X}_n^k | \hat{Y}_n^{k,m}\right)$$

In some embodiments, a Bayesian equation such as the approach used in Naghshvarianjahromi 1 is utilized to extract the posterior as follows:

$$P\left(X_n^k | Y_n^{k,m}\right) = \frac{P\left(Y_n^{k,m} | X_n^k\right) P\left(X_n^k\right)}{P\left(Y_n^{k,m}\right)} \cong \frac{P\left(\hat{Y}_n^{k,m} | \hat{X}_n^k\right) P\left(\hat{X}_n^k\right)}{P\left(\hat{Y}_n^{k,m}\right)} \quad \text{(Equation 10)}$$

For each cell, computing the probabilities P(·) requires one real division. An estimate of the computational cost is provided as follows: when the symbols $$X_n^k$$

are equally probable, the computational cost for evaluating $$P\left(X_n^k | Y_n^{k,m}\right)$$

is 3 real divisions per cell. Therefore, the total computational cost for extracting the posterior is $$3 \times S \times F_m^{total,k}$$

real divisions, where S is the number of symbols, and $$F_m^{total,k}$$

is the number of cells.

In other embodiments, non-Bayesian approaches are utilized. An example embodiment of a non-Bayesian approach is provided below with reference to FIG. 9D. The approach outlined below can result in an improvement in latency compared to the Bayesian approach outlined above.

In step 9D-01, during the training phase, transmission PRBS generator 101 is programmed to produce a bit stream to ensure that a long sequence of symbols $$\hat{X}_n^k$$

where each symbol is equally probable is transmitted by transmission bit symbol mapper 109. As explained previously, reception PRBS generator 653 is synchronized to produce the same bit stream as transmission PRBS generator 101. Then, as explained before, reception test bit symbol mapper 659 is synchronized to produce the same output symbols as transmission bit symbol mapper 109. The sequence of symbols output from reception test bit symbol mapper 659 is received, normalized and discretized to form $$\hat{Y}_n^{k,m}.$$

In step 9D-03, for each discretized cell, the number of occurrences due to each transmitted symbol is recorded. Referring to FIG. 9B, the number of occurrences within cell 9B-23 due to each transmitted symbol are determined.

In step 9D-05, the probability that a particular symbol was transmitted, given that there is an occurrence in a cell, is estimated for each cell. In some embodiments, the estimation comprises determining the ratio of the number of occurrences within this cell for each transmitted symbol, to the total number of occurrences within the same cell. For example, referring to FIG. 9B, when the transmitted symbol is $X_S$, and for cell 9B-23, the ratio of these two counts provides the posterior probability P($X_S$|occurrence in cell 4B-23). In general, this posterior probability is calculated as:

$$P\left(\hat{X}_n^k = X_s \mid \hat{Y}_n^{k,m}\right) = \frac{\text{Number of occurrences of } \hat{Y}_n^{k,m} \text{ due to } X_s}{\text{Total number of occurrences of } \hat{Y}_n^{k,m}} \quad \text{(Equation 11)}$$

Since the denominator is constant for each cell in Equation 11, it does not affect the determination of the maximum posterior. Thus, an estimate of the maximum posterior is provided by finding the transmitted symbol resulting in the highest number of appearances within this cell. Therefore, no division is required, resulting in a lower memory requirement.

Following this, the perceptor subsystem 7A-13 uses the posterior $$P\left(X_n^k \mid \hat{Y}_n^{k,m}\right)$$

to select the symbol $X_s$ that has the maximum probability for each discretized cell, as shown in equation $$\hat{X} = \underset{s=1,2,\ldots,S}{\operatorname{argmax}}\left\{P\left(\hat{X}_n^k = X_s \mid \hat{Y}_n^{k,m}\right)\right\} \quad \text{(Equation 12)}$$

where:

S represents the number of symbols in a S-QAM alphabet.

The maximum posterior is stored in posterior library 7B-09. In some embodiments, the maximum posterior is stored as a matrix $$P\max\left(\overline{X}, \hat{Y}_n^{k,m}\right) = \max\left\{P\left(\hat{X}_n^k = \overline{X} \mid \hat{Y}_n^{k,m}\right)\right\}.$$

During data transmission, when the received data, after discretization and normalization, matches a specific cell $$\hat{Y}_n^{k,m},$$

the corresponding X from the matrix $$P\max\left(\overline{X}, \hat{Y}_n^{k,m}\right)$$

is selected as the most likely transmitted symbol.

By only saving the maximum posterior, the memory requirements are reduced when compared to the Bayesian approach. For example, for 64-QAM, memory requirements are reduced by 64. Moreover, since $$P\max\left(\overline{X}, \hat{Y}_n^{k,m}\right)$$

is evaluated during the training period, symbol estimation during data transmission is expedited.

In the steady-state operation phase, the posterior extraction stage does not incur additional costs since the data is fetched directly from storage memory. The NI's operations generally bypass the need for either multiplications or additions in processing the data. This includes a singular instance during the training phase for calculating $$P\max\left(\overline{X}, \hat{Y}_n^{k,m}\right),$$

which does not demand additions or multiplications.

The above approach is more computationally efficient compared to other wireless link nonlinear mitigation methods.

Since most of the computational effort is necessitated only when channel fluctuations prompt the system to revert to training mode, then in steady state, computational costs are minimal.

This continuous updating and refinement of the posterior library 7B-09 allows for improvement of decision-making capabilities over time, ensuring both adaptability and precision in maintaining optimal network performance.

In other embodiments, when a model cannot be found, in step 809 the one or more posterior processing modules 7B-03-1 to 7B-03-N searches for a previously used posterior model, stored in posterior library 7B-09, which yields the best BER estimation.

By comparing the estimated BER against the stored posterior models, the system identifies the most accurate model or decision rules applied in the past. This process enables the perceptor to refine its predictions and adjustments for future data processing and decision-making, ultimately enhancing the overall reliability and performance of the system.

In some embodiments, each posterior model is indexed in the posterior library 7B-09 using launch and transmission parameters such as:

Transmission power,
Frequency band,
Modulation format,
Cell allocation, as explained above;
Location of client device, as explained above;
Baud rate, and
RF or wireless reach.

Then, the searching comprises finding the closest match to the current launch and transmission parameters.

In some embodiments, step 807 and 809 are performed in parallel.

In step 811, the perceptor subsystem 7A-13 relays the selected posterior model to the adaptive feedback path control 641. As explained previously, the adaptive feedback path control 641 estimates BERs. In the steady state, the adaptive feedback path control 641 utilizes an assurance factor derived from the relayed posterior model relayed from the perceptor subsystem 7A-13. when the system is not in steady state, the adaptive feedback path control 641 calculates BER from received training data. In both cases, the estimated or calculated BER is relayed to executive subsystem 7A-01.

Assurance factor is now explained. The assurance factor offers a direct measure of confidence or probability that the system has correctly identified or decided on the transmitted symbol, given the received symbol.

The average assurance factor (AF) for PAC k and symbol n, $$AF_n^k,$$

is defined as the mean of the posterior probabilities over a discrete time interval L:

$$AF_n^k = \frac{\sum_{b=n-L}^{n} P\left(\hat{X}_b^k \mid \hat{Y}_b^{k,m}\right)}{L},\ n - L \geq m \quad \text{(Equation 63)}$$

Where:

L is a number of symbols prior to the current symbol used for calculating the assurance factor, n represents the current time, and m denotes the focus level.

The symbol error rate (SER) for PAC k and for symbol n is hereinafter referred to as $$\langle SER_n^k \rangle.$$

During steady-state, when training data from a PRBS is not available, in some embodiments the NI estimates the SER for the kth Perceptual Adaptive Control (PAC) as the complement of the assurance factor $$AF_n^k,$$

that is:

$$\langle SER_n^k \rangle = 1 - AF_n^k \quad \text{(Equation 64)}$$

The change in the assurance factor $$\Delta_n^{AF,k}$$

for PAC k compared to PAC (k−1) for symbol n is calculated using:

$$\Delta_n^{AF,k} = AF_n^k - AF_n^{k-1} \quad \text{(Equation 65)}$$

where $$AF_n^{k-1} \text{ and } AF_n^k$$

are the assurance factors at the previous (k−1)th and current kth PAC, respectively.

The BER for PAC k and for symbol n is hereinafter referred to as $$\langle BER_n^k \rangle. \langle BER_n^k \rangle$$

is estimated from $$\langle SER_n^k \rangle \text{ as } \langle SER_n^k \rangle$$

divided by number of bits per symbol. In the case of an S-QAM system, $$\langle BER_n^k \rangle = \langle SER_n^k \rangle / \log_2(S).$$

When the adaptive feedback path control 641 communicates the estimated or calculated BER to the executive subsystem 7A-01, at least one of the executive processing modules 7C-03-01 to 7C-03-N and planning module 7C-13 within executive subsystem 7A-01 then perform an executive subsystem process flow.

Figure 10A:
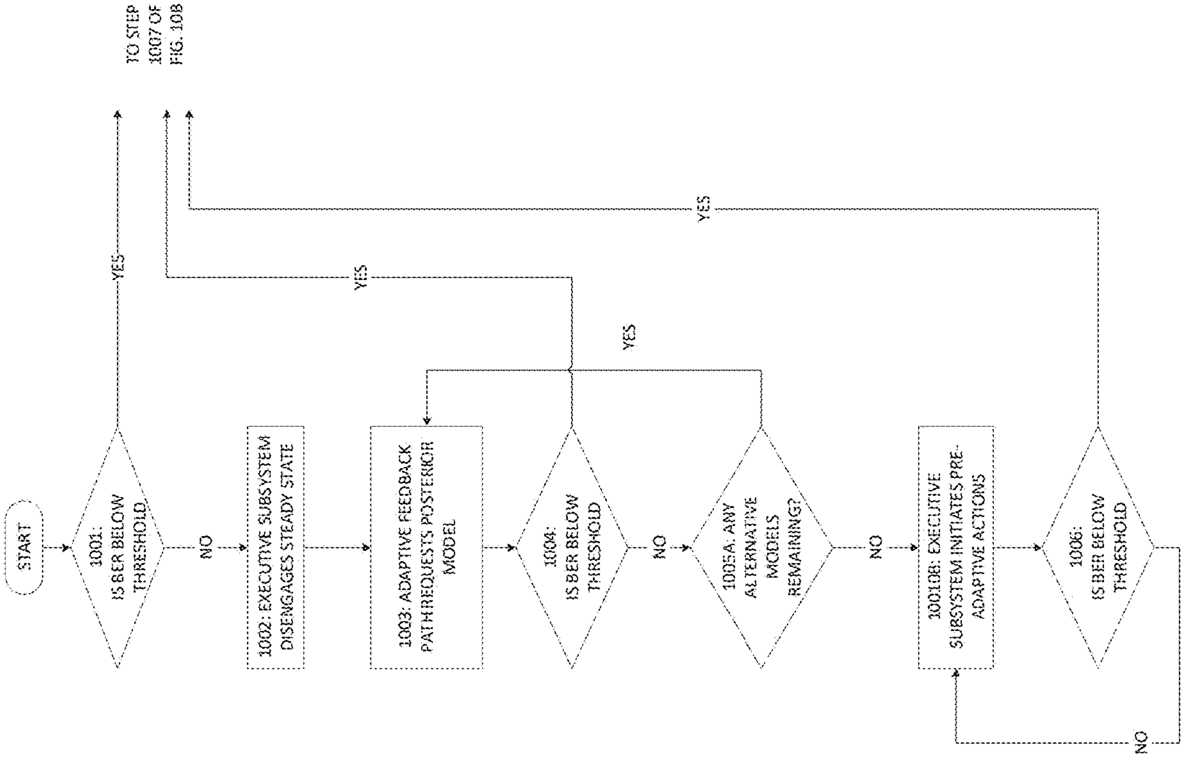
FIG. 10A illustrates part of an example embodiment of an executive subsystem process flow.
Figure 10B:
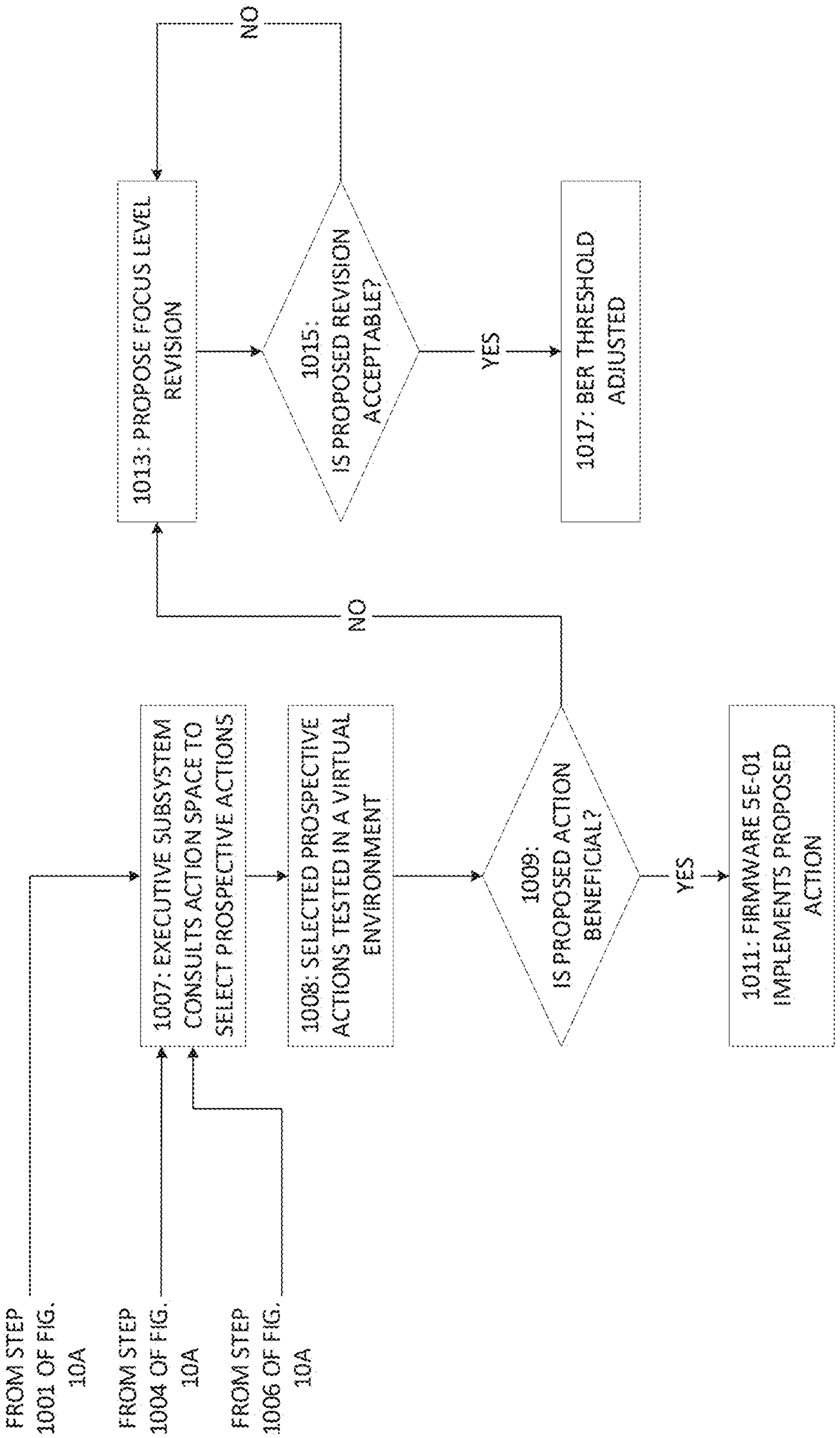
FIG. 10B illustrates another part of an example embodiment of an executive subsystem process flow.

An illustrative embodiment of an executive subsystem process flow is shown in FIGS. 10A and 10B. In step 1001 of FIG. 10A, the received estimated BER is compared against a predefined threshold set by executive policy 7C-09. As explained previously the threshold is set by either a client or a party having an authorized credential.

When the estimated BER is below the threshold, the planning module 7C-13 consults the action space to select a prospective action in step 1007 of FIG. 10B.

When the estimated BER is above the threshold and the system is in steady state mode, in step 1002 at least one of the planning module 7C-13 and the one or more executive processing modules 7C-03-01 to 7C-03-N in executive subsystem 7A-01 disengages the system from steady state mode and transitions the system into training mode.

As part of this transition, at least one of the one or more processing modules 7C-03-01 to 7C-03-N and planning module 7C-13 in the executive subsystem 7A-01 sends a signal to client feedback subsystem 555. Then, feedback processing module 577 within client feedback subsystem 555 sends a signal to 2DFST switch 505 in 2DFST transmission 103 to begin selecting data input from transmission PRBS generator 501. Feedback processing module 577 within client feedback subsystem 555 is discussed in detail further below. In some embodiments, feedback processing module 577 within client feedback subsystem 555 sends a signal to 2DFST transmission PRBS generator 101 to begin generating PRBS. As explained previously, reception PRBS generator 653 is synchronized to transmission PRBS generator 501 to produce synchronized PRBS for training.

At least one of the one or more processing modules 7C-03-01 to 7C-03-N and planning module 7C-13 in the executive subsystem 7A-01 communicates to the adaptive feedback path control module 7A-11 that: the system is being disengaged from steady state mode and is being transitioned into training mode.

In step 1003, the adaptive feedback path control module 7A-11 works together with one or more posterior processing modules 7B-03-1 to 7B-03-N to retrieve an alternative model from posterior library 7B-09.

In step 1004, adaptive feedback path 641 tests the retrieved model to determine whether the estimated BER using the retrieved alternative model is below the threshold.

When the adaptive feedback path 641 determines that the BER is below the threshold, then the planning module 7C-13 consults the action space to select a prospective action in step 1007 of FIG. 10B.

When the adaptive feedback path 641 determines that the BER is above the threshold, in step 1005A the adaptive feedback path 641 works together with one or more posterior processing modules 7B-03-1 to 7B-03-N to determine whether a suitable alternative model is found in posterior library 7B-09.

When there is a suitable alternative model, then the process returns to step 1003, where the adaptive feedback path 641 retrieves the suitable alternative posterior model from the posterior library 7B-09, and tests to determine whether the BER is below the threshold in step 1004. when the adaptive feedback path 641 determines that the BER is below the threshold, then the planning module 7C-13 in executive subsystem consults the action space to select a prospective action in step 1007 of FIG. 10B.

When there are no suitable alternative models remaining in posterior library 7B-09 in step 1005A, the planning module 7C-13 of executive subsystem 7A-01 initiates pre-adaptive actions in step 10010B. As explained previously, pre-adaptive actions are predetermined actions designed to be effective before the NI has had a chance to learn or adapt from experience. These pre-adaptive actions comprise, for example, reducing the data rate incrementally to align the BER with acceptable levels.

While the BER is above the threshold (step 1006), at least one of the one or more processing modules 7C-03-01 to 7C-03-N and planning module 7C-13 in the executive subsystem performs pre-adaptive actions. Once the BER is below the threshold, in step 1007 the planning module 7C-13 in executive subsystem 7A-01 consults the action space 7C-11 in executive storage 7C-07 to select prospective actions for adjusting parameters.

Figure 11:
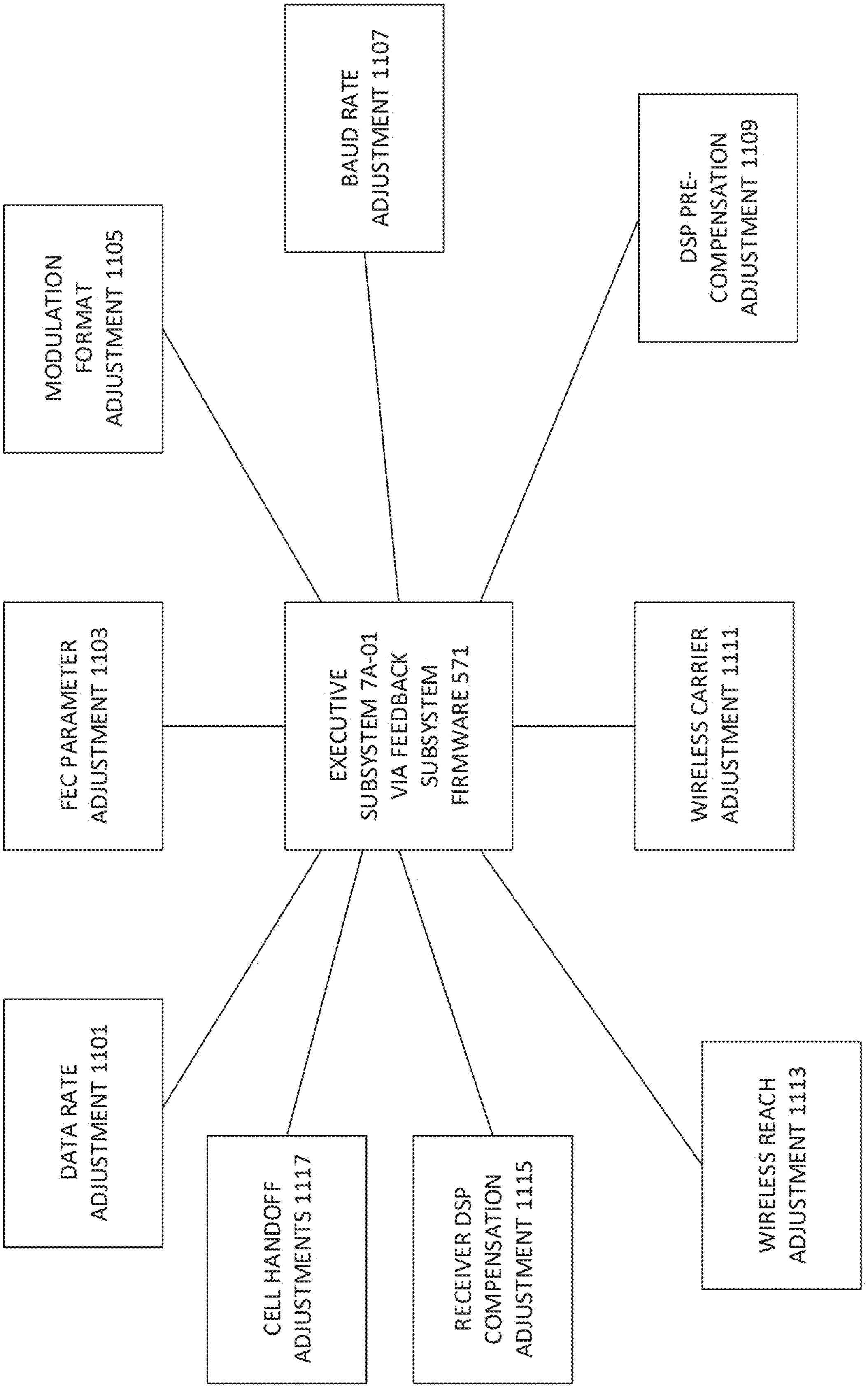
FIG. 11 illustrates an example embodiment of parameters available to an executive subsystem to adjust using actions.

In some embodiments, the prospective actions available for selection comprise environmental actions, as previously discussed. Environmental actions are actions to adapt the NI to varying external conditions. This involves at least one of the one or more processing modules 7C-03-01 to 7C-03-N and planning module 7C-13 in executive subsystem 7A-01 dynamically adjusting operational parameters which are available to adjust via feedback subsystem firmware 571. Examples are shown in FIG. 11, and include but are not limited to:

- Data rate adjustment 1101 for input 2DFST data source 506;
- Forward Error Correction (FEC) parameter adjustment 1103 such as turning SD decoding on and off in client reception error correction decoding module 647 and making corresponding changes in 2DFST transmission error correction coding 507;
- Modulation format adjustment 1105: in some embodiments, this comprises switching between different modulation formats such as BPSK, QPSK, or S-QAM depending on, for example, the current data rate demands and the quality of the RF or wireless carrier;
- Baud rate adjustment 1107;
- One or more transmission DSP pre-compensation setting adjustments 1109 in 2DFST transmission DSP pre-compensation module 513 to compensate for impairments such as non-linear distortion, thus maintaining the desired RF or wireless reach and ensuring the integrity of client data transmission across varying distances. In some embodiments, the adjustments comprise removing all transmission DSP pre-compensation;
- RF or wireless carrier parameter adjustment 1111: for example, operating frequency as client device 109 moves into different cells served by different frequencies;
- RF or wireless reach adjustment 1113;
- One or more reception DSP pre-compensation setting adjustments 1115 in reception DSP pre-compensation module 629, where in some embodiments, the adjustments comprise removing all reception DSP pre-compensation; and
- Cell transition or handoff adjustments 1117, comprising, for example, changes which are made whenever a client device transitions from one cell to another.

By executing these environmental actions, the executive subsystem 7A-01 continuously optimizes the system to adapt to changing conditions and deliver consistent, high-quality service.

In some embodiments, the prospective actions available for selection comprise internal commands. Internal commands are instructions sent by the executive module to the perceptor to modify modeling parameters. In some embodiments, internal commands comprise:

- adjustments to the focus level,
- adjustments to the precision factor vector, and
- adjustments related to trade-offs between computational cost and cognitive decision-making accuracy.

In step 1008, the selected prospective actions are then tested by at least one of one or more executive processing modules 7C-03-01 to 7C-03-N, and planning module 7C-13 within a virtual environment. The virtual environment simulates potential adjustments in a risk-free manner, allowing the system to evaluate the impact on an internal reward function prior to deployment in the "real-world". By performing these simulations, an indication of the probability of success in the real world is obtained, and the probability of adverse consequences in the real-world is reduced.

The internal reward function is now explained. The internal reward function is designed to achieve one or more goals of the RF. In some embodiments, for PAC k, and symbol n, the internal reward function denoted as $$rw_n^k,$$

is based on the assurance factor, the incremental change in the assurance factor as explained below:

$$rw_n^k = f\left(AF_n^k, \Delta_n^{AF,k}, SDN_k^n\right) \quad \text{(Equation 16)}$$

where:

f(•) is a function, $$AF_n^k$$

is the assurance factor for PAC k and symbol n as explained previously;

$$\Delta_n^{AF,k}$$

is the change in the assurance factor for PAC k compared to PAC (k−1) for symbol n, as explained previously; and $$SDN_n^k$$

is a set of parameters for symbol n and PAC k intended for optimization in the wireless communication system. These include the parameters for adjustment shown in FIG. 6.

In other embodiments, $$rw_n^k$$

is based on the estimated BER and the incremental change in BER:

$$rw_n^k = f(\langle BER_n^k \rangle, \Delta_k^{B,n}, SDN_k^n) \quad \text{(Equation 17)}$$

f(•) and $$SDN_n^k$$

are as previously defined, $$\langle BER_n^k \rangle$$

is the estimated BER for PAC k and symbol n as explained previously; and $$\Delta_n^{B,k}$$

is the change in the BER for PAC k compared to PAC (k−1) for symbol n, that is;

$$\Delta_k^{B,n} = \langle BER_n^{k-1} \rangle - \langle BER_n^k \rangle \quad \text{(Equation 18)}$$

As explained above, the internal reward function is designed to achieve one or more goals of the RF. An example reward function is demonstrated below for embodiments where achieving the goals of optimizing for error and maximizing the data rate are important is as follows:

$$rw_n^k = \frac{\langle BER_n^k \rangle}{(R_k - R_{ref})^4} \quad \text{(Equation 19)}$$

where:

$R_k$ is the data rate at the current time, incremented by a fixed data rate discretization step d, and $R_{ref}$ is a reference data rate.

The data rate discretization step dis, for example, 4 Gb/s.

Then, the objective is to minimize the reward function by: either reducing $$\langle BER_n^k \rangle,$$

or ensuring that the expression $(R_k - R_{ref})^4$ is increased by increasing $R_k$ above $R_{ref}$ as much as possible.

As is known to one of ordinary skill in the art, typically BER is inversely related to $R_k$. Then using the expression in Equation 19 ensures that BER is not reduced by reducing $R_k$ excessively, or $R_k$ is not increased excessively at the expense of BER.

Additionally, the planning module 7C-13 receives modeling configurations like the precision factor vector $PF^{k,m}$ from the perceptor subsystem 7A-13 through internal feedback channel 639, as described previously. The planning module 7C-13 then uses this information to determine the appropriate action to apply to the RF.

At least one of planning module 7C-13, and one or more executive processing modules 7C-03-01 and 7C-03-N then perform the following calculations: the ratio $\rho^{k+1,t}$ for the next PAC (k+1) due to the virtual environmental action, $$c_{k+1}^t$$

where t is the current virtual action index, is calculated based on the standard deviation of the observed values for current PAC k and previous PAC (k−1), that is:

$$\rho^{k+1,t} = \max_{s=1,2,\ldots,S} \left( \frac{std(\hat{Y}_n^{k,m} \mid \hat{X}_n^k = X_s)}{std(\hat{Y}_n^{k-1,m} \mid \hat{X}_n^{k-1} = X_s)} \right) \quad \text{(Equation 7B-0)}$$

In some embodiments, predicted discretized data vector for PAC (k+1), current virtual action index t and the focus level m is denoted as $$\hat{Y}_n^{(k+1),t,m} \cdot \hat{Y}_n^{(k+1),t,m}$$

is calculated as:

$$\hat{Y}_n^{(k+1),t,m} = h(\hat{Y}_n^{k,m}, \rho^{k+1,t}, c_k, c_{k-1}, t, m) \quad \text{(Equation 21)}$$

where h(•) is a function that takes into account:

the current discretized data vector $$\hat{Y}_n^{k,m},$$

the action $c_k$ for PAC k, the previous action $c_{k-1}$ for PAC (k−1), the ratio $\rho^{k+1,t}$, the current virtual action index t, and the focus level m.

In other embodiments, another example function h(•) to predict posterior probability for virtual environmental action $$c_{k+1}^{t}$$

is:

$$\hat{Y}_n^{(k+1),t,m} = \hat{Y}_n^{k,m} \times \left(\rho^{k+1,t}\right)^{\frac{(m+1)(t\times d)}{2(R_k-R_{k-1})}} \quad \text{(Equation 22)}$$

Then, $$\hat{Y}_n^{(k+1),t,m} = \hat{Y}_n^{k,m} \times \left(\max_{s=1,2,\ldots,S}\left(\frac{std\left(\hat{Y}_n^{k,m} \middle| X_n^k = X_s\right)}{std\left(\hat{Y}_n^{k-1,m} \middle| X_n^{k-1} = X_s\right)}\right)\right)^{\frac{(m+1)(t\times d)}{2(R_k-R_{k-1})}} \quad \text{(Equation 23)}$$

where S is the constellation size: for example, for QAM-16, S is 16, d is the discretization step for the data rate, for example 4 Gb/s, $R_k$ and $R_{(k-1)}$ are the data rates at the kth and (k−1)th PAC, respectively.

The relationship in Equations 22 and 23 reflects that an increase in the data rate typically results in increased non-linear distortions in wireless communications.

The standard deviation changes proportionally to alterations in the constellation order or the power level, similar to human imagination. Equation 23 also has a relatively low computational cost. Equation 23 allows the executive subsystem 7A-01 to create virtual environments that emulate changes in the system's behavior due to different operational parameters.

These equations provide an indication of how RF will respond to potential future actions by simulating the outcome of these actions. The objective is to estimate how different configurations and conditions will affect the signal's characteristics, such as its standard deviation.

In some embodiments, the predicted posterior probability due to the virtual action $$c_{k+1}^{t}$$

is calculated, and sent by the posterior processing modules 7B-03-1 to 7B-03-N in the perceptor subsystem 633 to the executive subsystem 643 through internal feedback 637 as:

$$b_k\left(\hat{X}_n^{(k+1),t}, \hat{Y}_n^{(k+1),t,m}\right) = P\left(\hat{X}_n^{(k+1),t} \middle| \hat{Y}_n^{(k+1),t,m}\right) \quad \text{(Equation 24)}$$

Here, t∈{1, 2, . . . , T} and T is a total number of imaginative actions that the kth posterior sent by perceptor, is still valid for predicting the $7^{th}$ virtual action outcome. The assurance factor $$AF_n^{(k+1),t}$$

and its incremental change $$\Delta_{k+1,t}^{AF,n}$$

are calculated as:

$$AF_n^{(k+1),t} = \frac{\sum_{b=n-L}^{n} P\left(\overline{X}_b^{(k+1),t} \,|\, \hat{Y}_b^{(k+1),t,m}\right)}{L},\ n-L \ge m, \quad \text{(Equation 25)}$$

$$\Delta_{k+1,t}^{AF,n} = AF_n^{k+1,t} - AF_n^{k+1,t-1}$$

The internal rewards for the desired virtual action $$c_{k+1}^{t}$$

are calculated using:

$$rw_n^{(k+1),t} = \begin{cases} f_{(k+1)}\left(AF_n^{(k+1),t}, \Delta_{k+1,t}^{AF,n}\right) & t \in \{1, 2, \ldots, T\} \\ rw_n^k & t = 0 \end{cases} \quad \text{(Equation 26)}$$

As mentioned before, T is the total number of virtual actions. Then, the action that either minimizes or maximizes the internal reward is selected.

In embodiments where minimizing the internal reward is the goal, the action $$c_{k+1}^{t_{opt}}$$

that yields the minimum internal reward is selected as:

$$t_{opt} = \underset{t\in\{0,1,2,\ldots,T\}}{\text{argmin}}\left(rw_n^{(k+1),t}\right) \quad \text{(Equation 27)}$$

In embodiments where maximizing the internal reward is the goal, the action $$c_{k+1}^{t_{opt}}$$

that yields the maximum internal reward is selected as:

$$t_{opt} = \underset{t\in\{0,1,2,\ldots,T\}}{\text{argmin}}\left(rw_n^{(k+1),t}\right) \quad \text{(Equation 28)}$$

Consequently, planning module 7C-13 selects the action to be applied to the environment, denoted as $c_{k+1}$, based on $t_{opt}$. In some embodiments, the executive policy 7C-09 adjusts the threshold to enhance accuracy or accept higher complexity as warranted.

In step 1009, the impact on the internal reward is evaluated to determine whether a proposed action is beneficial or otherwise.

When a proposed action proves beneficial in step 1009, then in step 511 at least one of executive processing modules 7C-03-01 to 7C-03-N; and planning module 7C-13 communicates signals comprising the proposed action to client feedback subsystem 555.

Client feedback subsystem 555 comprises feedback processing module 577, which comprises feedback subsystem firmware 571 running on feedback subsystem processor 573. None of the prior art systems demonstrated in contemplated implementation of firmware running on a processor, such as feedback subsystem firmware 571 running on feedback subsystem processor 573. Feedback subsystem firmware 571 offers a more sophisticated mechanism for integration of NI into RF compared to the previously demonstrated prior art systems.

Feedback subsystem firmware 571 determines adjustments; and generates updates for different blocks such as input 2DFST data source 506, 2DFST transmission 103 and 2DFST reception 105 based on received signals from executive subsystem 7A-01.

One of ordinary skill in the art would understand that feedback subsystem processor 573 is a processor which is appropriate for this task. Feedback processing module 577 is communicatively coupled to feedback subsystem database 575.

Then, feedback processing module 577 within client feedback subsystem 555, receives the signals comprising the proposed action from executive subsystem 7A-01. Based on the received signals, the feedback subsystem firmware 571 determines the adjustments necessary to implement the proposed action. In some embodiments, feedback subsystem firmware 571 performs this determination based on data retrieved from feedback subsystem database 575.

Feedback processing module 577 implements the proposed action by transmitting signals to perform the determined adjustments to one or more components within 2DFST transmission 103 or 2DFST reception 105, or input 2DFST data source 506; via interconnections 579. Interconnections 579 are implemented using appropriate communication technologies known to those of ordinary skill in the art. In some embodiments, wireless link 123 of FIG. 1B is used to implement interconnections 579.

The signals to effect adjustments are described below with reference to FIGS. 5A, 5G, 5H and 11:

- Signal to input 2DFST data source 506, to enable input client data 103 data rate adjustment 1101;
- Signals to 2DFST transmission error correction coding 507 and client reception error correction coding 647 to enable FEC parameter adjustment 1103 such as switching soft decision (SD) decoding off, or switching hard decision (HD) decoding off;
- Signal to 2DFST bit symbol mapper 509 to effect modulation format adjustment 1105;
- Signal to 2DFST bit symbol mapper 509 to enable baud rate adjustment 1107;
- Signal to 2DFST transmission DSP pre-compensation module 513 to enable one or more transmission DSP pre-compensation setting adjustments 1109;
- Signal to 2DFST wireless transmitter 519 for RF or wireless reach adjustment 1113; and
- Signal to client reception DSP pre-compensation module 629 to enable one or more reception DSP pre-compensation setting adjustments 1115.

Along with adjustments, as described previously, feedback subsystem firmware 571 generates commands to be sent to for example, transmission PRBS generator 101 and switch 105 when the overall wireless system transitions from steady state mode into training mode and vice versa. Then, feedback processing module 577 sends signals comprising these commands to these various components as is appropriate.

When no action enhances system performance in step 1009, then in step 513 a revision to the focus level m is proposed.

In step 515 the planning module 7C-13 checks whether this proposed revision adheres to the complexity threshold established by the policy using the equations above. In some embodiments, this comprises comparing the complexity threshold to the available memory.

When the revised focus level is acceptable, then in step 517, planning module 7C-13 adjusts the BER threshold accordingly and communicates these changes to the perceptor subsystem 7A-13 via internal commands transmitted over the internal feedforward channel 7A-09. This feedback initiates another round of assessment and adaptation, refining the decision-making process at the new focus level.

Performing the above process flow enables the implementation of a continuous feedback loop, wherein: Based on the functioning and performance metrics of the wireless link 121, parameters related to transmission 102, input client data 103 and reception 104 are adjusted so as to improve the overall performance of RF.

The above also describes a perception action cycle for wireless systems which are NGNLE.

Returning to FIG. 6B: In step 6B-11, the output signal comprising symbols from client NI processing subsystem 631 is transmitted to reception symbol-to-bit demapper 646, where the received symbols are mapped to bits. As explained previously, in some embodiments step 6B-11 is performed in parallel with step 6B-09.

One of ordinary skill in the art would understand that this de-mapping is performed based on the modulation format used by 2DFST transmission bit symbol mapper 109. Techniques to ensure that client reception symbol-to-bit demapper 646 is synchronized to transmission bit symbol mapper 109 are known to those of ordinary skill in the art and are not discussed further here.

Client reception symbol-to-bit demapper 646 produces an output signal comprising the de-mapped bits. This output signal is received by client reception error correction decoding module 647.

The client reception error correction decoding module 647 implements error correction decoding, including decoding of data encoded using forward error correction codes.

In some embodiments, client reception error correction decoding module 647 performs either HD decoding or SD decoding as needed. As is also known to those of ordinary skill in the art, HD decoding has lower correction performance and coding gain relative to SD decoding techniques. For example, as explained in "Soft Decision Forward Error Correction for Coherent Super-Channels", Infinera, white paper, https://www.infinera.com/wp-content/uploads/Soft-Decision-Forward-Error-Correction-for-Coherent-Super-Channels-0189-WP-RevA-0519.pdf, retrieved 26 May 2024; SD decoding provides coding gain of up to 11 dB or more with an overhead of 65% to 35% depending on the implementation.

Although the SD decoding provides significant performance advantage due to larger coding gain, there are some disadvantages. SD decoding requires more transmission overhead than HD decoding which can reduce effective data rate. For example, when SD decoding with 35% overhead is used, 35% of the channel time is used to send the redundant data and only 65% of the channel time is utilized to send the actual data, which significantly lowers the effective data rate.

Furthermore, SD decoding involves more complex calculations relative to HD decoding. These complex calculations lead to enhanced power consumption and increased latency within reception error correction decoding module 647. These disadvantages make SD decoding unattractive for certain applications, such as in data center networks.

Then, in some embodiments, as previously discussed, based on signals sent by feedback subsystem firmware 571, SD decoding is turned on and off within client reception error correction decoding module 647. This has the advantage of enabling better control of power consumption and latency.

The combination of HD decoding and the NI systems and methods explained above can provide the same net coding gain as a system that uses SD decoding. Then, in some embodiments, client reception error correction decoding module 647 performs only HD decoding, thereby removing the overhead due to SD decoding and increasing the effective data rate.

In yet other embodiments, based on signals sent by feedback subsystem firmware 571 to client reception error correction decoding module 647 and 2DFST transmission error control coding module 507, forward error correction is turned off entirely. That is, no error correcting operations are performed in 2DFST transmission error control coding module 507; and both HD and SD decoding are turned off. This further increases the effective data rate by reducing transmission overhead. It can also reduce latency overheads.

One of ordinary skill in the art would also understand that 2DFST transmission error control coding module 507 and client reception error correction decoding module 647 are synchronized so that reception error correction decoding module 647 is able to decode the bits received in the output signal from reception symbol-to-bit de-mapper 646, and generate output client data 648.

Figure 12:
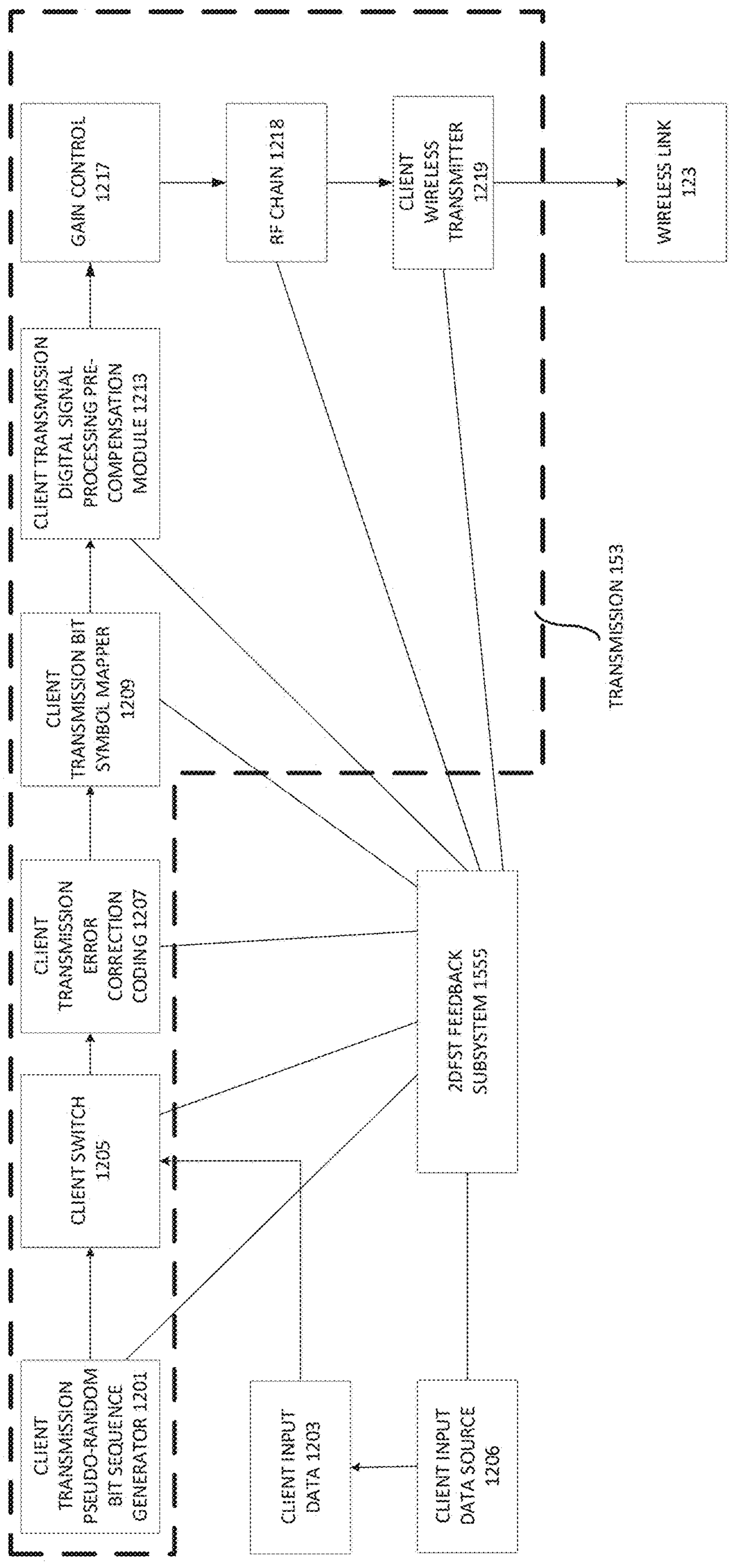
FIG. 12 illustrates an example embodiment of a transmission subsystem in a client.

Transmission from client transmission 153 of client 109 to 2DFST reception 105 of 2DFST 101 is now explained in further detail. Client transmission 153 structure and operation is explained in detail with reference to FIG. 12 and the transmission sequence 14A-00 shown in FIG. 14A.

Similar to as with input data 503: client input data 1203, which has an associated bit rate and originates from client input data source 1206 is sent to client transmission 153, where it is processed and converted into wireless signals and transmitted via wireless link 123.

Client transmission pseudo-random bit sequence (PRBS) generator 1201 generates PRBS using techniques known to those of ordinary skill in the art. In some embodiments, client transmission PRBS generator 1201 is synchronized with a reception PRBS generator, as discussed previously.

Client switch 1205 is communicatively coupled to client transmission PRBS generator 1201, and client input data source 1206. In step 14A-01 of FIG. 14A: client switch 1205 receives signals from these components as inputs, similar to switch 505 in step 6A-01 of FIG. 6A. Client switch 1205 selects one of these input signals and outputs the selected input signal as an output signal depending on whether training mode or steady state mode is employed as discussed previously.

Figure 14A:
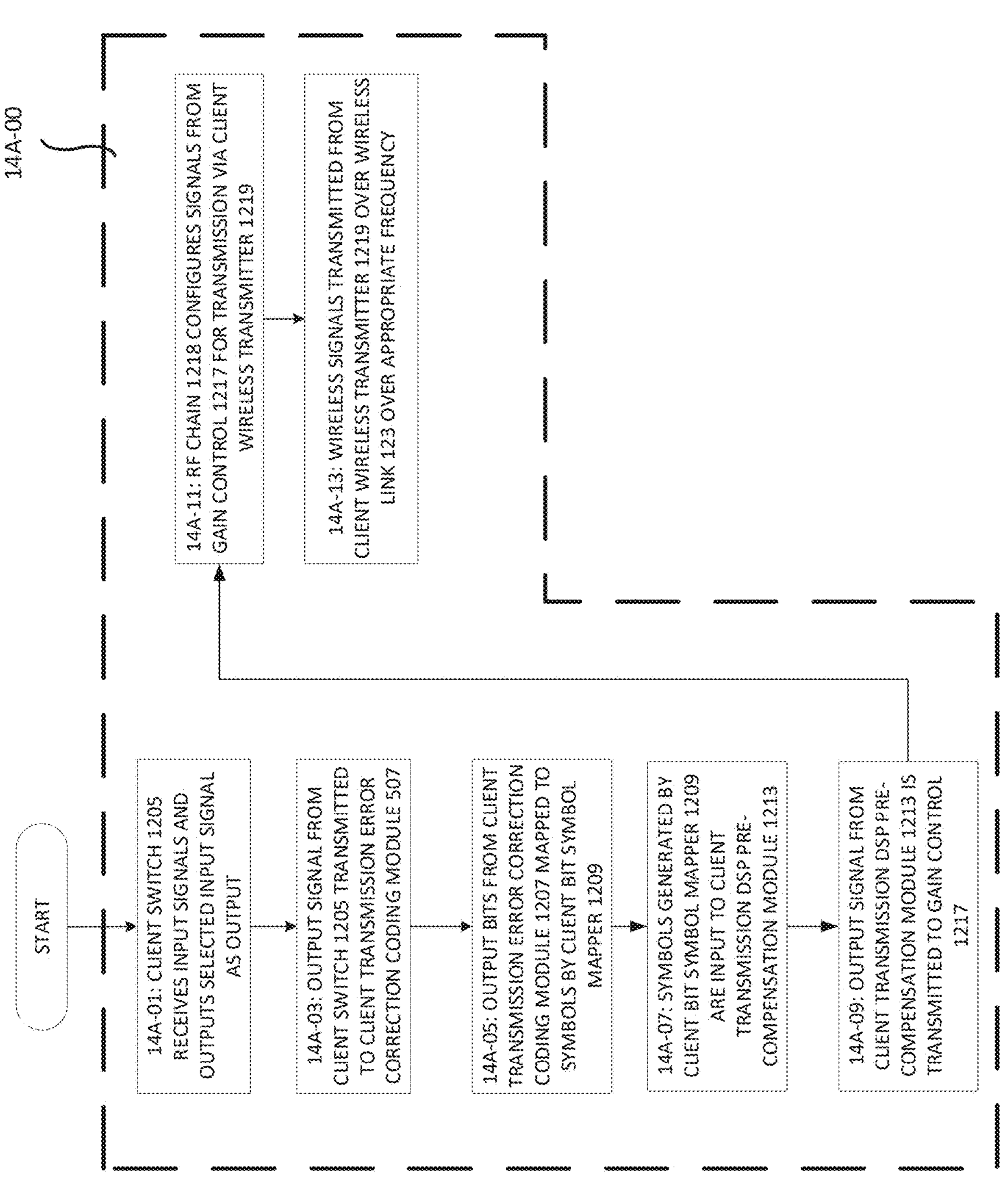
FIG. 14A illustrates an example of a transmission sequence in a transmission subsystem of a client device.

In step 14A-03 of FIG. 14A, the output signal from client switch 1205 is then transmitted to client transmission error correction coding module 1207. Based on the output signal from client switch 1205, client transmission error correction coding module 507 generates an error correction coded output signal comprising bits using an FEC coding scheme, as discussed previously.

Client transmission error correction coding module 1207 is communicatively coupled to client transmission bit symbol mapper 1209. In step 14A-05 of FIG. 14A: client transmission bit symbol mapper 1209 receives the error correction coded output signal comprising bits generated by client transmission error correction coding module 1207, and maps these received bits to symbols based on a modulation format as discussed previously.

Client transmission bit symbol mapper 1209 is communicatively coupled to client transmission DSP pre-compensation module 1213. In step 14A-07 of FIG. 14A: the symbols output from client transmission bit symbol mapper 1209 are received and processed by client transmission DSP pre-compensation module 1213.

Pre-compensation techniques are applied to these received symbols to generate an output digital signal for transmission to gain control 1217 in step 14A-09 of FIG. 14A. This is similar to the operation performed by DSP pre-compensation module 513 as discussed above.

Gain control 1217 performs gain control operations on the signals output from client DSP pre-compensation module 1213. Gain control operations are known to those of ordinary skill in the art and are not discussed further here.

In step 14A-11: RF chain 1218 receives signals from gain control 1217 and performs operations necessary to configure these received signals for further transmission from client wireless transmitter 1219. The operations performed by RF chain 1218 are known to those of ordinary skill in the art and are not discussed further here.

Figure 13:
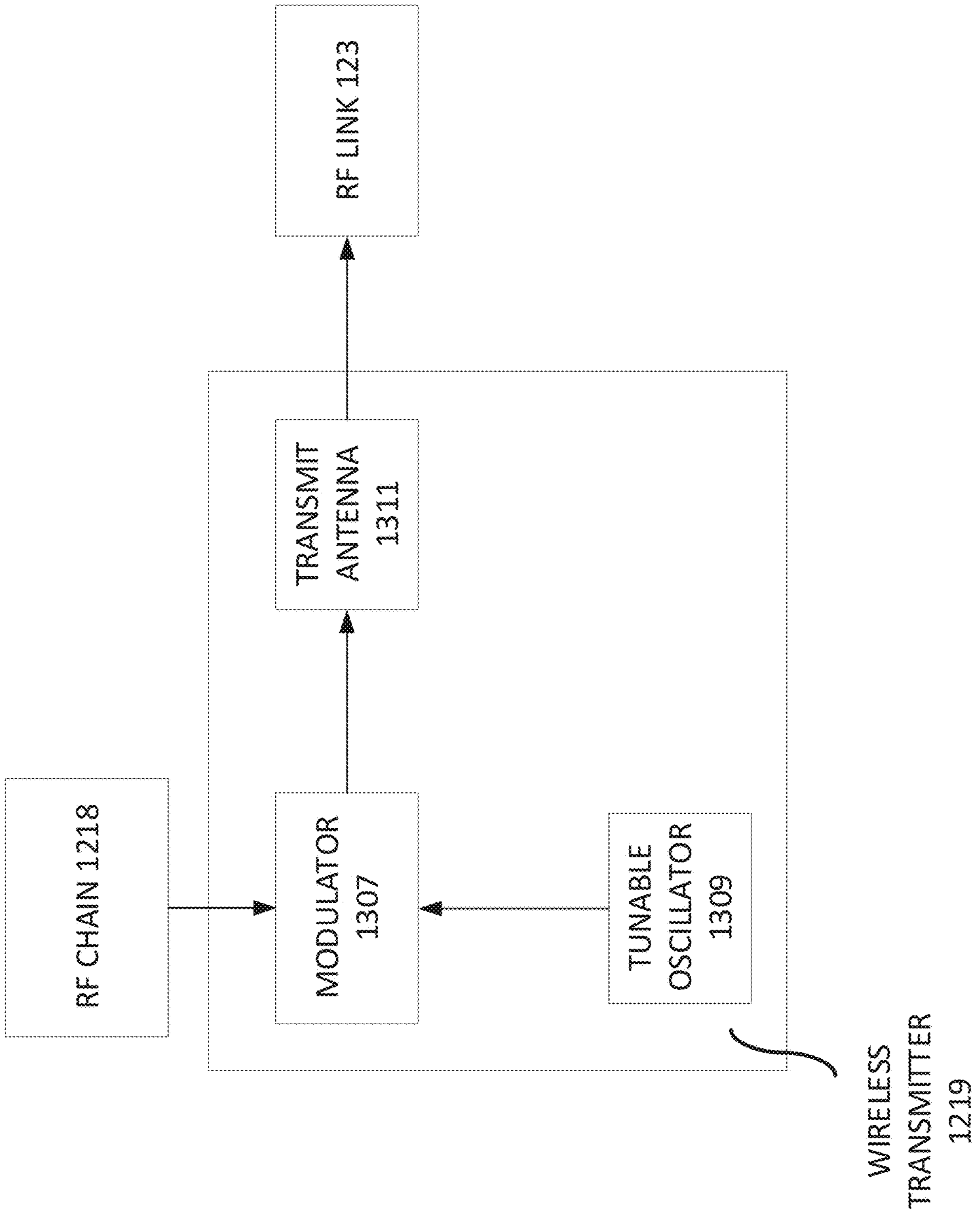
FIG. 13 illustrates an example embodiment of a client wireless transmitter.

Client wireless transmitter 1219 receives signals from RF chain 1218, and converts these received signals into an appropriate format for transmission over wireless link 123 in step 14A-13 of FIG. 14A. An example embodiment of client wireless transmitter 1219 is shown in detail in FIG. 13. In FIG. 13, signals received from RF chain 1218 are used to modulate the output from tunable oscillator 1309. Analogous to as previously discussed, the output from the modulation process is transmitted via transmit antenna 1311 and directed over wireless link 123 to 2DFST reception 105 of 2DFST 101 over the frequency used to serve the cell that client 109 is located in.

In some embodiments, the operating frequency used in tunable oscillator 1309 changes as required by the client device 109. For example, when the client device 109 moves from one cell to another, the operating frequency also changes. Then, client feedback subsystem 555 makes the necessary adjustments to ensure that the tunable oscillator 1309 uses the new operating frequency.

The signal transmitted over wireless link 123 is received at 2DFST reception 105. As would be known to those of ordinary skill in the art, 2DFST reception 105 performs complementary operations to that of 2DFST transmission 103. These operations are now described with reference to FIGS. 14B, 15, 16, 17, 18 and 19.

Figure 14B:
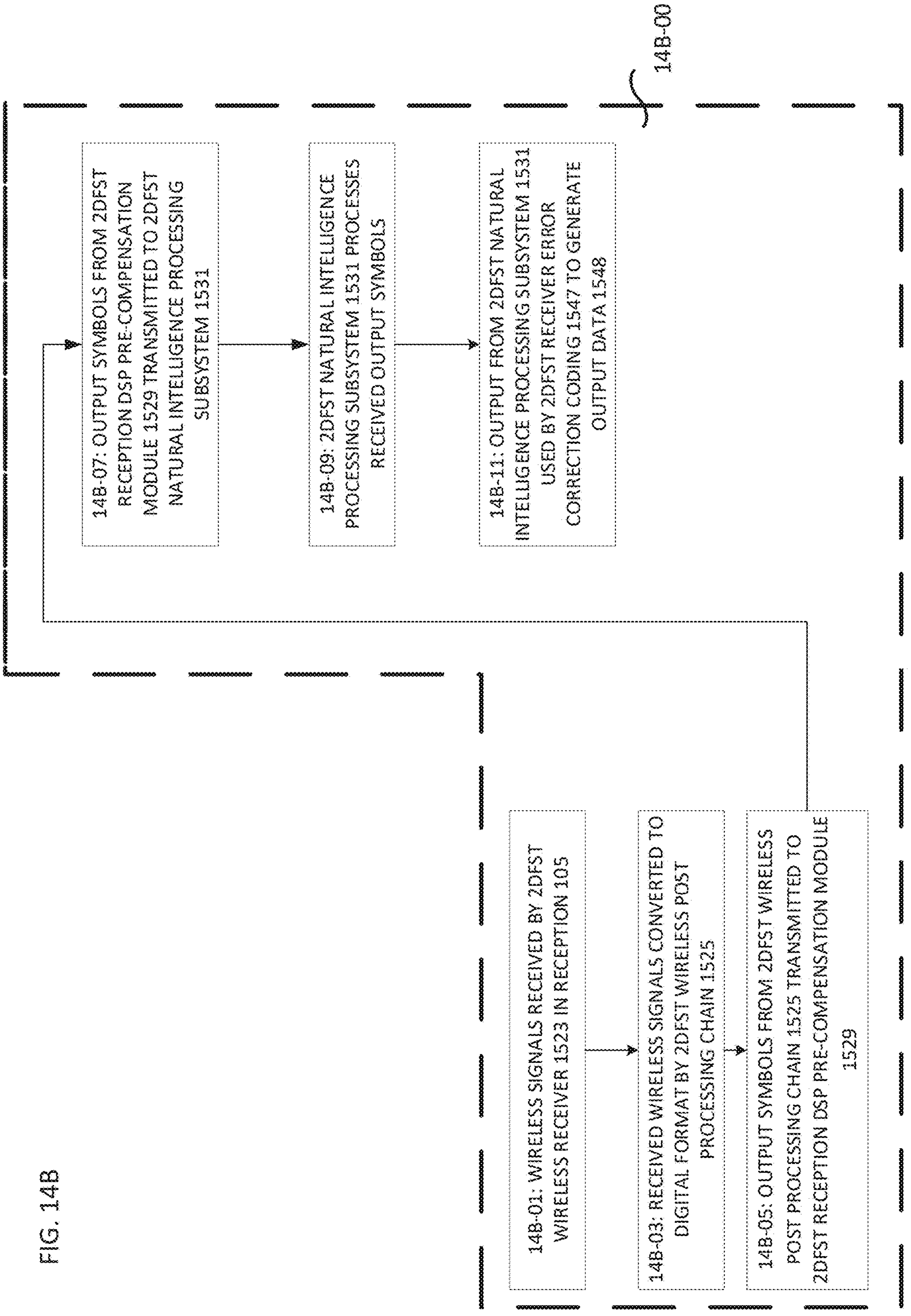
FIG. 14B illustrates an example of a reception sequence in a reception subsystem of a 2DFST.
Figure 15:
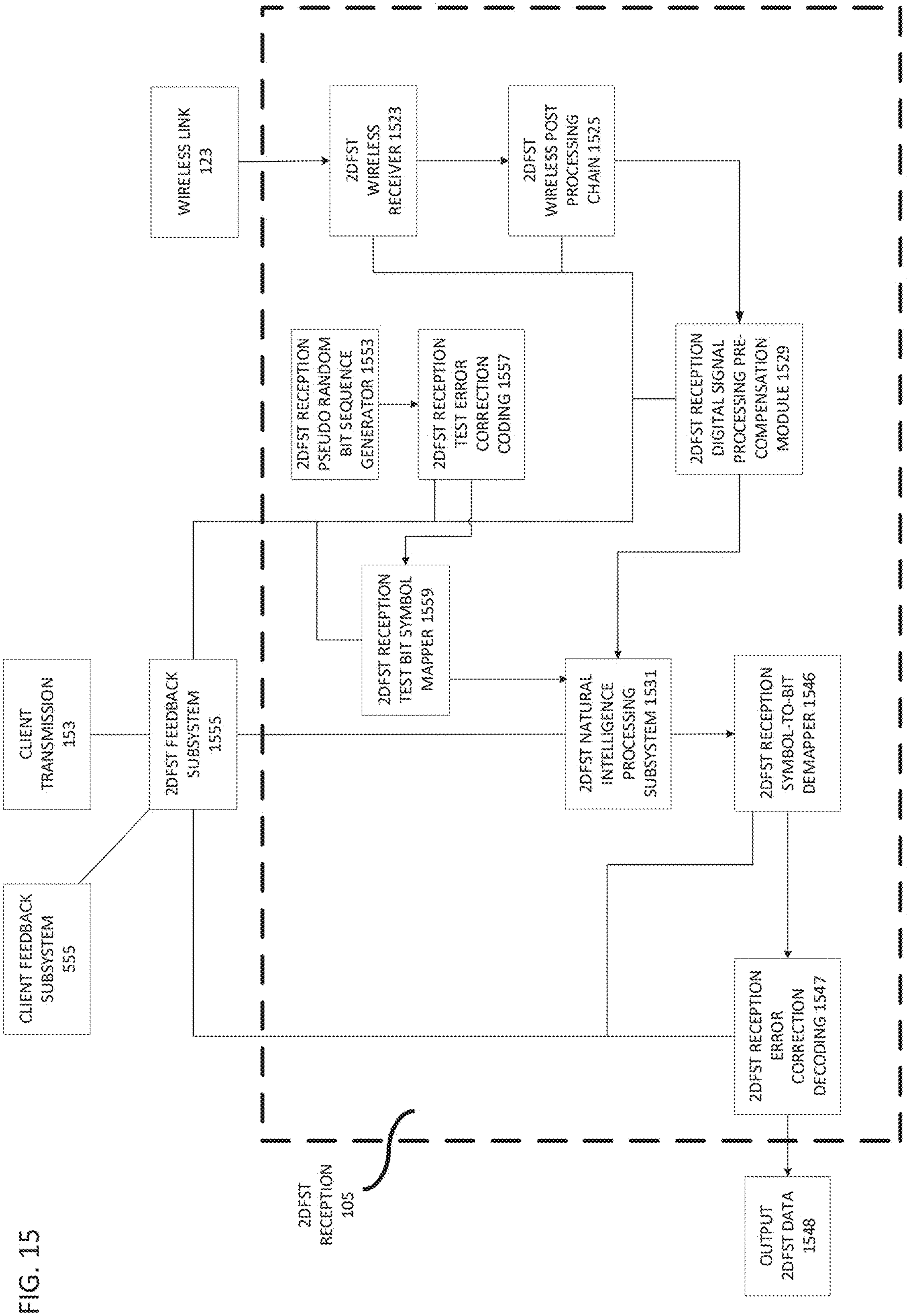
FIG. 15 illustrates an example embodiment of a 2DFST reception subsystem.

In step 14B-01 of FIG. 14B and as shown in FIG. 15: the wireless signal from wireless link 123 is received by 2DFST wireless receiver 1523.

In some embodiments, 2DFST wireless receiver 1523 comprises, for example, a receive antenna. Since the direction of the cell where client 109 is located relative to the host device 102 is known, then in these embodiments the receive antenna 1523 is correctly aligned to receive the signal from link 123, such as signal 111 shown in FIG. 3 without requiring complex alignment setup or beam steering setup.

In some embodiments, the receiver 1523 comprises a mixer with a tunable oscillator. Then, the operating frequency of the oscillator is set to the carrier frequency $\lambda_{c,j}$ corresponding to the cell. In some embodiments, this is performed by, for example, adjustments made by 2DFST feedback subsystem 1555 as is explained below.

Figure 16:
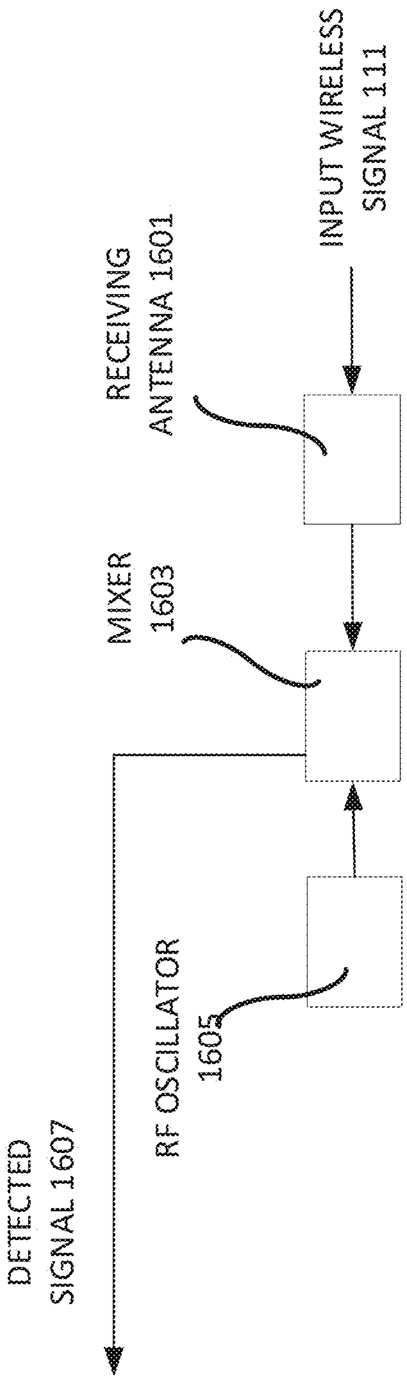
FIG. 16 illustrates an example embodiment of a wireless receiver in a 2DFST reception subsystem.

An example embodiment is shown in FIG. 16, The wireless signal 111 is received by the receive antenna 1601 as shown in FIG. 16 and fed to the mixer 1603, along with a oscillator set to the appropriate carrier frequency. From the above, this results in a detected baseband signal 1607 located at the subcarrier baseband frequency $\lambda_{s,q}$ corresponding to the cell.

Figure 17:
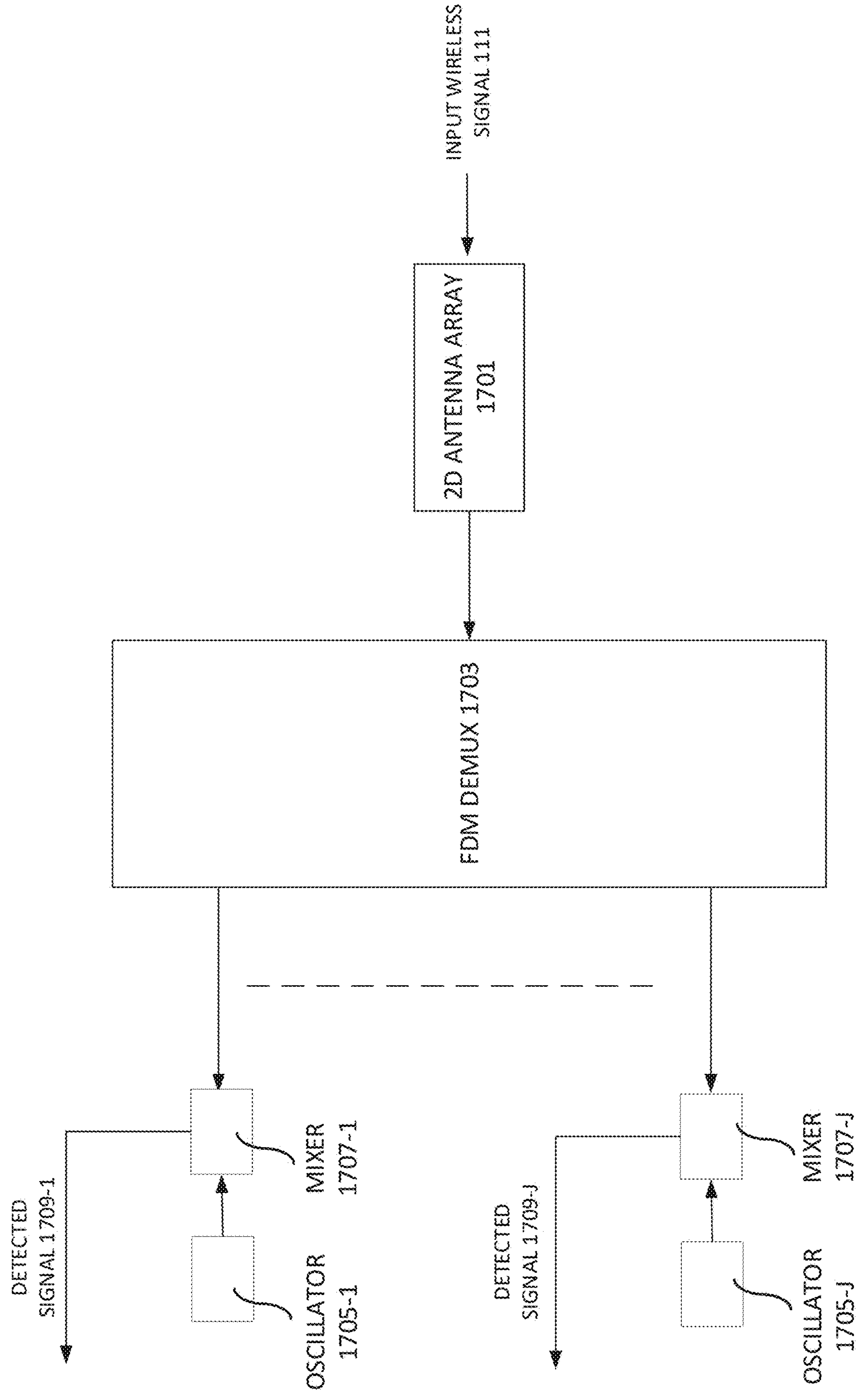
FIG. 17 illustrates an example embodiment of a wireless receiver comprising a two-dimensional antenna array in a 2DFST reception subsystem.

In other embodiments, the receiver 1523 comprises a 2D antenna array. An example embodiment is shown in FIG. 17. The operations performed are the inverse of those shown in FIG. 5F, that is, the wireless signal 111 received at the 2D antenna array is directed over a communications link to a FDM demultiplexer (FDM DEMUX 1703). FDM DEMUX 1703 directs the input signal to one of J outputs of the FDM DEMUX 1703 based on the $f_{c,j}$ used. Each output of FDM DEMUX 1703 is coupled to a mixer. The mixer is also coupled to an oscillator. For example, output one (1) of FDM DEMUX 1703 is coupled to mixer 1707-1, which is in turn coupled to oscillator 1705-1. Each oscillator operates at the carrier frequency corresponding to the output index j. For example, oscillator 1705-1 is operates at the carrier frequency $f_{c,1}$. From the above, the detected signal output from each of the mixers 1707-1 to 1707-J is a baseband signal located at the subcarrier baseband frequency $\lambda_{s,q}$ corresponding to the cell.

Figure 18:
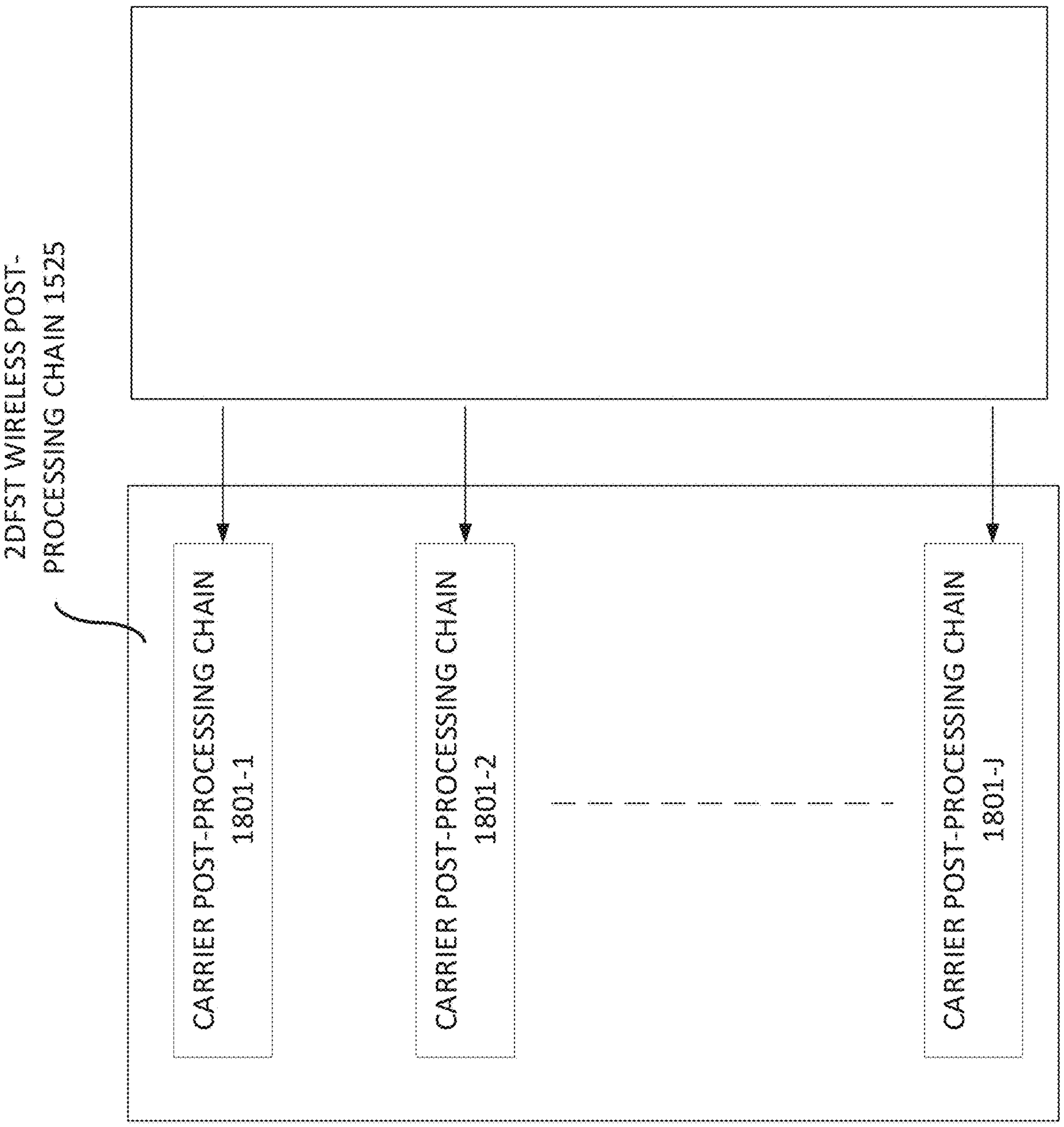
FIG. 18 illustrates a detailed embodiment of a 2DFST wireless post-processing chain.

In step 14B-03 of FIG. 14B: the detected baseband signal is sent to 2DFST wireless post-processing chain 1525. Similar to 2DFST wireless pre-processing chain 517, 2DFST wireless post-processing chain 1525 comprises J carrier post-processing chains 1801-1 to 1801-J as shown in FIG. 18. The input to each chain, is a detected signal derived from a wireless signal which was carried at a corresponding carrier frequency $f_{c,j}$. For example, the input to chain 1801-1 is a detected signal derived from a wireless signal which was carried at a carrier frequency $f_{c,1}$.

Each post-processing chain performs operations which are the inverse of the operations performed by each of the pre-processing chains 5C-01-1 to 5C-01-J in FIG. 5C.

Figure 19:
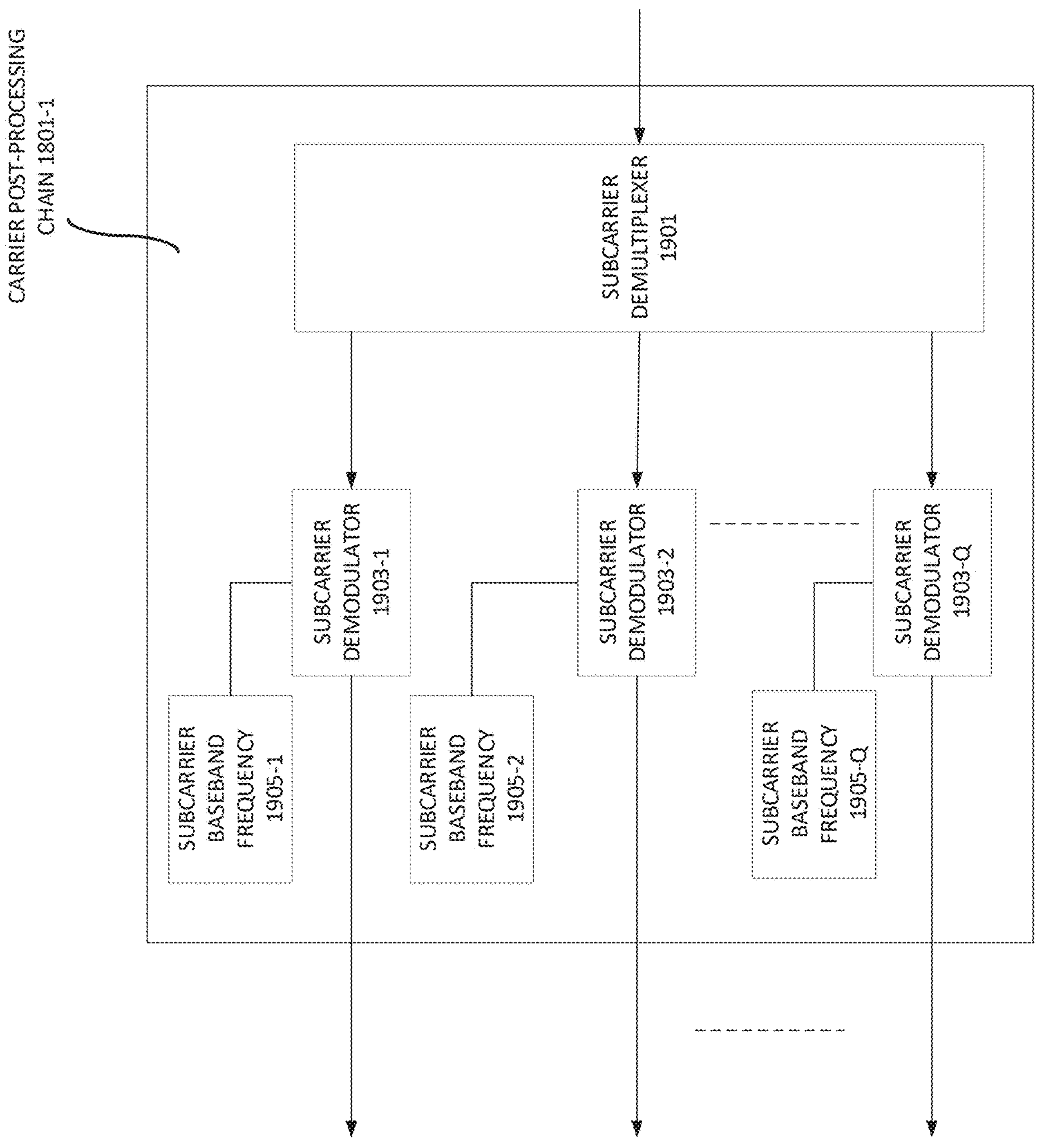
FIG. 19 illustrates a detailed embodiment of a carrier post-processing chain.

An example embodiment of a carrier post-processing chain 1801-1 is shown in FIG. 19. Carrier post-processing chain 1801-1 comprises a subcarrier demultiplexer 1901, where input signals are directed to one of Q output channels based on the subcarrier baseband frequency $f_{s,q}$ used.

Each of the outputs from the subcarrier demultiplexer 1901 is coupled to a subcarrier demodulator, where a frequency corresponding to the subcarrier baseband frequency is then used to demodulate the input to produce demodulated symbols. For example, output one (1) of the subcarrier demultiplexer 1901 is coupled to subcarrier demodulator 1903-1. Then a frequency corresponding to subcarrier baseband frequency 1905-1 having value $f_{s,1}$ is used to demodulate the input to subcarrier demodulator 1903-1 to produce demodulated symbols.

In step 14B-05 of FIG. 14B: the demodulated symbols are then input to 2DFST reception digital signal processing pre-compensation module 1529, where they are processed, similar to step 6B-05 of FIG. 6B and as described above.

In step 14B-07 of FIG. 14B: the output symbols from 2DFST reception digital signal processing pre-compensation module 1529 are then transmitted to 2DFST natural intelligence processing subsystem 1531.

In step 14B-09 of FIG. 14B: 2DFST natural intelligence processing subsystem 1531 receives and processes the transmitted output symbols. 2DFST natural intelligence processing subsystem 1531 is similar in structure to natural intelligence processing subsystem 631, and performs similar operations. Since the structure and operations of natural intelligence processing subsystem 631 has been discussed extensively previously, one of ordinary skill in the art would understand that similar operations are performed by 2DFST natural intelligence processing subsystem 1531 in step 14B-09.

In step 14B-11 of FIG. 14B: The output symbols from 2DFST natural intelligence processing subsystem 1531 are then directed to 2DFST reception symbol-to-bit demapper 1546, where it is demapped to bits and directed to 2DFST reception error correction decoding 1547.

At 2DFST reception error correction decoding 1547, the input bits are decoded and directed to output 2DFST data 1548. 2DFST reception error correction decoding 1547 operates in a similar fashion to client reception error correction decoding module 647. Then, similar to 2DFST transmission error control coding module 507 and client reception error correction decoding module 647, client transmission error control coding module 1207 and 2DFST reception error correction decoding 1547 are synchronized.

2DFST feedback subsystem 1555 is communicatively coupled to components of 2DFST reception 105 and client transmission 153. 2DFST feedback subsystem 1555 is similar in structure and performs similar operations to those performed by client feedback subsystem 555. In some embodiments, 2DFST feedback subsystem 1555 uses wireless link 121 to communicate with client transmission 153 and perform adjustments as needed, and as explained above. In some embodiments, 2DFST feedback subsystem 1555 is communicatively coupled to client feedback subsystem 555 to enable, for example, sharing of data between the host 102 and the client device 109. By exchanging data with each other, this enables both host and client device to learn faster and improve performance in a more adaptive and dynamic fashion.

The systems and methods described above enable delivery of the advantages of NI within a wireless system, thereby substantially elevating performance and operational efficiency. The systems and methods described above address and overcome the nonlinear impairments that have long constrained the efficiency and performance of wireless systems.

By limiting each client's data to a specific sub-channel positioned at frequency $\lambda_{jq}$ and directing transmissions over this frequency to a specific cell, this reduces the chances of interception. This can lead to an improvement in cybersecurity. As explained previously it also removes potential health and safety issues as described above, and also can enable improved performance.

The effect of atmospheric distortions such as turbulence can significantly impact transmissions originating at the host and destined for the client. As explained previously: Since the client only receives signals within a specific sub-channel positioned at frequency $\lambda_{jq}$ the effects of atmospheric turbulence are also minimized. Narrower bandwidth signals are inherently less susceptible to distortion, leading to improved signal integrity and enhanced communication reliability.

By focusing transmission to a single cell rather than all (J×Q) cells, the systems and methods detailed above introduce a factor of (J×Q) reduction in radiated power. This further improves efficiency and reduces cost.

Using a physical frequency-direction mapping subsystem such as the 2D antenna array makes it possible to implement 2D frequency scanning efficiently, as explained above.

Additionally, using NI in receivers may lead to more efficiency. Utilizing NI with Hard Decision Forward Error Correction (HD-FEC) or NI-only configurations, may offer reduced computational costs, lower energy consumption, and improved latency when compared to traditional Soft Decision FEC (SD-FEC) methods.

The systems and methods described above position NI as a highly viable solution for next-generation 6G wireless communication systems, where performance, cost-effectiveness, and efficiency are paramount considerations.

Beyond merely mitigating the effects of nonlinear impairments and ISI, the system introduces a framework for intelligent management and proactive monitoring of the wireless link. The systems and methods described allow for anticipation, adaptation and for pre-emptively counteracting potential issues, thereby ensuring minimal impact on performance. This advanced capability enables a more resilient, efficient, and intelligent network management approach.

By integrating NI within the 2DFST framework, the systems and methods disclosed below envisions a future where main transceivers and base transceiver stations (BTS) for 5G/6G networks are significantly cheaper, more efficient, and exhibit lower latency. These transceivers will not only reactively respond to changing conditions but will also dynamically adapt in real-time, mimicking the cognitive and predictive capabilities of NI to effectively navigate the complexities of modern telecommunications.

Although the algorithms described above including those with reference to the foregoing flow charts have been described separately, it should be understood that any two or more of the algorithms disclosed herein can be combined in any combination. Any of the methods, algorithms, implementations, or procedures described herein can include machine-readable instructions for execution by: (a) a processor, (b) a controller, and/or (c) any other suitable processing device. Any algorithm, software, or method disclosed herein can be embodied in software stored on a non-transitory tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well known manner (e.g., it may be implemented by an application specific integrated circuit (ASIC), a programmable logic device (PLD), a field programmable logic device (FPLD), discrete logic, etc.). Also, some or all of the machine-readable instructions represented in any flowchart depicted herein can be implemented manually as opposed to automatically by a controller, processor, or similar computing device or machine. Further, although specific algorithms are described with reference to flowcharts depicted herein, persons of ordinary skill in the art will readily appreciate that many other methods of implementing the example machine readable instructions may alternatively be used. For example, the order of execution of the blocks may be changed, and/or some of the blocks described may be changed, eliminated, or combined.

It should be noted that the algorithms illustrated and discussed herein as having various modules which perform particular functions and interact with one another. It should be understood that these modules are merely segregated based on their function for the sake of description and represent computer hardware and/or executable software code which is stored on a computer-readable medium for execution on appropriate computing hardware. The various functions of the different modules and units can be combined or segregated as hardware and/or software stored on a non-transitory computer-readable medium as above as modules in any manner, and can be used separately or in combination.

While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of an invention as defined in the appended claims.

What is claimed is:

1. A system for natural intelligence (NI) processing in a reception subsystem for a wireless client comprising:
- a perceptor subsystem communicatively coupled to an executive subsystem via interconnections, wherein:
  - the perceptor subsystem comprises a posterior storage and one or more posterior processing modules coupled to each other by perceptor subsystem interconnections, and
  - the executive subsystem comprises an executive storage, one or more executive processing modules and a planning module coupled to each other by executive subsystem interconnections;
- a feedback subsystem communicatively coupled to:
  - the executive subsystem,
  - a host device transmission subsystem communicatively coupled to the client,
  - the reception subsystem, and
  - an input data source to the host device transmission subsystem, wherein:
  - the feedback subsystem comprises a feedback processing module communicatively coupled to a feedback subsystem database, further wherein:
    - the feedback processing module comprises a feedback subsystem firmware running on a feedback subsystem processor;
- an adaptive feedback path control module communicatively coupled to the executive subsystem and the perceptor subsystem, wherein:
  - the perceptor subsystem receives perceptions based on a plurality of symbols transmitted from the host device transmission subsystem,
  - based on the received plurality of transmitted symbols, determining whether a suitable posterior model is available in the posterior storage,
    - when a suitable posterior model is available, the one or more posterior processing modules retrieves a posterior model from the posterior storage, and
    - the one or more posterior processing modules communicates the retrieved posterior model to the adaptive feedback path control module,
  - the adaptive feedback path control module estimates a bit error rate (BER) using the retrieved posterior model,
  - the adaptive feedback path control module communicates the estimated BER to the executive subsystem,
  - when the estimated BER is below a threshold, the planning module selects a prospective action from the executive storage,
  - at least one of the planning module and the one or more executive processing modules test the selected prospective action in a virtual environment,
  - at least one of the planning module and the one or more executive processing modules determines whether the selected prospective action is beneficial, when the selected prospective action is beneficial, either the planning module or the one or more executive processing modules communicates signals comprising the selected prospective action to the feedback subsystem, and the feedback processing module:

receives the signals comprising the selected prospective action, determines, based on the received signals, an adjustment to implement the selected prospective action, and transmits signals to perform the determined adjustment to one or more components within at least one of:

the host device transmission, the client reception subsystem, or the input data source.

2. The system of claim 1, wherein:

the host device transmission subsystem is communicatively coupled to the client via a wireless link;

the host device transmission subsystem transmits the plurality of symbols over the wireless link; and the wireless link operates at an operating frequency and is oriented in a direction.

3. The system of claim 2, wherein:

the host device transmission subsystem comprises a physical frequency-direction mapping subsystem; and the physical frequency-direction mapping subsystem maps the operating frequency to the direction.

4. The system of claim 3 wherein the physical frequency-direction mapping subsystem comprises a two-dimensional antenna array.

5. The system of claim 1, wherein the host device transmission subsystem communicatively coupled to the client via a wireless link; and the wireless link is affected by nonlinear impairments.

6. The system of claim 1, wherein the host device transmission subsystem communicatively coupled to the client via a wireless link; and the wireless link is affected by non-Gaussian impairments.

7. A method for NI processing in a reception subsystem for a wireless client comprising:

receiving, by a perceptor subsystem, perceptions comprising a plurality of transmitted symbols;

determining, based on the received plurality of transmitted symbols, whether a suitable posterior model is available in a posterior storage within the posterior subsystem;

when a suitable posterior model is available, retrieving, by one or more posterior processing modules within the posterior subsystem, a posterior model from the posterior storage;

communicating, by the one or more posterior processing modules, the retrieved posterior model to an adaptive feedback path control;

estimating, by the adaptive feedback path control module, a bit error rate (BER) using the retrieved posterior model;

communicating the estimated BER to an executive subsystem;

when the estimated BER is below a threshold, selecting, by a planning module within the executive subsystem, a prospective action from an executive storage;

testing, by at least one of the planning module and one or more executive processing modules within the executive subsystem, the selected prospective action in a virtual environment;

based on the testing, determining, by at least one of the planning module and one or more executive processing modules, whether the selected prospective action is beneficial;

when the selected prospective action is beneficial, communicating, by either the planning module or the one or more executive processing modules, signals comprising the selected prospective action to a feedback subsystem;

receiving, by a feedback processing module within the feedback subsystem, the signals comprising the selected prospective action;

based on the received signals, determining, by the feedback processing module, an adjustment to implement the selected prospective action; and transmitting, by the feedback processing module, signals to perform the determined adjustment to one or more components within a host device transmission, a client reception, or an input data source to the host device transmission.

* * * * *